（12）United States Patent
Hicks et al.

(10) Patent No.: US 10,937,013 B2
(45) Date of Patent: *Mar. 2, 2021

(54) POINT OF SALE (POS) DOCKING STATION SYSTEM AND METHOD FOR A MOBILE TABLET GUN SYSTEM WITH MOBILE TABLET DEVICE

(71) Applicant: RETAIL TECHNOLOGIES CORPORATION, Orlando, FL (US)

(72) Inventors: Bruce J. Hicks, Windermere, FL (US); James F. Morris, Huntsville, AL (US); Brian K. McWhirter, Winter Garden, FL (US)

(73) Assignee: RETAIL TECHNOLOGIES CORPORATION, Orlando, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/656,479

(22) Filed: Oct. 17, 2019

(65) Prior Publication Data

US 2020/0058008 A1 Feb. 20, 2020

Related U.S. Application Data

(63) Continuation-in-part of application No. 13/783,058, filed on Mar. 1, 2013, now Pat. No. 10,453,047.
(Continued)

(51) Int. Cl.
*G06Q 20/20* (2012.01)
*G06Q 20/32* (2012.01)
(Continued)

(52) U.S. Cl.
CPC ........... *G06Q 20/20* (2013.01); *G06F 1/1632* (2013.01); *G06K 7/0004* (2013.01); *G06K 7/089* (2013.01);
(Continued)

(58) Field of Classification Search
CPC .. G06Q 20/20; G06Q 30/322; G06Q 20/3278; G06F 7/0004; G06F 7/0889; G06F 1/1632
See application file for complete search history.

(56) References Cited

U.S. PATENT DOCUMENTS 4,387,297 A 6/1983 Swartz et al.
4,496,831 A 1/1985 Swartz et al.
(Continued)

FOREIGN PATENT DOCUMENTS

JP 9081662 3/1997

OTHER PUBLICATIONS

Frisby, WesLee, et al. "Security Analysis of Smartphone Point-of-Sale Systems." WOOT. 2012.*
(Continued)

*Primary Examiner* — Asfand M Sheikh
(74) *Attorney, Agent, or Firm* — Ernest D. Buff & Associates, LLC; Ernest D. Buff; Margaret A. LaCroix

(57) ABSTRACT

A points of sale (POS) docking station for interchangeably attaching and electronically coupling a mobile tablet gun system to a base form factor. An upper housing assembly is provided with a tablet cradle enclosure having a secondary printed circuit board (PCB1) for interchangeably mounting and electronically communicating with the mobile tablet. A lower housing assembly is rotationally connected to the upper housing assembly and includes a bar code scanner and a primary printed circuit board (PCB2). A secondary display screen is provided that is activated "on" when it is rotated over and parallel to the tablet cradle enclosure and turned "off" when rotated down and perpendicular to the tablet cradle enclosure. The secondary printed circuit board (PCB1) connected to the primary printed circuit board (PCB2) through a custom interface cable operable to facili-
(Continued)

tate electrical communication between the POS docking station and the mobile tablet gun system without operational delay.

18 Claims, 48 Drawing Sheets

Related U.S. Application Data

(60) Provisional application No. 61/751,904, filed on Jan. 13, 2013.

(51) Int. Cl.
  *G06K 7/10* (2006.01)
  *G06K 7/00* (2006.01)
  *G06K 7/08* (2006.01)
  *G06F 1/16* (2006.01)

(52) U.S. Cl.
  CPC ....... *G06K 7/10881* (2013.01); *G06Q 20/322* (2013.01); *G06Q 20/3278* (2013.01)

(56) References Cited

U.S. PATENT DOCUMENTS

| | | | |
|---|---|---|---|
| 4,835,374 A | 5/1989 | Swartz et al. | |
| 4,970,379 A | 11/1990 | Danstrom | |
| 5,070,293 A | 12/1991 | Ishii et al. | |
| 5,324,922 A | 6/1994 | Roberts | |
| 5,349,497 A | 9/1994 | Hanson et al. | |
| 6,109,528 A | 8/2000 | Kunert et al. | |
| 6,280,212 B1* | 8/2001 | Nguyen | G06F 1/1632 439/157 |
| 6,726,070 B2 | 4/2004 | Lautner | |
| 6,853,293 B2 | 2/2005 | Swartz et al. | |
| 7,010,501 B1 | 3/2006 | Roslak et al. | |
| 7,913,912 B2 | 3/2011 | Do et al. | |
| 7,971,782 B1 | 7/2011 | Shams | |
| 8,235,289 B2 | 8/2012 | Hsu et al. | |
| 8,235,294 B2 | 8/2012 | Miller et al. | |
| 8,250,187 B2 | 8/2012 | Cacheria, III | |
| 8,255,499 B2 | 8/2012 | Cacheria, III | |
| 8,255,500 B2 | 8/2012 | Cacheria, III | |
| 8,856,033 B2 | 10/2014 | Hicks | |
| 9,202,095 B2* | 12/2015 | Martin | G06K 7/10881 |
| 9,558,482 B2* | 1/2017 | Hicks | G06Q 20/208 |
| 9,747,632 B2* | 8/2017 | Hicks | G06Q 30/0641 |
| 9,760,116 B2* | 9/2017 | Wylie | G06F 1/1654 |
| 9,881,292 B2* | 1/2018 | Hicks | G06Q 20/208 |
| 2002/0123957 A1 | 9/2002 | Notarius et al. | |
| 2003/0216969 A1 | 11/2003 | Bauer et al. | |
| 2003/0235029 A1* | 12/2003 | Doherty | H05K 1/028 361/679.27 |
| 2004/0043650 A1* | 3/2004 | Yang | G06F 1/1626 439/165 |
| 2007/0228163 A1 | 10/2007 | Schoen et al. | |
| 2009/0049554 A1* | 2/2009 | Vuong | H04L 67/1095 726/26 |
| 2010/0070376 A1 | 3/2010 | Proud et al. | |
| 2011/0118562 A1* | 5/2011 | Smith | A61B 8/4433 600/301 |
| 2011/0170256 A1* | 7/2011 | Lee | G06F 1/166 361/679.44 |
| 2011/0231272 A1 | 9/2011 | Englund et al. | |
| 2011/0290876 A1 | 12/2011 | Graves et al. | |
| 2012/0066079 A1 | 3/2012 | Falzone et al. | |
| 2012/0072350 A1 | 3/2012 | Goldthwaite et al. | |
| 2012/0118770 A1 | 5/2012 | Valls | |
| 2012/0209749 A1 | 8/2012 | Hammad et al. | |
| 2012/0284131 A1 | 11/2012 | Soffer et al. | |
| 2012/0296741 A1 | 11/2012 | Dykes | |
| 2012/0298740 A1 | 11/2012 | Hsu et al. | |
| 2013/0030933 A1 | 1/2013 | Talech et al. | |
| 2013/0176673 A1* | 7/2013 | Yen | G06F 1/1632 361/679.26 |
| 2013/0262248 A1* | 10/2013 | Kim | G06F 1/1632 705/17 |
| 2015/0009672 A1 | 1/2015 | Girauit | |
| 2015/0025985 A1* | 1/2015 | Inagawa | G06F 1/1632 705/16 |
| 2015/0025990 A1* | 1/2015 | Suzuki | G06Q 20/204 705/20 |
| 2015/0286252 A1* | 10/2015 | Barone | G07G 1/0018 710/304 |
| 2016/0180128 A1* | 6/2016 | Utykanski | G06K 7/10881 235/462.42 |
| 2016/0231779 A1* | 8/2016 | Kaneko | E05B 73/0082 |
| 2016/0232508 A1* | 8/2016 | Nishiie | H04L 9/3231 |
| 2017/0102735 A1* | 4/2017 | Blowers | E05B 73/0082 |
| 2019/0034668 A1* | 1/2019 | Novoa | G06F 21/85 |

OTHER PUBLICATIONS

"PAYware Mobile Enterprise"—found at: https://www.verifone.com/products/hardware/mobile/payware-mobileenterprise.
"Infinite Peripherals IPG_Infinea_Tab_Spec.pdf" found at: https://www.ipclineapro.com/infinea-tab-ipad/.

\* cited by examiner

Primary Electronics Printed Circuit Board Functional Block Diagram (PCB2)

Fig. 5

Table 1 – Connector 101 Signals

| 101 – Tablet Gun Connector Signals |
| --- |
| *Signal* |
| DC Power for Tablet Gun |
| Electrical Logic Common (Ground) |
| Tablet Gun Ethernet |
| Tablet Gun USB |
| Tablet Gun Dock Detect Signal |
| Tablet Gun External Scan Button Signal |

Fig. 6

Table 2 – Primary Electronics Printed Circuit Board Connectors (PCB2)

| 103 – Primary Electronics PCB Connectors (PCB2) | |
|---|---|
| Connector | Description |
| J1 | External Power Interface (to AC mains) |
| J2 | 4 port Ethernet connector |
| J3 | 2 port USB connector |
| J4 | 2 port USB connector |
| J5 | 1 port USB connector for NFC Reader |
| J6 | Fan power connector |
| J9 | Tablet Gun Docking Interface Cable Connector |
| J10 | Powered USB 24V Port |
| J11 | Powered USB 12V Port |
| J12 | Powered USB 12V Port |
| J13 | USB Display connector |
| P1 | RS-232C Asynchronous Serial Port |

Fig. 12c
Fig. 12d
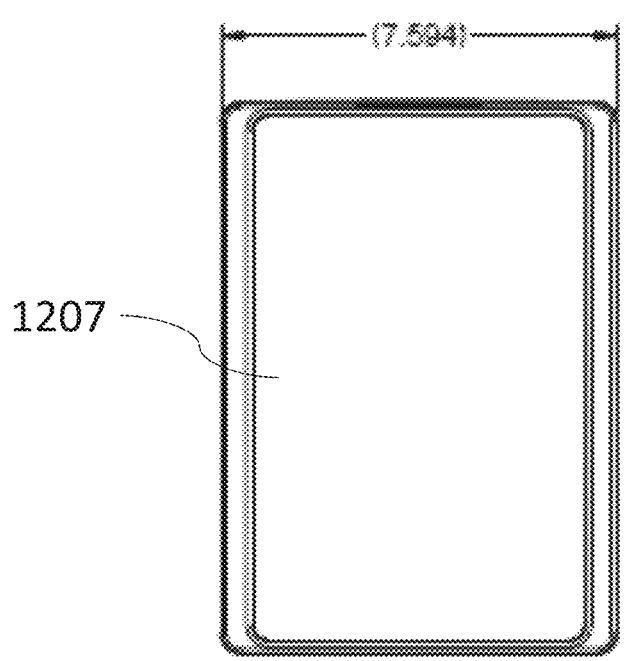
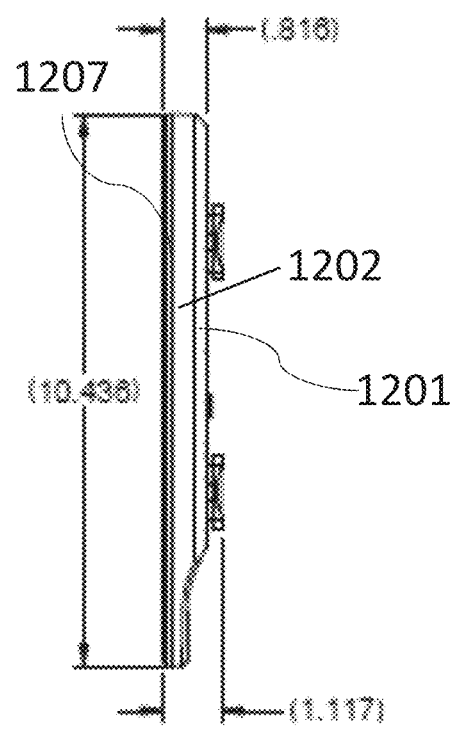
Fig. 12e
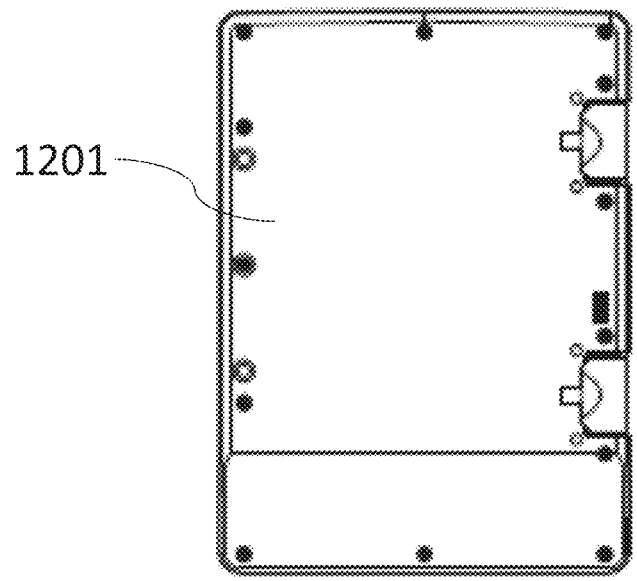

1301

1302

1301

Fig. 14a
Fig. 14b
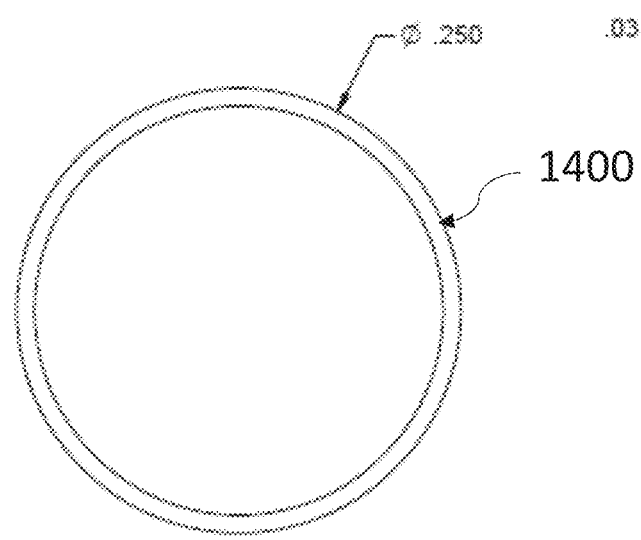
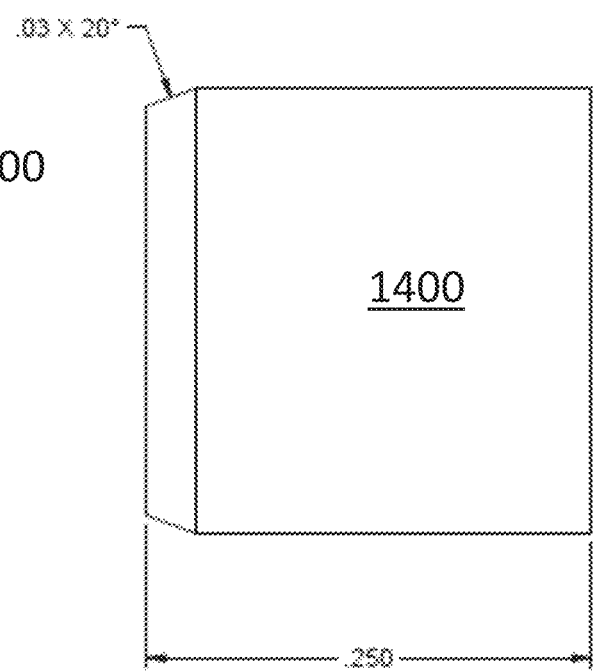

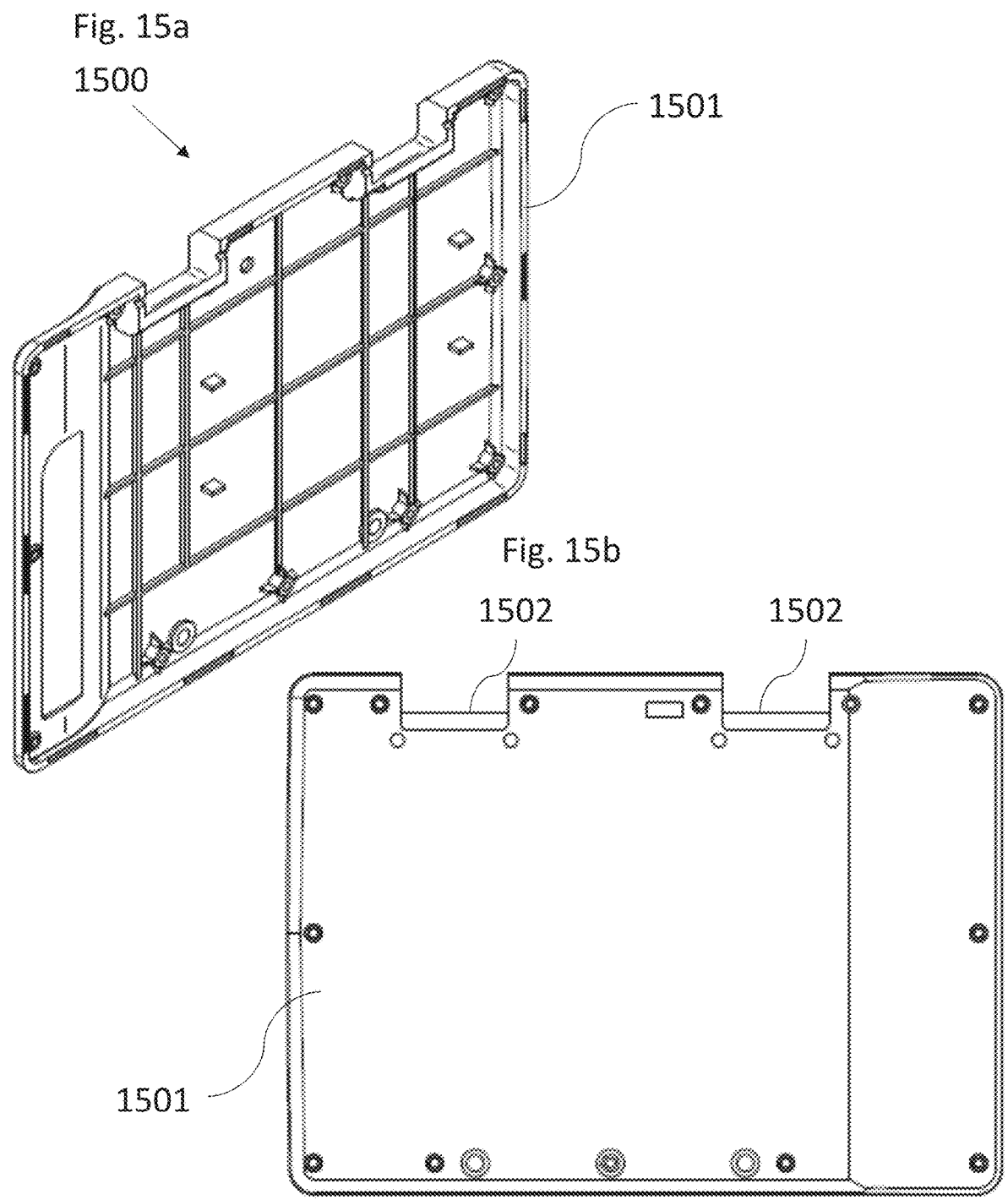

Fig. 15c
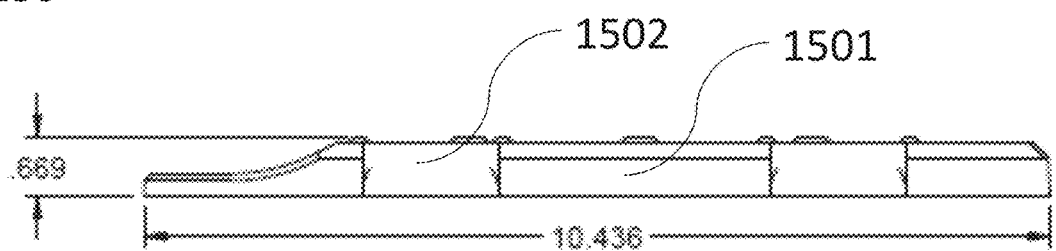
Fig. 15d
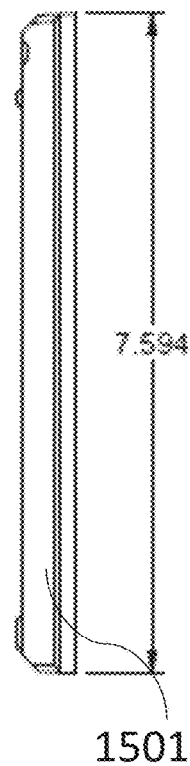
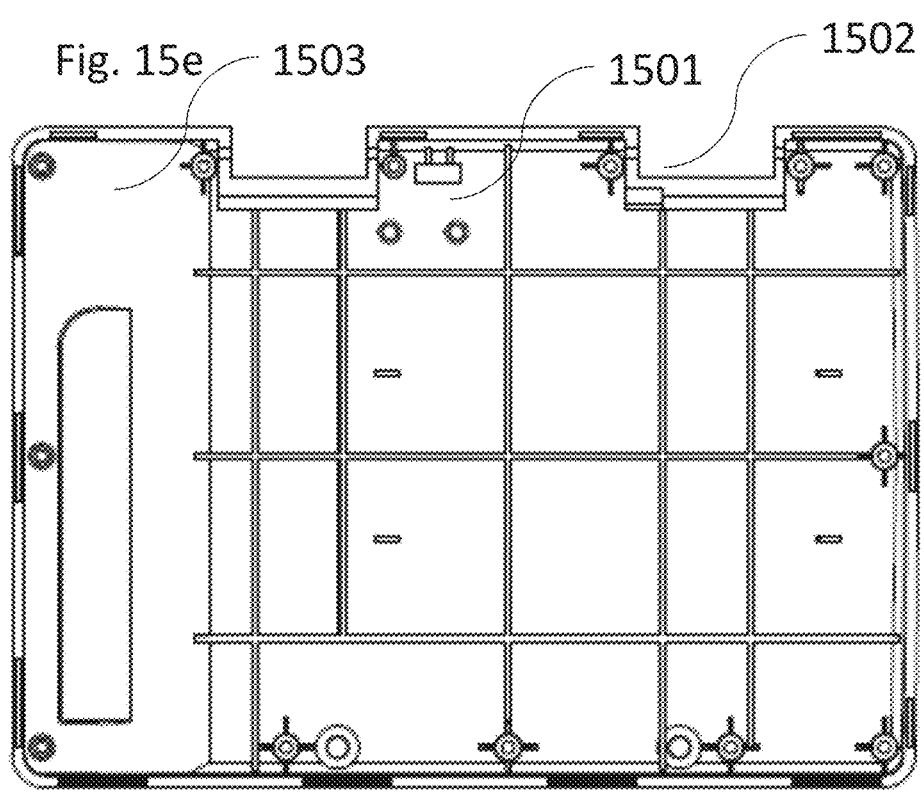

Fig. 16c
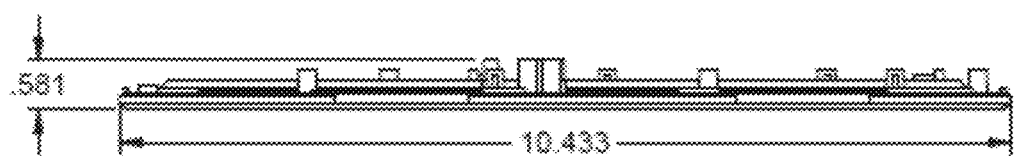
Fig. 16d    Fig. 16e
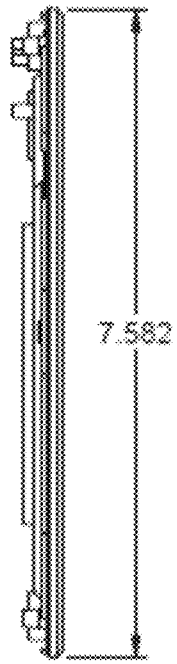 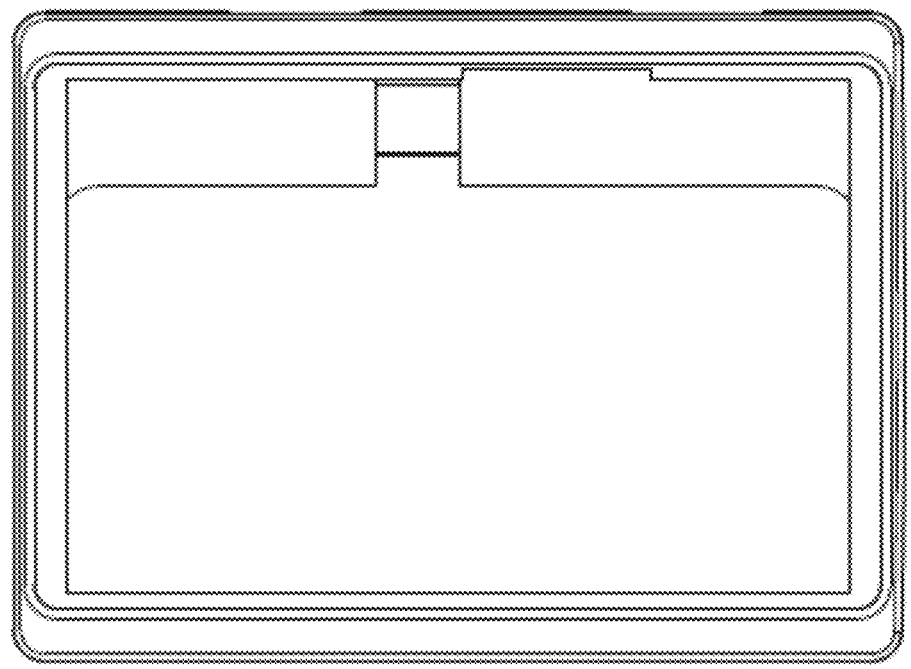

0.373

2000

2000

0.050

2000

0.711

2000

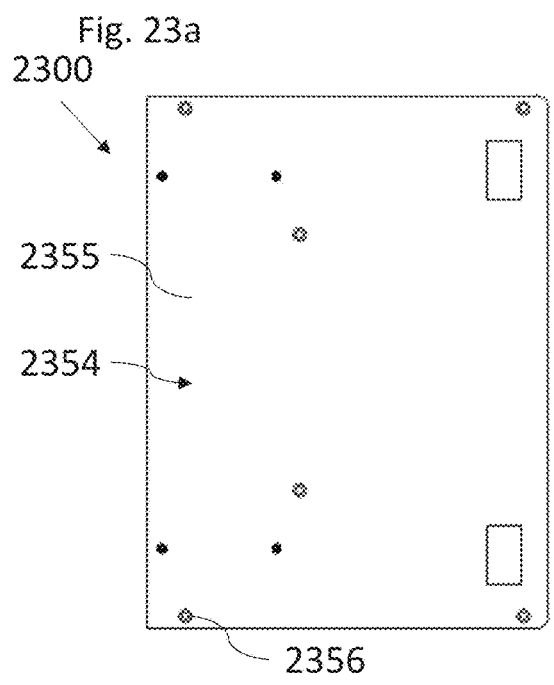
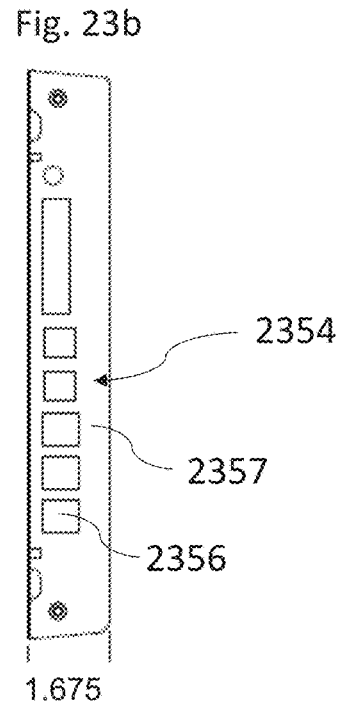
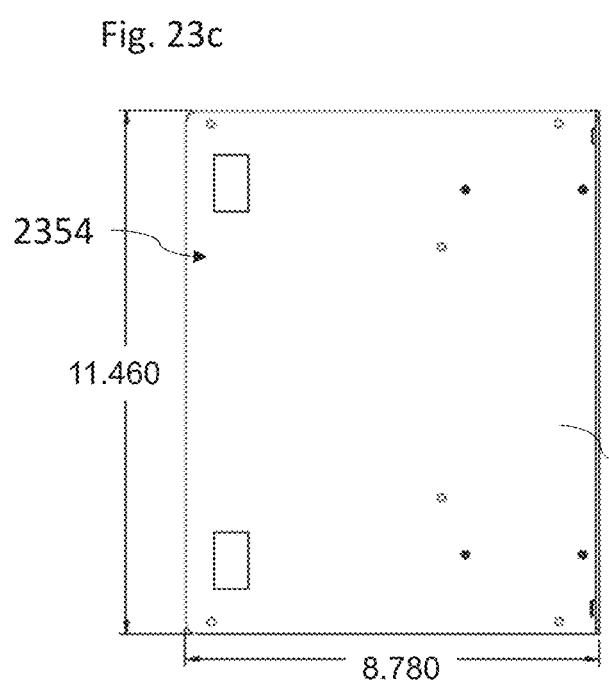
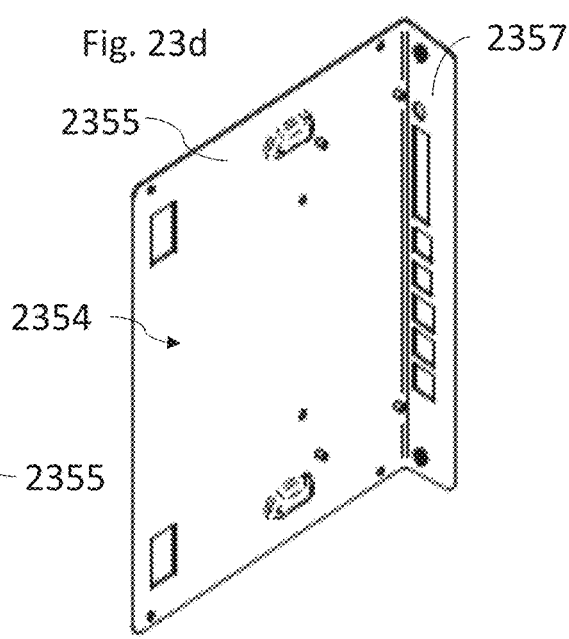

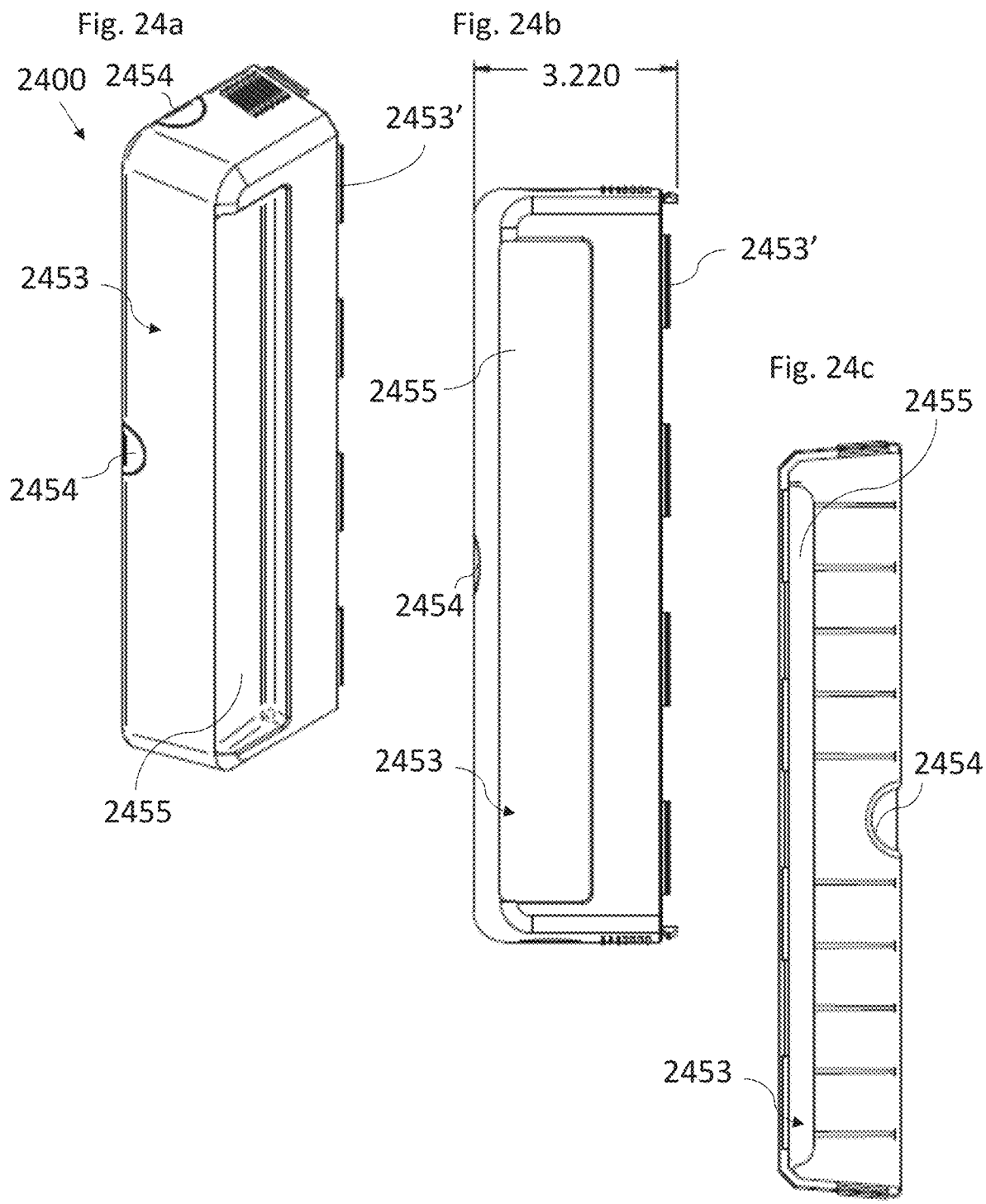

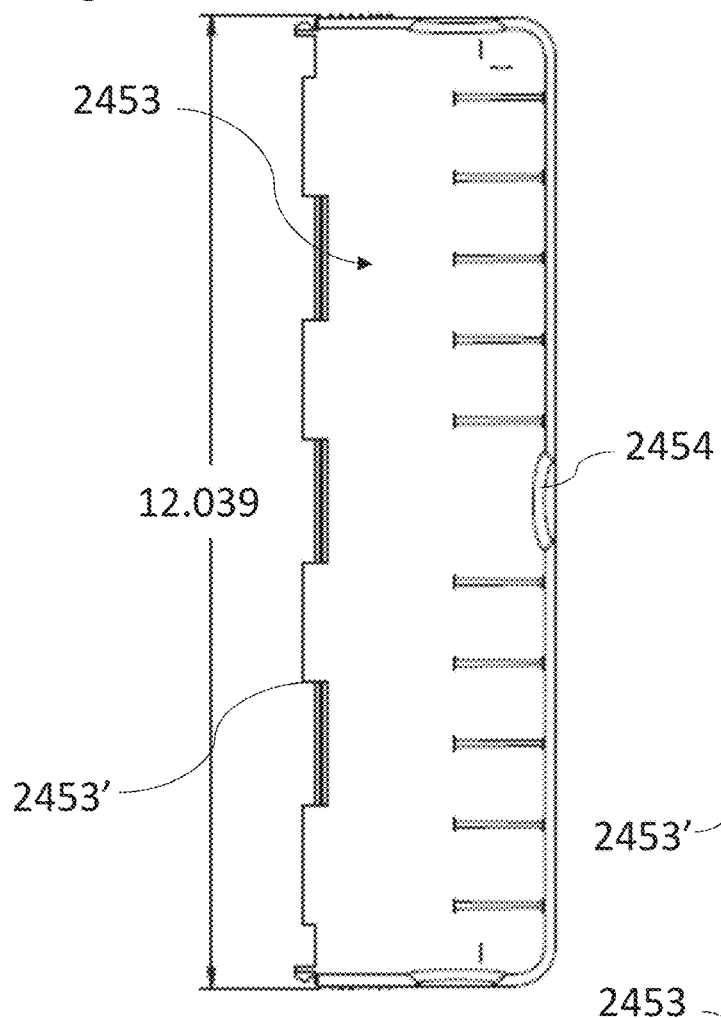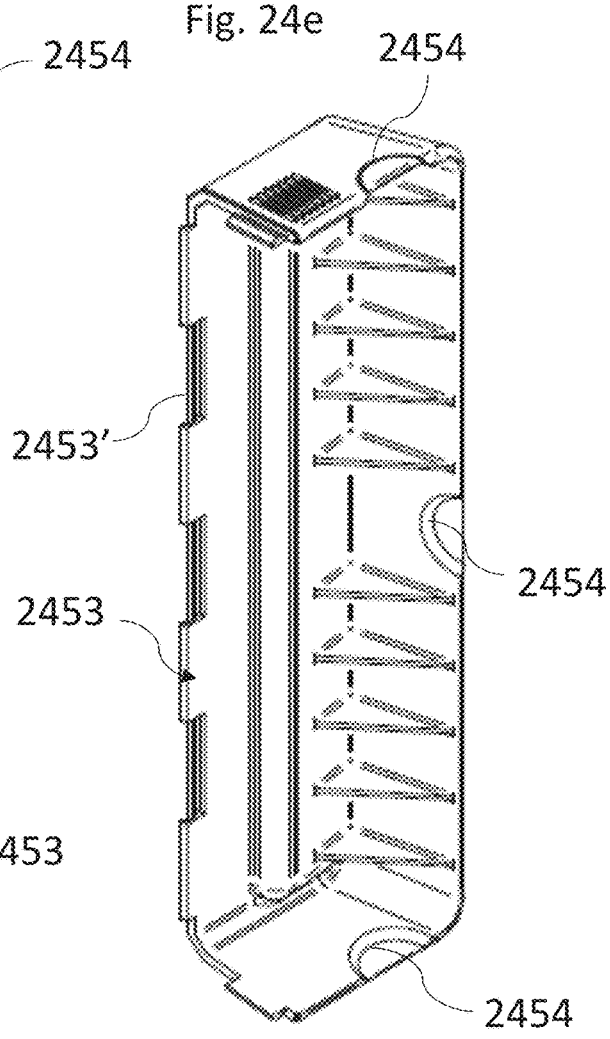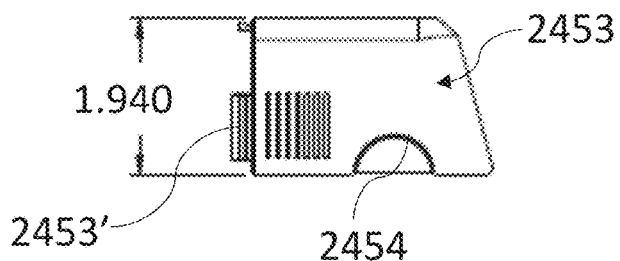

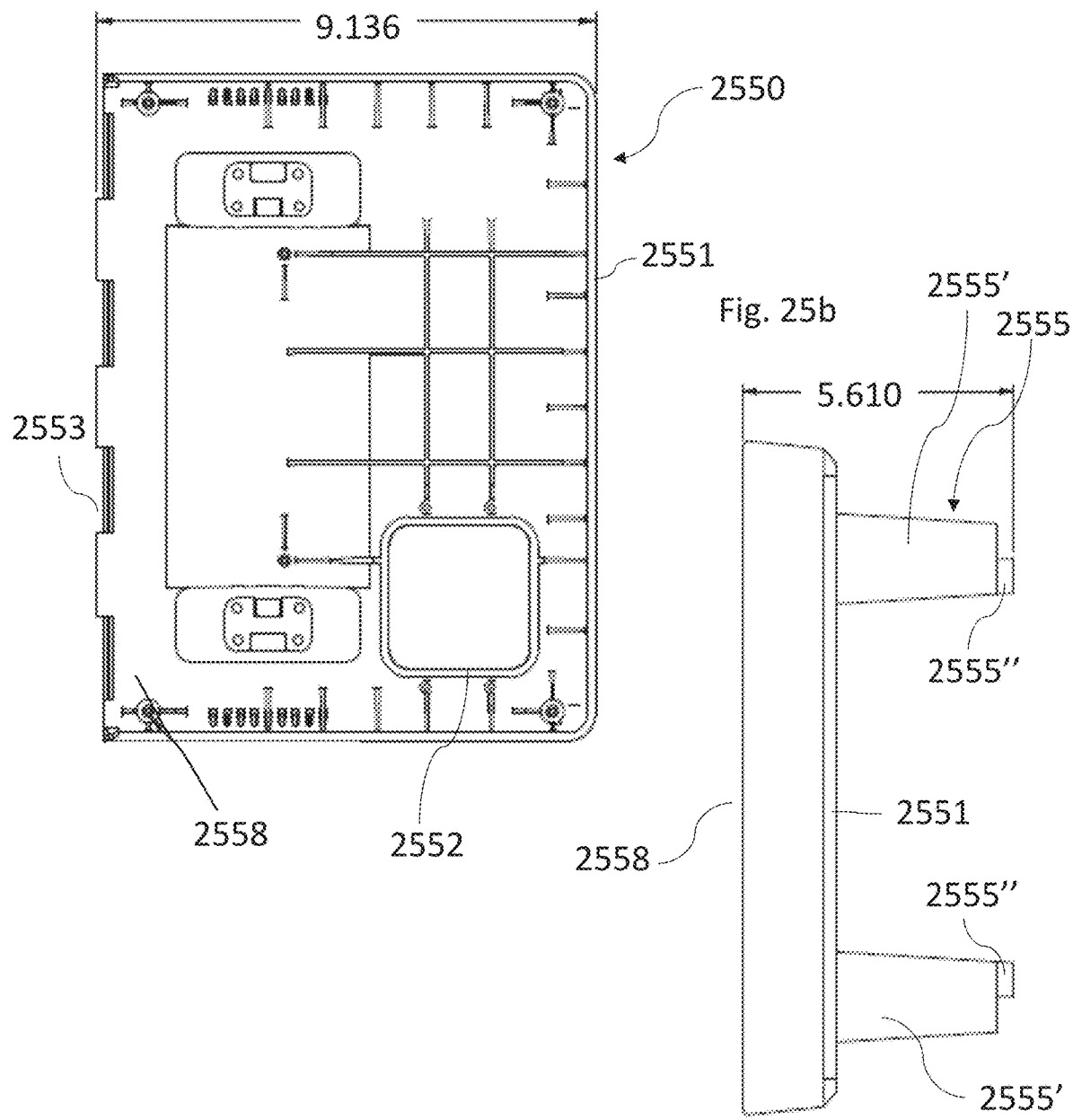

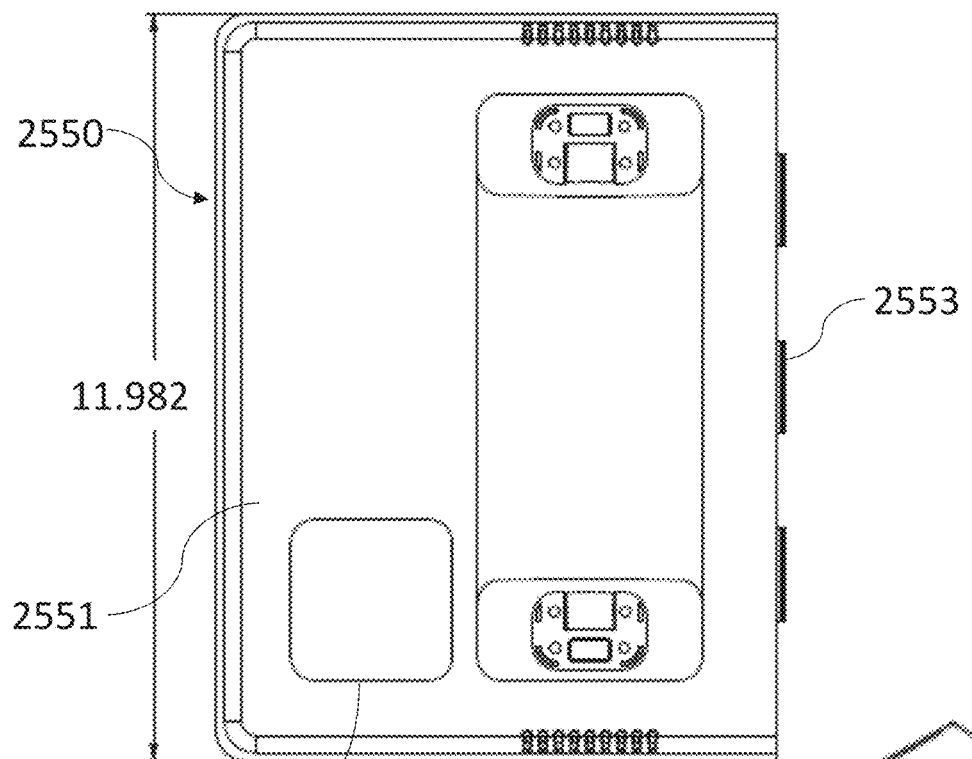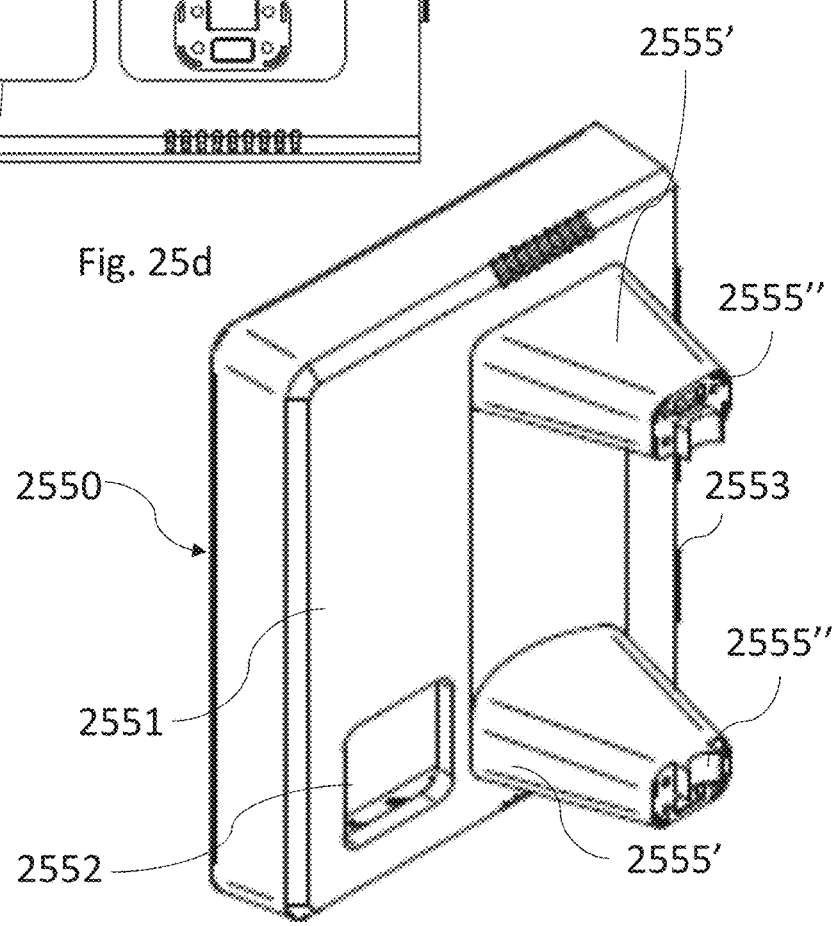

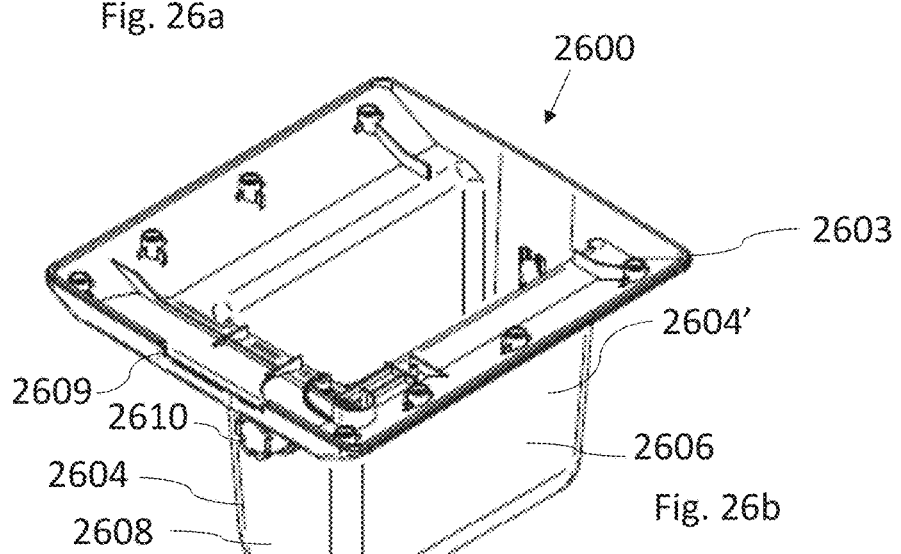
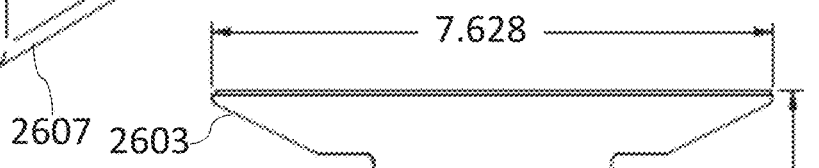
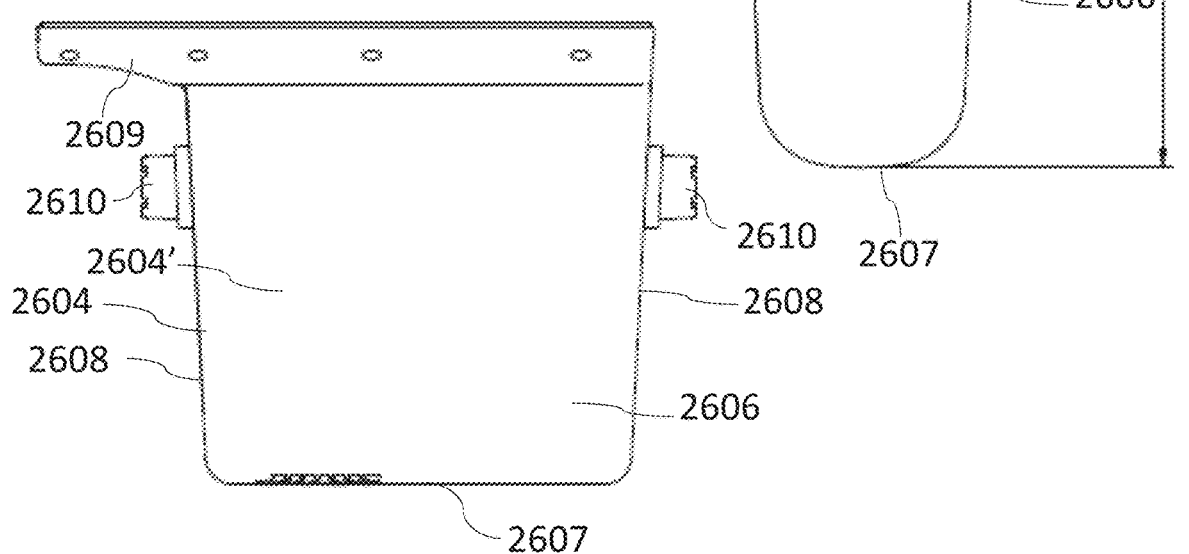

POINT OF SALE (POS) DOCKING STATION SYSTEM AND METHOD FOR A MOBILE TABLET GUN SYSTEM WITH MOBILE TABLET DEVICE

CROSS-REFERENCE TO RELATED APPLICATIONS

The present application is a continuation in part of U.S. patent application Ser. No. 13/783,058, filed Mar. 1, 2013, entitled "Mobile Scanner Gun System With Mobile Tablet Having A Mobile POS And Enterprise Resource Planning Application For POS Customer Order Fulfillment And In Store Inventory Management For Retail Establishment", which, in turn, is a non-provisional of U.S. provisional patent application Ser. No. 61/751,904, filed Jan. 13, 2013, the disclosures of which are hereby incorporated in their entirety by reference thereto.

1. FIELD OF THE INVENTION

The system and method of the present invention relates to fixed point of sale docking stations for a portable mobile tablet gun system with mobile tablet device having barcode scanning and payment card processing capability with scanning and payment card processing capability with customer check out and inventory management capability throughout a retail establishment.

2. DESCRIPTION OF THE PRIOR ART

Current mobile tablet device docking stations typically provide a source for charging a mobile tablet device. For example, once the mobile tablet device battery is low, the device is inserted into a charging station and left there until the mobile tablet device is fully charged. Other mobile tablet devices can be inserted into a fixed point of sale workstation and used as a main processor and data input device; however, the immediate portability of the mobile tablet device is not available. Consequently, the mobile tablet device cannot operate both within the fixed point of sale workstation and be removed from the fixed point of sale workstation seamlessly and in the middle of operational transactions. This lack of operational portability impedes an employee of a retail establishment from servicing its customers when mobility is required to checkout customers in a dynamic retail store environment, such as an outdoor garden center, at high customer traffic periods of time or kiosk sales in a mall environment.

Further, while performing inventory management functions out on the retail floor with typical radio frequency (RF) guns, these mobile tablet devices cannot be immediately inserted into the fixed POS workstation and perform a customer check out transaction. Then migrate back to a mobile inventory management device for such tasks as product look-up, barcode ticket printing, inventory receiving, store transfers and physical inventory cycle counting. Followed by, then being reinserted back into the fixed POS workstation to resume the customer check out operation, specifically where it had been suspended, and complete the customer check out transaction.

Heretofore disclosed and utilized devices have several limitations that significantly impact certain types of retail operations, including retailers who have POS operations outdoors, process a significant amount of data entry forms as part of their daily POS transaction set (such as vendor special orders), HIPAA forms, HAZMAT forms and transfers of inventory and support of handicapped customers within their POS checkout lanes. In these environmental and operational situations, a small touchscreen LCD display footprint, typically approximately a 6" LCD display, of a mobile tablet gun system tablet can limit the effectiveness of a store employee. Consequently, hereto disclosed and/or utilized devices typically offer a secondary smart tablet device ranging in size from 10 inches to 15 inches, with 10 inches being most preferable. Disadvantageously, the retail operator is thus required to not only buy a tablet gun, but also a secondary smart mobile tablet device having the larger LCD display for retail operations that are challenged by the small LCD display footprint of the tablet gun. Further, current limitations exist relating to the degrees of rotation of tablet devices, forward and backward, while docked, limiting accessibility of the touchscreen LCD display for handicapped patrons unable to stand over the counter. Generally, heretofore disclosed and utilized devices are limited to a 30-degree tilt toward the cashier and a 30-degree tilt toward the customer. This limitation is not conducive for customers who may be handicapped and limited in a wheelchair, thus unable to view the display screen from a standing position. By redesigning the armature that provides the "tilting" or rotational capability to allow for a 90 degree tilt back to the cashier and a 90 tilt forward to the customer.

Based on the foregoing, there exists a need to improve upon heretofore disclosed and/or utilized devices to provide the ability for a tablet gun having additional system capability. including instant portability while at the same time providing the ability to process POS sales transactions. There further exists a need in the art for a significant increase in usable touchscreen LCD capability, reducing overall technology cost to manage the typical retail store by eliminating an expensive secondary smart mobile tablet device w/scanner, thereby significantly increasing customer service tablet gun. Additionally, there exists a need to increase "tilting" or rotational feature angles allowing a mobile tablet device to "rotate" forward and backward from the POS cashier to the customer so that the mobile tablet device, when docked, is accessible for handicapped store personnel and customers.

SUMMARY OF THE INVENTION

The subject invention provides a mobile tablet gun system for interchangeably attaching and electronically coupling a mobile tablet device to a base form factor. As a result, a tablet gun converts into an integrated point of sale (POS) terminal through use of a fixed POS docking station. Limitations in the market are addressed by the subject mobile tablet gun system, which provides a more robust system that improves a full gamut of retail operations, including outdoor POS operations, data entry forms for daily POS transactions (such as vendor special orders), HIPAA forms, HAZMAT forms, and inventory transfers, while supporting handicapped customers within the POS checkout lanes. Small LCD displays utilized in the current environments can limit the effectiveness of the retail experience. The subject system provides a secondary smart tablet device ranging in size, preferably from about at least 10 inches to about 15 inches, and most preferably about 10 inches being most preferable. Additionally, the subject system provides rotation of the tablet up to at least 90 degrees forward and backward while docked in a fixed POS docking station, providing ease of operation for handicapped customers as well as handicapped store employees.

Instant portability is also provided by the subject system for daily inventory management tasks such as physical inventory, cycle counting, inventory receiving, store to store transfers, return to vendor, and product re-ticketing, while at the same time providing the ability for processing POS sales transactions via Wi-Fi and cellular communication or docked into the fixed POS docking station. Thus, transforming the mobile tablet gun system into a fixed POS terminal connected to the POS Store or Cloud Server via Ethernet on the store network, as well as other valuable features, to instantly migrate from the tablet gun's approximately 6" touchscreen LCD display to an approximately 10" touchscreen LCD display immediately upon docking. Through its own touchscreen LCD display, the subject system enables the tablet to be rotationally integrated through a pair of hinges, increasing the tablet gun's touchscreen LCD display from approximately 6 inches to approximately 10 inches. This is achieved without adding a secondary smart mobile tablet device while docked in the fixed POS station, no longer limiting the tablet by its LCD display size, which is typically an approximately 6 inch LCD display. This provides an advantage when a user is navigating "Enterprise Resource Planning" applications or "ERP Cloud" applications that are embedded with extensive data input, such as vendor special orders, HIPAA forms, HAZMAT forms and transfers of inventory. Or, furthermore, providing an advantage during outdoor operations where sunlight can play a role in the difficulty in viewing small LCD screens, such as theme parks and other outdoor vendor sales events through an additional low costed touchscreen LCD display.

By not only providing the "instant portability" for the mobile tablet gun system into the fixed POS station/docking station, the subject system also provides a significant increase in usable touchscreen LCD capability. The overall technology cost to manage the typical retail store is significantly reduced through use of the subject system by eliminating the need to acquire an expensive secondary smart mobile tablet device w/scanner. Customer service is also significantly increased due to the multi-function capability afforded by the unique combination of operations between the tablet gun and the docking station by way of the subject system, without a costly additional secondary mobile tablet or computing power of any kind.

Additionally, the subject system provides structural components that improve the tilting angle by increasing the "tilting" or rotational feature angle that allows the mobile tablet device to "rotate" forward and backward from the POS cashier to the customer. While currently, typical POS docking station are limited to a 30 degree tilt toward the cashier and a 30 degree tilt toward the customer, the subject system provides the ability to increase the tilting angle and rotation so that the viewing angle can accommodate handicap, limited in a wheelchair or smaller individuals or other unable to view the docked display from a standing position. By redesigning the armature that provides the "tilting" or rotational capability to allow for a 90 degree tilt back to the cashier and a 90 tilt forward to the customer the mobile tablet device docked in the subject POS docking station will be accessible for handicapped store personnel and customers restricted from standing upright at the POS checkout counter.

In one aspect, there is provided a point of sale (POS) docking station for interchangeably attaching and electronically coupling a mobile tablet gun system with mobile tablet device with a tablet display screen having an upper receiver for processing retail store POS sales transactions to a base form factor. The POS docking station comprises an upper housing assembly having an upper enclosure base and a tablet cradle enclosure with an upper board assembly comprising a secondary printed circuit board (PCB1) for interchangeably mounting and electronically communicating with the mobile tablet device. A lower housing assembly with a base plate having a top portion with a bar code scanner interface with button and a lower board assembly is provided. The lower board assembly comprises a primary printed circuit board (PCB2) adapted to operate with at least one USB, Ethernet, debugging Serial port, scan switch interface and/or an external power supply port. A secondary display screen is housed in a display enclosure that is hingedly attached to the tablet cradle enclosure of the upper housing assembly, wherein the secondary display screen is activated on when it is rotated over and parallel the tablet cradle enclosure when the secondary display screen is in use, and the secondary display screen is turned off when it is rotated down and perpendicular from the tablet cradle enclosure when the secondary display screen is not in use. A tilting and rotational mechanism is provided, connecting the lower housing assembly to the upper housing assembly adapted to rotate and tilt the upper housing assembly to change viewing orientation of the display screen. The secondary printed circuit board (PCB1) is connected to the primary printed circuit board (PCB2) through a custom interface cable operable to facilitate electrical communication between the POS docking station and the mobile tablet gun system with mobile tablet device. A USB, Ethernet, debugging Serial ports, scan switch interface and power supply port housed within the lower housing assembly are fully operable with the mobile tablet gun system with the mobile tablet device and can be connected to a variety of POS peripheral devices and other store systems peripheral devices.

In another aspect, there is provided one or more non-transitory computer readable media having instructions operable to enable a mobile tablet device to be mounted on a point of sale (POS) docking station in order to execute POS transactions and real-time daily chain store-level inventory management functions, comprising: a) electronically coupling the mobile tablet device within a tablet cradle enclosure of an upper housing assembly through a secondary printed circuit board (PCB1); b) initiating a bar code scanner and bar code scanner interface PCB in communication therewith located in a lower housing assembly of the POS docking station with a lower board assembly comprising a primary printed circuit board (PCB2) adapted to operate with at least one USB, Ethernet, debugging Serial port, scan switch interface and/or an external power supply port; c) activating a secondary display screen housed in a display enclosure hingedly attached to the tablet cradle enclosure of the upper housing assembly by rotating the secondary display screen over and parallel to the tablet cradle enclosure, the secondary display screen being turned off when it is rotated down and perpendicular from the tablet cradle enclosure when the secondary display screen is not in use; d) tilting and rotating the upper housing assembly of the POS docking station through a rotational mechanism to change viewing orientation of the display screen; and e) connecting the secondary printed circuit board (PCB1) to the primary printed circuit board (PCB2) through a custom interface cable operable to facilitate electrical communication between the POS docking station and the mobile tablet gun system with mobile tablet device.

BRIEF DESCRIPTION OF THE DRAWING

The invention will be more fully understood and further advantages will become apparent when reference is had to the following detailed description of the preferred embodiments of the invention and the accompanying drawings, in which:

FIG. 5 is a table, Table 1, of Connector 101 signals;

FIG. 6 is a table, Table 2, of Primary Electronics Printed Circuit Board Connectors (PCB2);

FIG. 11b is a side plan view of FIG. 11a;

FIG. 12c is a top plan view of the display enclosure;

FIG. 12d is a side plan view of the display enclosure;

FIG. 12e is a bottom view of the display enclosure;

FIG. 14a is an exploded top plan view of a steel slug adapted for use in assembling a POS docketing station;

FIG. 14b is an exploded side view of the steel slug;

FIG. 15a is a bottom side view of an embodiment of a display enclosure part I;

FIG. 15b is a top plan view of the display enclosure part I;

FIG. 15c is a first side view of the display enclosure part I;

FIG. 15d is a second side plan view of the display enclosure part I;

FIG. 15e is bottom plan view of the display enclosure part I;

FIG. 16c is a bottom side view of the display enclosure part II;

FIG. 16d is a side view of the display enclosure part II;

FIG. 16e is bottom plan view of the display enclosure part II;

FIG. 23a is a top side view of a base plate for the subject POS docking station assembly;

FIG. 23b is a side view of the base plate;

FIG. 23c is a bottom plan view of the base plate;

FIG. 23d is a bottom side view of the base plate;

FIG. 24a is a top side view of a cable cover for the subject POS docking station assembly;

FIG. 24b is a first side view of the cable cover plate;

FIG. 24c is a second side view of the cable cover;

FIG. 24d is a bottom plan view of the cable cover;

FIG. 24e is a bottom side view of the cable cover;

FIG. 24f is an end plan view of the cable cover;

FIG. 25a is a top plan view of a base cover for the subject POS docking station assembly;

FIG. 25b is a side view of the base cover;

FIG. 25c is a bottom plan view of the base cover;

FIG. 25d is a bottom side view of the base cover;

FIG. 26a is a top side view of an upper enclosure base for the subject POS docking station assembly;

FIG. 26b is a side view of the upper enclosure base;

FIG. 26c is a front plan view of the upper enclosure base;

DETAILED DESCRIPTION OF THE INVENTION

Figure 1:
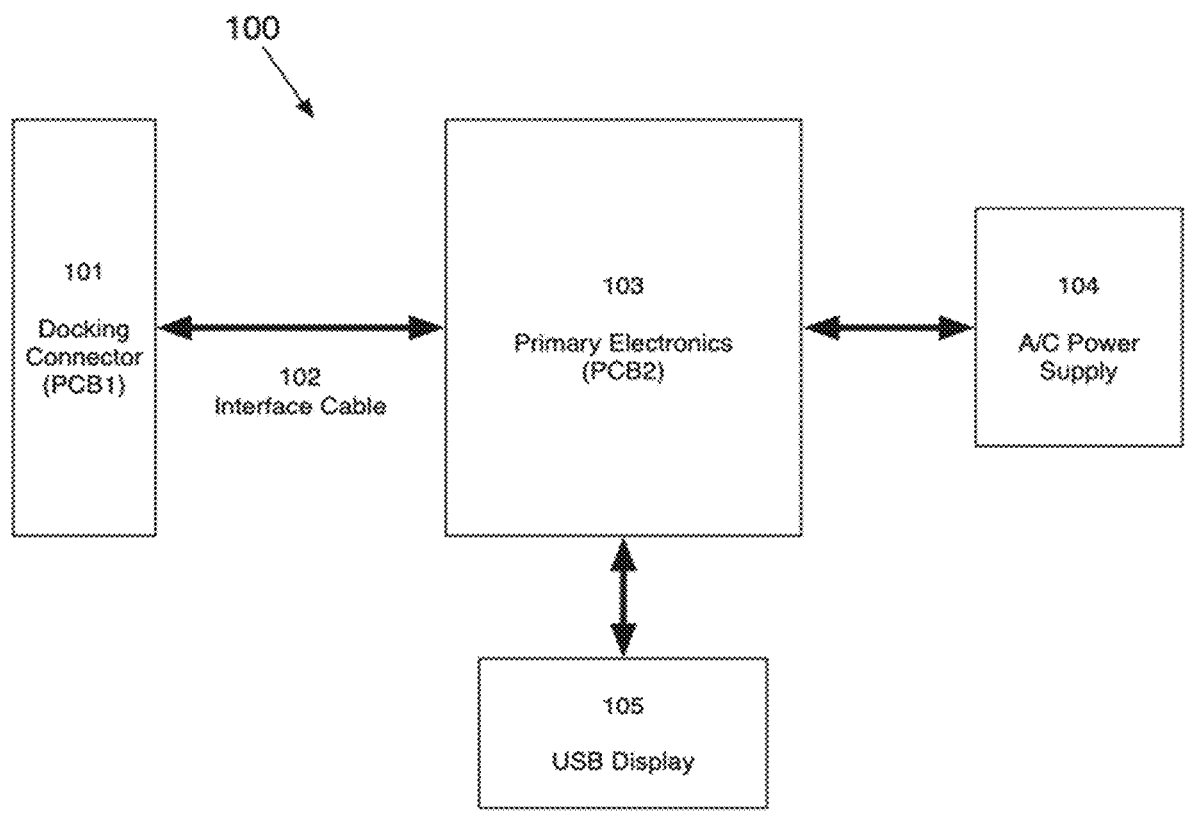
FIG. 1 is a block diagram illustrating the main electrical components of the subject tablet gun or mobile tablet docked within the fixed POS docking station.

The subject invention is directed toward a point of sale (POS) docking station, system and method, appointed to receive and electronically integrate a portable mobile device, including a mobile tablet gun with mobile tablet device, transforming it into a fixed point of sale (POS) terminal. Advantageously, the tablet gun, customized for use as a mobile store systems terminal, is transformed into an integrated fixed POS terminal while being docked into the subject fixed POS docking station. This transformation is instantaneous and is affected without consideration for any operation being performed on the mobile tablet gun system.

As used herein, the term "fixed" means a docking station wherein a portable mobile device is appointed to be docked or placed for charging, providing a docking base with access to a power supply, and to a wide variety of POS peripheral devices, preferably including an LCD touchscreen display and other auxiliary features that may be contemplated in the future. The docking station itself may be on a fixed countertop or on a mobile terminal or cart with wheels, for example.

The term "tablet gun", as used herein, means a mobile tablet gun system having a mobile POS and Enterprise Resource Planning applications for customer checkout/order fulfillment and real time in store inventory management for retail establishment, as disclosed by U.S. Pat. No. 8,856,033.

The term "Payment card processing device(s)" means card processing devices heretofore known and/or utilized in the payment card processing field, including, but not limited to, Magnetic Stripe Reader (MSR), computer card chip technology ("Europay, MasterCard, and Visa" (EMV), ancillary PIN entry device (PED) which can be used in conjunction with both the MSR and EMV readers to complete secured "PIN-based" (Personal Identification Number) customer payment transactions, Near Field Communication (NFC) communication protocols enabling two electronic devices, one of which is usually a portable device such as a smartphone, to establish communication by bringing them within 4 cm (2 in) of each other, and/or other "proximity card" technologies.

The system and method of the present invention provide technology that empowers sales associates to service their customers from a variety of form factors such as a fixed POS terminal, a Wi-Fi hand-held terminal, and a cellular hand-held terminal. With the unique feature of being able to migrate between those form factors without disruption to workflow or even a POS sales transaction. It can instantly connect and disconnect to specific POS peripheral hardware, whether Ethernet-based, Serial based, or USB based on the needs of the clerk/user as they attempt to satisfy their customer's needs by locating inventory desired by the customer without consideration to the physical location of the merchandise or leaving the customer to do so. Through the use of the subject system and methods, inventory can be found, and goods can be purchased anywhere, anytime and delivered wherever and whenever the consumer wants in a far more efficient and cost-effective manner than current industry standard retail systems can offer.

Under current systems and methods, typically, the consumer must travel to the location of the good (or order the good online through their personal device and wait for delivery or in-store pick-up). This adds an inconvenient step—that is, rather than allowing the sales associate to simply handle the purchase via the mobile tablet gun system, finding the item in the store, another store, the warehouse or special vendor order and delivering the goods conveniently to the customer, the customer must visit a competitors store or visit online retailers, such as Amazon, and have the goods shipped to their home. Not only is this aggravating and inconvenient to the customer, it may also be the deciding factor that discourages a customer from shopping at the brick and mortar store that failed to satisfy his/her needs in past visits. It is understood in the retail industry that eCommerce sales continue to rise, while foot traffic in brick and mortar stores continues to fall year after year.

Taking a deeper look into the macro trend of ever-increasing online sales and decreasing brick and mortar sales, it is clear that none of the heretofore systems and methods provide the ability for a retailer to utilize software and hardware that runs the entire store, ranging from real-time inventory management to POS sales transactions while moving between a fixed POS workstation, to a mobile POS device. Even still, while changing network topology and POS peripheral devices without user intervention or disruption of current transaction processing being performed by the user, all on one multi-functional mobile tablet device. The system, method, and devices herein provide this unique advantageous feature. The subject system and method, and devices implementing the same, provide the following advantages: 1) increased store employee productivity, 2) reduced technology cost and footprint, and 3) improved customer satisfaction, all of which, in turn, lead to an ensured return on investment (ROI) for the retail store operator.

Enterprise Resource Planning (ERP) Cloud integrates internal and external management information throughout an organization, embracing finance/accounting, manufacturing, sales and service, customer relationship management, etc. The ERP Cloud automates this activity with an integrated software application. The purpose of the ERP Cloud is to facilitate the flow of information between all business functions inside the boundaries of the organization and manage the connections to outside stakeholders. The ERP Cloud can run on a variety of computer hardware and network configurations, typically employing multiple databases as a repository for information. Examples of vendors who build industry-leading ERP Cloud systems include: JDA Software Group, Oracle, SAP, Microsoft, Epicor, etc. However, present systems do not provide the ability for a store employee at a physical store location to have direct mobile access to real-time inventory management and POS capability concurrently on one device.

The subject system and methods provide a fully functioning point of sale (POS) system for customer check-out of merchandise in a retail sales environment along with the ERP Cloud inventory and customer-specific data/fulfillment applications all running concurrently and instantly accessible by the store employee. Real-time mobile functionality is provided by the subject system and methods, preferably built around the JDA ERP Cloud (MMS) environment, leveraging current legacy store systems and accessing the current MMS iSeries environment. Through use of the subject system MMS iSeries environment, businesses can build their own cloud to provide mobile customer check-out/order fulfillment and real-time inventory management in the store through the mobile tablet gun system.

A tablet gun, specialized for use as a mobile POS terminal, is converted from its many mobile retail store systems operations into an integrated fixed POS terminal. The conversion is effected instantaneously, while the tablet gun is being docked into the fixed POS docking station, without consideration to previous operations being performed on the tablet gun. With all the many systemic attributes of the POS docking station including, 2 standard USB 4 port hubs, a powered USB 4 port hub, a 4 port Ethernet switch, external power for both powering the tablet gun and charging its batteries, a "Near Field Communication" (NFC) module for processing payment cards that support NFC and a PIN entry device for payment cards that require PIN entry, the POS docking station is a unique and powerful docking station that turns the tablet gun into a fully functioning fixed or semi-fixed POS terminal with the capability of attaching many different types of POS peripheral devices to it including a wide variety of Ethernet, USB or powered USB POS receipt printers, cash drawer, payment card payment terminals, weighted pricing scales, customer displays and a larger integrated touchscreen LCD display ranging from 10 inches to 15 inches. These POS docking station features collectively ensure it can effectively replace any industry-standard POS terminal without compromising the tablet gun from being used as both a mobile POS terminal and an Inventory Scanner Gun/Terminal.

The upper housing assembly is designed to house the tablet gun in a "cradle fashion" with a tablet cradle enclosure designed to fit snuggly around the tablet gun, providing stability and a look of integration. The upper housing assembly also has an extended "Tabletop" completely surrounding the tablet cradle enclosure for additional user comfort and hand support and a more thorough look of integration overall. This Tabletop extension of the cradle will preferably vary in length from one inch upwards to four inches. When inserted into the upper housing assembly, the top of the tablet gun is smooth and consistent with the "upper housing assembly's Tabletop" providing a consistent flush surface for both the user and the customer in operating the tablet gun screen user interface, giving them both an ergonomic design that affords the user to rest the bottom of their palm away from the touchscreen touchpoints while operating the touch screen LCD. This unique combination of docking the tablet gun into the upper housing assembly of the POS docking station instantly transforms the two into a singularly integrated "Fixed POS Terminal" while also providing a unique "tilting" feature that allows the upper housing assembly to rotate forwards ninety degrees and backward ninety degrees between the Cashier and the Customer as needed to complete typical POS customer sales transactions. For ease of extracting the tablet gun there are two finger slot recessions on each side of the long edge of the upper housing assembly. These two finger slot recessions located within the Tabletop facilitate quick and easy removal of the tablet gun.

The upper housing assembly preferably has two 10 pin electrical (spring-loaded) pogo pin connectors integrated with a secondary printed circuit board (PCB1) and are located within the base of the "cradle" and are connected to the primary printed circuit board (PCB2) through a Custom Interface Cable, which facilitates the electrical connection between the POS docking station and the tablet gun. The connection is made as the tablet gun is docked into the upper housing assembly and an electrical connection is made between two matched 10 pin electrical plates located on the bottom of the Upper Receiver of the tablet gun with two 10 pin electrical pogo pin connectors on the base of the upper housing assembly, thus providing continuous electrical connection between them and the PCB2 electronics housed within the base housing assembly. Once this electrical connection is made, all USB ports, powered USB ports, Ethernet ports and power port housed within the base housing assembly are fully accessible to the tablet gun's Upper Receiver and can be connected to a variety of POS peripheral devices such as USB and Ethernet receipt printers with attached cash drawers, USB Barcode Scanners, USB and Ethernet Payment Terminals, USB and Ethernet Weighted Scales, USB and Ethernet Coupon Printers and other store systems peripheral devices that could provide additional functionality and enhanced value to the POS docking station operating within a retail establishment.

In order to secure the tablet gun within the POS docking station upper housing assembly, there are four magnets located toward each corner of the bottom of the upper housing assembly. These magnets are paired with four magnetic slugs installed in matching locations on the underside of the Upper Receiver of the tablet gun. When docked within the POS docking station, the magnets connect with the magnetic slugs and ensure all electrical connections are consistently maintained with no disruption or "bouncing" of the electrical connectors during operation where rotation and pivoting of the upper housing assembly is regularly performed and potentially disrupt said electrical connections.

In the event the tablet gun display screen, measuring approximately six inches diagonally, is not sufficient in size for a particular retail store operation, the POS docking station upper housing assembly has an integrated touchscreen LCD display ranging in size from 10 inches to 15 inches diagonally. This integrated touchscreen LCD display is attached to the POS docking station via a pair of hinges integrated within the POS docking station Upper Housing which serve to rotate the POS docking station integrated LCD display directly on top of the tablet gun while inserted within the POS docking station Upper Housing. Once the LCD display is rotated and fixed onto the POS docking station Upper Housing Tabletop by magnets or another type of fastener or latch, the tablet gun display is systemically turned off and the POS docking station touchscreen LCD display is electrically connected to the tablet gun and becomes its primary display while it is housed within the POS docking station. When not in use, the POS docking station LCD display can be rotated 270 degrees down and away from the POS docking station Upper Housing Tabletop in a secure "stowed" position. As a backup feature, the tablet gun's integrated touchscreen LCD display is fully functional when the POS docking station LCD display is rotated off the POS docking station Upper Housing Tabletop and in its stowed position.

Additionally, the upper housing assembly has a structural feature that allows the MSR and EMV payment card reader devices of the tablet gun to operate while docked in the POS docking station, allowing a payment card to "swipe" through the MSR payment card reader or be "dipped" into the EMV reader without delay or restriction. As an optional feature, it contemplated that the MSR and EMV payment card readers can access a customer PIN entry device (PED), which may be required to complete certain payment card transactions. The PED is integrated within the top of the base housing assembly of the fixed POS docking station and accessed via the custom USB wiring harness. Payment card processing devices contemplated include those heretofore known and/or utilized in the payment card processing field, including, but not limited to, Magnetic Stripe Reader (MSR), computer card chip technology ("Europay, MasterCard, and Visa" (EMV), and Near Field Communication (NFC) communication protocols enabling two electronic devices, one of which is usually a portable device such as a smartphone, a "chip embedded" payment card, such as all-in-one cards or "smart cards", or other industry-standard NFC payment devices that are presently disclosed and utilized and/or may be developed over time, to establish communication by bringing them within a set range of one another, such as for non-limiting example about 4 cm (1.57") within range of each other.

The upper housing assembly also accommodates the operation of a USB barcode scanner/reader integrated within the tablet gun Pistol Grip and is activated for scanning a barcode through a motion sensor integrated within the USB barcode scanner/reader. There is an opening directly under the "tray" built into the upper housing assembly used for the payment card processing device operation and is large enough to allow the barcode scanner installed on the tablet gun to properly operate the barcode scanner while the tablet gun is docked in the POS docking station.

The tablet gun itself is encased in a hardened case/shell design with a removable rotational "breakaway" feature engineered for "portrait" and "landscape" views of the mobile tablet device while protecting the device against damage during drops and/or high impact, especially while attached to the "pistol grip" base form factor. The mobile tablet device includes System Apps and Firmware integrated within its Primary PCB of the subject system and method and is constructed having installed Retail Apps networked to corporate level software that includes the subject ERP Cloud system and POS Store or Cloud Server associated with a user of the mobile tablet gun system and retailer's data and typically run concurrently. The Retail Apps are connected to the POS Store or Cloud Server and ERP Cloud system via a combination of Ethernet, Wi-Fi or wireless cellular connectivity, automatically switching between Ethernet and Wi-Fi network connectivity, but requiring user intervention to make a secured network connection when using a wireless cellular network carrier.

The system comprises a mobile tablet device (upper receiver) preferably having an approximately 6" diagonal LCD display, which can be attached to a variety of base form factors, through a base mount universal receiver having a removable, rotational coupling and a breakaway feature for durability purposes in the event the device is dropped or sustains a significant impact. The mobile tablet gun system has a custom "hot-swappable" primary lithium-ion battery and a custom lithium-ion backup battery integrated within the mobile tablet device, a USB payment card reader supporting both a magnetic stripe reader (MSR) and a Europay MasterCard Visa (EMV) payment card reader mounted on one edge of the mobile tablet device. A Near Field Communications (NFC) module for processing payment cards is proposed for future use as the chain retail industry acceptance becomes more prevalent. A USB barcode scanner input device incorporated within the "pistol grip" in one base form factor, is operable by pressing a trigger, also incorporated within the "pistol grip." The mobile tablet gun system through its specialized and uniquely developed hardware platform and its multiple interchangeable base form factors, which can operate both standard and custom Retail Apps allowing store personnel to quickly and easily migrate between POS customer sales transactions, store Back Office applications, ERP Cloud-based inventory and Customer Fulfillment applications without work loss or delay as the store personnel can "hotkey" between these advanced consortium of Retail Apps. Ease of use and increased customer service levels are further enhanced as the mobile tablet gun system can instantly and seamlessly migrate between network architectures including Ethernet, Wi-Fi, and Cellular, as well as technically connecting and disconnecting between Ethernet, Serial, USB, Wi-Fi and Bluetooth POS peripheral devices controlled by Custom Configuration settings, as warranted and desired by the retail enterprise resulting in an unprecedented level of both store systems hardware interoperability and ERP Cloud, Back Office and POS software integration. Collectively, this unique combination of custom-developed Hardware, Firmware, Systems Software and Retail Apps, significantly enhance customer service levels while also reducing the overall technology "footprint" and cost associated with managing a chain of retail stores.

Uniquely, the subject system and method provides the ability to use a mobile tablet gun system in a store to yield the following benefits: 1) it allows sales associates to service customers in new ways that deepen customer loyalty and increase wallet share; 2) it provides inventory management for increased accuracy, efficiency, and accountability while providing real-time access to corporate inventory data; 3) it eliminates workflow in the back office and keeps the retailer's sales associates on the sales floor; and 4) it results in higher customer satisfaction through increased face to face interaction, and a higher fill rate for customer desired inventory, which, in turn, ensures the mobile tablet gun system will provide significant ROI to the retail store operator. The subject POS mobile tablet gun docking system provides an improved system providing a full gamut of retail operations, including outdoor POS operations, data entry forms for daily POS transactions (such as vendor special orders), HIPAA forms, HAZMAT forms, and inventory transfers. The subject improved system supports handicapped customers within the POS checkout lanes. A larger LCD touchscreen display is provided, via a secondary smart tablet device, for integration with the subject POS mobile table gun docking station assembly, addressing issues resultant from small LCD displays utilized in current environments which have been found to limit the effectiveness of the retail experience. The secondary smart tablet device ranges in size, preferably from about at least 10 inches to about 15 inches, and most preferably about 10 inches being most preferable, with electronic communication and capability operated through the subject POS docking station.

Additionally, the subject POS docking station provides rotation of the tablet up to at least 90 degrees forward and backward while docked, providing ease of operation for handicapped customers as well as handicapped store employees.

Advantageously, the subject system, method, and devices of the present invention allow a sales associate using a mobile tablet gun system to migrate from being part of a fixed POS workstation to becoming a completely mobile POS device anywhere in the store and physically beyond the store without work-flow disruption either in ERP Cloud transactions, Corporate Back Office transactions or Customer POS transactions migrating between them all without delay or loss of uncompleted tasks within each Specialized Retail App including inventory management tasks such as: a) Daily Cycle Counting and Physical Inventory, b) Receiving and Returns, c) Store Transfers, d) Item Checking, e) Re-Ticketing, etc. Such tasks are performed in real-time within the ERP Cloud and are all visible chain-wide. Through use of the subject system and method, a sales associate can perform the following from a mobile tablet gun system: i) sell "out of stock" merchandise available in the warehouse, another store or from a vendor; ii) create a purchase order (PO) or transfer within MMS and track that item transfer on the web; iii) sell merchandise from their e-commerce site; iv) combat "Showrooming" by providing customers real-time competitive merchandise and pricing information, allowing staff to match prices and satisfy their customer's demands by exceeding expectations within a brick and mortar store and even beyond its walls.

The fixed POS docking station coupled with the tablet gun represents the forefront of retail stores. For decades retail stores have been designed around cash-wrap POS terminals; however, as mobile devices mature and harden, the need for fully fixed POS register stations and inventory scan guns/terminals running limited custom operating systems and inventory applications is both in decline and cost-ineffective as they are very expensive and locked into outdated technology. Based on current trends, legacy POS terminals and inventory scan guns/terminals are on their way to becoming obsolete. Although mobile consumer devices appear to have some potential to fill this gap, these devices typically lack industrial durability, hardware integration, ERP Cloud integration and comprehensive POS to Back Office integrated functionality running on one cost-effective mobile tablet device.

There are at least seven primary functional features of the subject fixed POS docking station that in combination, provide improvements and unique capability and value that no other conventional docking station provides. The first primary attribute is simplicity in its operation. The subject fixed POS docking station enables the user to simply release/drop the mobile tablet gun system down into the upper housing assembly and the integrated fixed POS docking station is immediately available to the user to either continue "work in progress" or begin a new task or start entirely new store systems application. The second primary feature is the exact reversal of the first primary attribute. The user simply pulls the mobile tablet gun system out of the upper housing assembly and the mobile tablet gun system is immediately available for wireless operation via Wi-Fi or cellular means of networked communication. The third primary feature constitutes the provision of electronic access to additional USB, Ethernet and Serial peripheral POS devices directly to the mobile tablet gun system that has been inserted into the fixed POS docking station which, additional devices are instantly available through the tablet gun once it is docked within the POS docking station without user intervention. The fourth primary feature comprises an overall rugged and durable fixed POS docking station design with a focus on "simplicity" and "handicap availability" for both store clerks and customers during user/customer operation that will ensure that the integrated fixed POS docking station, comprising the mobile tablet gun system and the fixed POS docking station, can withstand constant daily use within a typical store selling floor environment for the life of the device while also accommodating handicapped store clerks or customers. The fifth primary feature constitutes the addition of an integrated touchscreen LCD display, preferably 10 inches to 15 inches diagonally, which rotates over the docked tablet gun and is secured on the "POS docking station tabletop", thus providing the user with a larger touchscreen LCD user interface when the tablet gun is docked within the POS docking station. The sixth primary feature expands the tablet gun's payment card processing options to include near field communications (NFC) methods of payment through an integrated NFC module located on the top of the base housing assembly. The seventh primary feature constitutes the provision of charging power to the mobile tablet gun system primary and backup battery packs without impact to the ongoing operational capabilities of the mobile tablet gun system during charging. The combination of these seven primary features makes the subject fixed POS docking station even more valuable and marks improvements over other docking stations, devices and systems.

To use the POS docking station in conjunction with the tablet gun (first primary feature), the user simply "drops/releases" the mobile tablet gun system down into the upper housing assembly and the mobile tablet gun system is guided or channeled into the upper housing assembly to fit snugly in the "cradle" with no more than gravitational force exercised and a combination of four magnets to maintain a secure docking connection. Once cradled, the mobile tablet gun system is preferably physically matched to two spring-loaded 10 pin electrical pogo pin connectors integrated within the upper housing assembly with two corresponding 10 pin electrical plates integrated on the bottom of the mobile tablet gun system. The electrical connection between the two 10 pin electrical pogo pin connectors and the two corresponding 10 pin electrical plates becomes sturdier by using a combination of four magnets integrated within close proximity of each corner on the bottom of the upper housing assembly. The user then rotates the POS docking station's touchscreen LCD display, attached to the Upper Housing of the POS docking station by a pair of dual hinges, from its docked position perpendicular to the base housing of the POS docking station, over the docked tablet gun and resting flush on top the tabletop and over the tablet gun. The LCD display is then secured to the tabletop preferably by a pair of magnets. Once the mobile tablet gun system has been inserted into the upper housing assembly and the secondary touchscreen LCD has been "docked" on the Tabletop, the newly "integrated" fixed POS terminal is immediately available to the user, including any POS peripheral devices that may be attached to the POS docking station. At this point, the user can then resume "work in progress" within open applications in use when the tablet gun was docked or open new applications and begin new transactions as needed.

The second primary feature is the exact reversal of the first primary feature. The user simply extracts the tablet gun out of the upper housing assembly using their thumb and index finger inserted into the provided "recesses" or "finger holes" on each side of the longest edge of the upper housing assembly. The tablet gun is immediately available to the user to either continue working within the application without disruption or delay previously in use while docked or open new applications and start new tasks as may be needed at the time. Upon removal of the mobile tablet gun system, the device is now running on its own batteries and operating over Wi-Fi or Cellular means of networked connectivity without any operational disruption whatsoever.

The third primary feature provides electronic access directly from the mobile tablet gun system upon insertion into the fixed POS docking station to additional USB and Ethernet POS peripheral devices common to industry-standard fixed POS terminals. While operating as a mobile device, the tablet gun is limited in its capability to operate peripheral POS hardware; consequently, most peripheral devices such as POS receipt printers, POS payment terminals, weighted scales, coupon printers, flat-bed barcode scanners, additional handheld scanners and customer displays are only available via hard wired Ethernet connection to a store network. Fortunately, once the tablet gun is docked within the fixed POS docking station, the tablet gun has instant connectivity to seven USB ports, comprising of four standard 5V USB ports, two 12V powered USB ports and one 24V powered USB port, 4 10/100 Ethernet ports and an NFC module for "tap and go" payment processing. Consequently, the mobile tablet gun system can now access and support a wide variety of POS peripheral hardware only typical to fixed POS terminals such as industry-standard POS Receipt Printers, POS Payment Terminals, Weighted Scales, Coupon Printers, Flat-Bed Barcode Scanners, Additional Hand Held Scanners, Customer Displays and other POS peripheral hardware as may be contemplated in the future.

The fourth primary feature is an overall rugged and durable fixed POS docking station design that is easy to use while also providing 180 degrees of screen rotation for handicapped store clerks and customers restricted to a wheelchair and unable to stand over a POS terminal located on a typical checkout counter. The combination of accessibility and durability provides and ensures that the integrated Fixed POS Terminal, made up of the tablet gun and POS docking station, can withstand constant daily use within a typical store selling floor environment for the life of the device, which is expected to be up to as long as 5 to 7 years and beyond.

The fifth primary feature constitutes the addition of an integrated (secondary) touchscreen LCD display, preferably 10 inches to 15 inches diagonally, which rotates over the docked tablet gun through a pair of hinges connected to both the secondary LCD display housing and to the upper housing assembly of the POS docking station. When not in use, the POS docking station LCD display is rotated down and away from the POS docking station tabletop to rest perpendicular to the base housing; and is simply rotated over the tablet gun, coming to rest on top of the POS docking station tabletop, thus activating the secondary POS docking station display and turning off the primary tablet gun display. The end result is a much larger touchscreen LCD user interface when the tablet gun is docked within the POS docking station.

The sixth primary feature expands the tablet gun's payment card processing options to include near field communications (NFC) methods of payment such as Apple Pay, Android Pay, eWallets and EMV chip cards through an integrated NFC module located on the top of the base housing assembly and is easily accessed by the customer by simply "tapping" their smartphone or EMV chip card on top of the NFC module which, in turn, verifies and processes the customer's transaction payment and completes the sales transaction.

The seventh primary feature provides charging power to the tablet gun's primary and secondary battery packs without impact to the operational capabilities of either device. Inasmuch as the tablet gun is a mobile POS/generic store systems terminal using Wi-Fi or Cellular means of networked communication within its operating environment, the tablet gun operates using internal battery sources. As each device depletes its battery charge, it is important in a fluid retail environment that the tablet gun can be docked within the fixed POS docking station and continue to perform its typical store systems application operations as needed while recharging the mobile tablet gun system's primary and backup batteries simultaneously.

Operationally, the mobile tablet gun system can be converted from a mobile store systems device, operating free from a fixed terminal or workstation via Wi-Fi or Cellular means of communication, to a Fixed POS Terminal simply by inserting the mobile tablet gun system into the upper housing assembly of the POS docking station. Once inserted, the tablet gun has a number of additional POS peripheral devices it can access through the electrical (EE) design of the fixed POS docking station. Those additional systemic capabilities are provided through specific electronic components including four 10/100 Ethernet ports, seven USB ports, comprised of four standard 5V USB ports, two 12V powered USB ports and one 24V powered USB port available to the mobile tablet gun system.

The electrical connectivity between the tablet gun and the fixed POS docking station is preferably made through an integrated secondary printed circuit board (PCB1) and two 10 pin electrical pogo pin connectors mounted within the upper housing assembly with two 10 pin electrical connection points and two matching electrical plates each with 10 individual contacts mounted on the underside of the tablet gun. To ensure a stable and consistent electrical connection is made each and every time with the mobile tablet gun system, there are four magnets mounted at each corner on the bottom of the upper housing assembly and four corresponding magnetic slugs on each corner of the underside of the Upper Receiver of the mobile tablet gun system.

The upper housing assembly of the POS docking station has several key features including durability, desirability, and ease of use thus providing years of valuable operation. Ease of use and desirability can be found in the integrated (secondary) touchscreen LCD display. Given the tablet gun comes with a touchscreen display slightly below six inches diagonally, the additional touchscreen LCD display, preferably ten inches diagonally, integrated within the upper housing assembly of the POS docking station ensures POS customer transaction are easier and faster to process making the fixed POS docking station even more valuable. Further the Upper Housing is designed to completely encase the tablet gun with durable injection-molded plastic for physical protection while also having an integrated fan to ensure the tablet gun and the POS docking station touchscreen LCD display remain within its thermal temperature operating range while docked.

The fixed POS docking station has a base housing assembly that preferably ranges from 8 inches to 14 inches front to back, 8 inches to 14 inches left to right and stands 1 to 3 inches in height. The size of the base housing assembly directly correlates to the size of the mobile tablet gun system or stand-alone mobile tablet that will be used in the upper housing assembly. The larger and heavier the mobile device used in the upper housing assembly, the bigger the base housing assembly needs to be for overall balance and stability. The base housing assembly has two "risers" triangularly shaped similar to a "playground swing-set". Each riser is located on either end of the long side of the base housing assembly and acts as the "pivot point" for the upper housing assembly with the upper housing assembly being the swing between the two risers. This unique design allows the upper housing assembly to rotate 90 degrees toward the store clerk and 90 degrees toward to customer (away from the clerk) in a balanced and controlled fashion. It is also the key design feature that enables handicapped clerks and patrons alike restricted to wheel chairs to be able to operate the POS docking station with no more effort than a non-handicapped user as the LCD display can be viewed and operated from a person restricted in a wheelchair with the POS docking station installed on a typical 30" to 36" retail countertop without infringing normal operation. This is accomplished through a uniquely designed rotation mechanism that allows free rotational movement 30 degrees bilaterally toward or away from the store clerk; however, with additional user force/effort, the upper housing assembly will continue to rotate 90 degrees bilaterally toward or away from the store clerk.

Inside the base housing assembly resides a variety of electrical components. These electrical components are all integrated into the primary printed circuit board (PCB2). Integrated within the PCB2 are the following electrical components: A 10/100 Ethernet Switch with 4 external ports and two USB Switches totaling eight (8) external ports.

In further electrical (EE) detail, the fixed POS docking station is an exemplary embodiment of a method for "docking" the mobile tablet gun system for recharging purposes, as well as to break out signals from the mobile tablet gun system and connect peripheral devices and its integrated 10" to 15" touchscreen LCD display in a manner such as to create a fully functional POS system. In order to accomplish these goals, the fixed POS docking station embodies a number of connectors, cables, and electronics, in a custom enclosure that accommodates the unique form factor of the fixed POS docking station.

Figure 2:
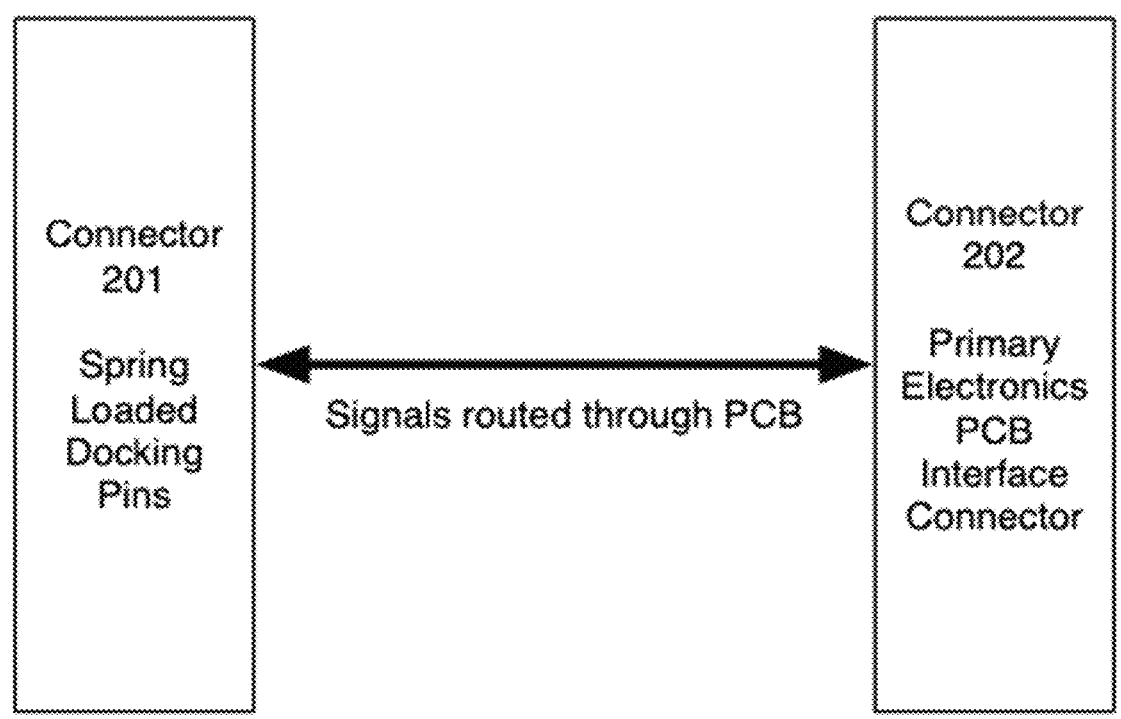
FIG. 2 is a block diagram illustrating the docking connector printed circuit board (PCB1) of FIG. 1.
Figure 3:
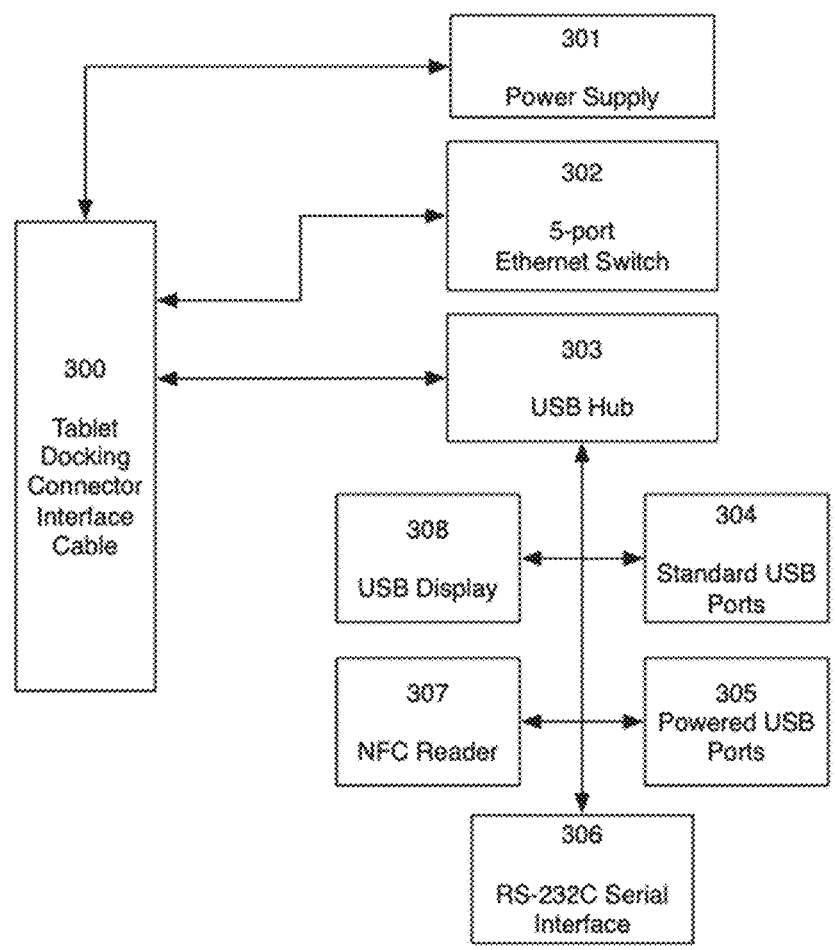
FIG. 3 is a block diagram illustrating the primary electronics printed circuit board (PCB2) of FIG. 1.
Figure 4:
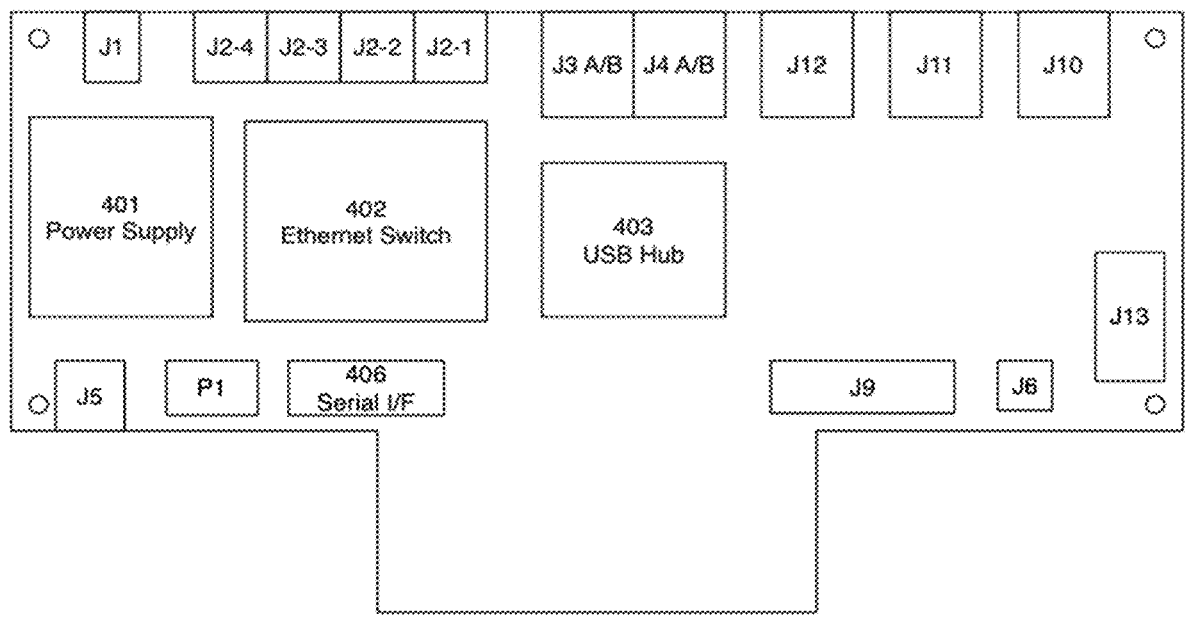
FIG. 4 is a schematic showing the primary electronics printed circuit board (PCB2) layout.

FIG. 1 shows a block diagram of the main electrical components of a tablet gun or mobile tablet docked within a fixed POS docking station, shown generally at 100. FIG. 2 illustrates a block diagram of the docking connector printed circuit board (PCB1) of FIG. 1. FIG. 3 illustrates a block diagram of the primary electronics printed circuit board (PCB2) of FIG. 1. FIG. 4 illustrates a schematic showing the primary electronics printed circuit board (PCB2) layout. FIG. 5 illustrates a table, Table 1, of Connector 101 signals. FIG. 6 illustrates a table, Table 2, of Primary Electronics Printed Circuit Board Connectors (PCB2).

Referring to FIGS. 1-6, the fixed POS docking station functionality is provided by a Docking Connector Interface Secondary Printed Circuit Board (PCB1) shown as in FIG. 1 at 101, having a Custom Interface Cable 102 interfacing with a Primary Printed Circuit Board (PCB2) 103. An external power supply is shown at 104 and an external USB display is shown at 105.

The PCB1 interface 101 provides the primary direct electrical interface to the tablet gun when it is inserted into the fixed POS docking station. In order to do this, PCB1 utilizes a set of spring-loaded electrical pogo pins, shown in FIG. 2 at 201, which mate with matching electrical contacts on the mobile tablet gun system. These pins carry power to the mobile tablet gun system, as well as USB data signals, Ethernet data signals, RS-232C serial data signals, dock detection signals, magnetic stripe reader (MSR) data signals, and external scan button signals. The I/O carried on the connector is listed in Table 1 of FIG. 5. Signals are carried using routed copper traces on PCB1 from the pogo pin connector 201 through the circuitry of PCB 1to the Custom Interface Cable Connector 202, which allows attachment of the Custom Interface Cable 102, FIG. 1, which connects PCB1 101, FIG. 1 to PCB2 103.

The fixed POS docking station Interface Cable 102, FIG. 1, consists of a Custom Interface Cable which carries signals from PCB1 101 to PCB2 103. All signals from the mobile tablet gun system are carried to PCB2 103 through this Custom Interface Cable. The cable is designed with flexibility and a protective cable sleeve given the upper housing assembly can move on one or two pivot points in its normal operation.

PCB2 103 breaks out all signals from the Custom Interface Cable 102 and electrically connects the mobile tablet gun system to the various electrical interface components of the fixed POS docking station. As illustrated by way of FIG. 3, these electrical interface components consist of a power supply 301, an onboard Ethernet switch 302, three onboard four-port USB hubs 303, four standard USB ports 304, three powered USB ports 305, an RS-232C asynchronous serial port interface 306, a USB NFC reader 307, and a USB display 308.

FIG. 4 shows a typical physical layout of an exemplary implementation of the fixed POS docking station primary electronics PCB2. PCB2 provides a number of connectors in order to interface with both the Custom Interface Cable 102 of FIG. 1 and external devices that are common to a retail store systems POS environment. These external connectors are shown in FIG. 4, and are labeled J1 through J13, and are described in Table 2, set forth as FIG. 6.

The Power Supply 401 of FIG. 4 receives input power from the AC electrical grid through an input power connector J1 and produces DC power at various voltage levels as appropriate to the mobile tablet gun system and to the electronics devices comprising PCB2. The AC main power can optionally be stepped down to lower DC voltages by an external power supply 104 (FIG. 1). Output power from the power supply 401 is distributed through the copper layers of PCB2 to the Custom Interface Cable connector J9 and routed to the custom interface cable 102 (FIG. 1), and to the various electronic components on PCB1.

The Ethernet Switch 402 consists of various components comprising a five (5) port Ethernet switch, with one port connected to the mobile tablet gun system via the Custom Interface Cable connector J9 and the additional four (4) ports being provided for connection of the POS terminal components and other network devices via the 4 port Ethernet port connectors (FIG. 4, J2-1, J2-2, J2-3, J2-4), which is a 4 port Ethernet connector jack. The Ethernet switch 402 acts as a general-purpose network switch for POS terminal components even when the tablet gun is not docked in the fixed POS docking station. This allows for the connection of other networking components that might need to function even when the mobile tablet gun system is not docked within the fixed POS docking station.

The USB hub 403 consists of multiple devices that collectively comprise three 4 port USB hub controllers, including a USB power controller and 11 USB ports. The external USB ports are made available via dual-USB jacks, J3 and J4, one 24V USB jack J10 and two 12V USB jacks J11 and J12, for connection of external POS USB peripherals and other USB devices. Internal USB ports are made available for connection to an NFC reader via J5, and connection to an external USB display via J13. USB connectivity to the mobile tablet gun system on the USB hub host port is through USB connector J9. A connection to a cooling fan is provided via J6. When the mobile tablet gun system is docked, the hub detects the presence of the mobile tablet gun system as the USB master device, and powers up the USB ports and any attached USB peripherals. These USB peripherals may be integrated within the tablet gun, as shown generally in FIGS. 1-22, or may be in communication through a separate unit such as fixed POS docking station 34002 having USB connectivity, as shown generally in FIGS. 34-36. USB peripherals preferably include, alone or in combination, a barcode scanner, MSR and/or EMV payment card readers which have direct USB access to a PIN Entry Device (PED) located within fixed POS docking station 34002 and a Near Field Communications (NFC) reader through a specialized universal serial bus wiring harness. In the absence of the mobile tablet gun system, the USB devices may be powered down to conserve power.

The Serial Interface 406 consists of logic to connect the mobile tablet gun system via the Custom Interface Cable connector J9 to an RS-232C Asynchronous serial port P1, which allows the mobile tablet gun system to connect to RS-232C devices such as printers and modems, while residing in the fixed POS docking station.

Figure 7:
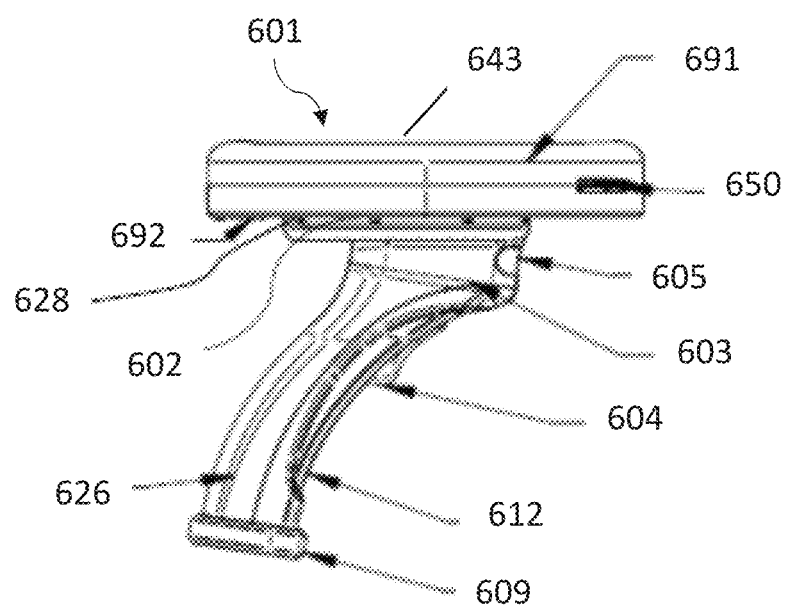
FIG. 7 is a side view of an embodiment of a mobile tablet gun with a mobile tablet docked through a base mount universal receiver to a pistol grip base housing adapted to be mounted within the subject docking station.

FIG. 7 is a side view of an embodiment of a mobile tablet gun with a mobile tablet device mounted through a base mount universal receiver to a pistol grip base housing, which in turn is adapted to be mounted within the subject POS docking station. Generally, a mobile tablet device 601 is removably mounted through a base mount universal receiver having a removable, rotational coupling on a top wall 602 of a base form factor, herein shown as a tablet gun 603, via rotational coupling through a rotation stopping plate 628, forming a tablet gun with mobile tablet device system. The tablet gun with mobile tablet device system is, in turn, adapted to be mounted within the subject POS docking station. Mobile tablet device 601 includes a bottom housing 692 and a top housing 691, preferably including about a 5.7" display 643 with glass and capacitive touch. The pistol grip base housing 603 is preferably constructed having a front grip 612 mated with a rear grip 626 with a trigger 604, which activates a barcode scanner 605 having a bar code scanner lens. Rear grip 626 has top wall 602 with a rotational coupling unit integrated therein and a lanyard assembly 609 located on the bottom thereof forming an integral unilateral unit/one-piece unit. Magnetic stripe reader (MSR) 650 is integrated with a front sidewall, short edge, of the mobile tablet device 601 for executing payment card transactions. Europay, MasterCard and Visa (EMV) chip technology, are preferably integrated with a front sidewall under the MSR 650 on the short edge of the mobile tablet device for executing transactions.

A plurality of applications is present in the mobile tablet device display screen. Generally, the mobile tablet device includes a ~5.7" display with glass and capacitive touch. Preferably, the mobile tablet device has a 6" to 7" (approx.) diagonal LCD touchscreen display. The mobile tablet device preferably has System Apps and Firmware integrated within the Primary PCB running on Microsoft Windows OS, currently known as Windows 10, attachable to multiple base form factors through the base mount universal receiver having removable, rotational coupling with a breakaway feature in the event of a significant forceful impact. In another embodiment, mobile tablet device is integrated with System Apps and Firmware integrated within the Primary PCB running on Microsoft Windows OS currently known as Windows 10 with the same Retail Apps executable (EXE) files that run on industry-standard tablets, laptops and desktops and requiring no additional user training to operate the mobile tablet device. Alternatively, mobile table device System Apps and Firmware integrated within the Primary PCB running on Microsoft Windows OS, currently known as Windows 10, provides typical features found in a 5" to 6" diagonal industry-standard mobile phone such as digital screen rotational, "pop up" keyboard and hot-swappable USB and Bluetooth devices.

In yet another embodiment, the mobile table device includes System Apps and Firmware integrated within the Primary PCB running on Microsoft Windows OS, currently known as Windows 10, operating on a Mobile Industry Processor Interface (MIPI) video signal interface, preferably based 6" to 7" (approx.) LCD touchscreen display powered by an Intel Atom dual-core processor designed for use with a Low Voltage Display Signal (LVDS) video signal interface based LCD touchscreen display. In another embodiment, the mobile tablet device is capable of receiving remote Windows Updates substantially the same as an industry-standard tablet, laptop or desktop POS terminal can. Preferably, the mobile tablet device includes Ethernet, Wi-Fi, and/or wireless communicative capability to the POS Store or Cloud Server and the ERP Cloud system in a retail store while docked in the subject POS docking station (trademark: POSiDock™).

The mobile tablet device preferably includes a wide variety of specialized systemic functions including: Accelerometer control for screen orientation by application, battery and processor temperature monitoring, color-coded battery power metering and charging schemas for primary and backup lithium-ion battery packs, processor "sleep mode" management for optimizing battery life and quick return of system availability, Advanced Configuration and Power Interface (ACPI) BIOS integration from Intel Atom Processor to Windows 10 OS. The mobile tablet device additionally preferably includes systemic capacity to integrate an Intel Atom Processor Chip Set using a Low Voltage Differential Signal (LVDS) video signal interface to a Mobile Industry Processing Interface (MIPI) video signal interface-based LCD touchscreen display through its Firmware and Primary PCB. The mobile tablet device is capable of commanding and controlling a USB barcode scanner input device having a scanner trigger for activating a scan operation by an employee of a retail establishment and retrieving an inventory item for wide variety of Retail App functions and processes. Mobile tablet device also includes an EMV/MSR reader for processing customer payment card data by an employee or customer of a retail establishment, communicating with a payment card gateway to process customer payment card data through the proper secured bank card processor via a PCI certified network, and obtains detailed information of the merchandise scanned, its inventory, selling price electronic and physical coupons, promotions, and customer loyalty data available.

There are a number of specifically designed programmed applications that allow the mobile tablet device to command the USB input devices through the specialized universal serial bus wiring harness to perform various functions typical to scanner operations and EMV/MSR reader operations. Running of the specially programmed mobile POS application, StoreMS Mobile™ is initiated and a command is sent to the FIRMWARE to acquire a barcode scan. The mobile tablet device in this mode is ready to receive the barcode data from the USB scanner input device and communicates with the POS Store or Cloud Server at the retail facility and the corporate ERP system to obtain specific product information such as, product availability within the store and chain, price and any promotions available, available physical and electronic coupons and customer loyalty information. The employee of the retail organization presents the data that is related to the particular item of interest to the customer. When the customer decides to purchase the particular item scanned, the employee of the retail organization uses the mobile POS application to process the sales transaction, if needed for shipping, pertinent customer information is taken or their records are updated if they are already a loyalty rewards customer. At tender, this POS transaction can open the cash drawer wirelessly for cash transactions and can also launch a request for processing the sale using a customer payment card. The customer's payment card is dipped or swiped via the EMV/MSR reader input device, which is located on the short edge of the mobile tablet device. All pertinent customer payment card data is encrypted by the EMV/MSR reader and the FIRMWARE communicates the encrypted data through the specialized universal serial bus wiring harness to the mobile tablet device.

The mobile POS application, StoreMS Mobile™, present in the mobile tablet device communicates all pertinent customer payment card data, using a PCI compliant encrypted Ethernet, Wi-Fi connection or wireless cellular connection, to the POS Store or Cloud Server. The POS Store or Cloud Server contacts the bank card processor through a PCI certified network connection for payment card authorization for the purchase. If the purchase is authorized, this information is sent to the mobile tablet device display screen for customer signature using an integrated signature capture application built within the mobile POS application on the mobile tablet device and the customer is allowed to take possession of the merchandise purchased. The POS Store or Cloud Server can send a receipt for the purchase to the e-mail address of the customer if desired. The POS Store or Cloud Server or POS cloud server records this purchase and instructs the corporate ERP system to adjust the inventory data for the particular item sold, becoming visible chain-wide. A hard copy of the receipt can also be printed in a central printer present in the retail establishment. If the credit purchase is denied, the mobile tablet device displays this credit request decline. The employee of the retail organization informs the customer of this credit purchase rejection and requests another form of payment. Thus the purchase of merchandise by a customer is accomplished by StoreMobile POS™ by an employee having a mobile tablet gun system anywhere in the store or beyond the store, without the customer having to bring the merchandise to a sales counter and wait in line to consummate the purchase; and, the inventory of any item in the retail establishment is always current and available for purchase transactions carried out by a plurality of sales personnel working with a plurality of customers at a wide variety of locations within the retail establishment.

Figure 8:
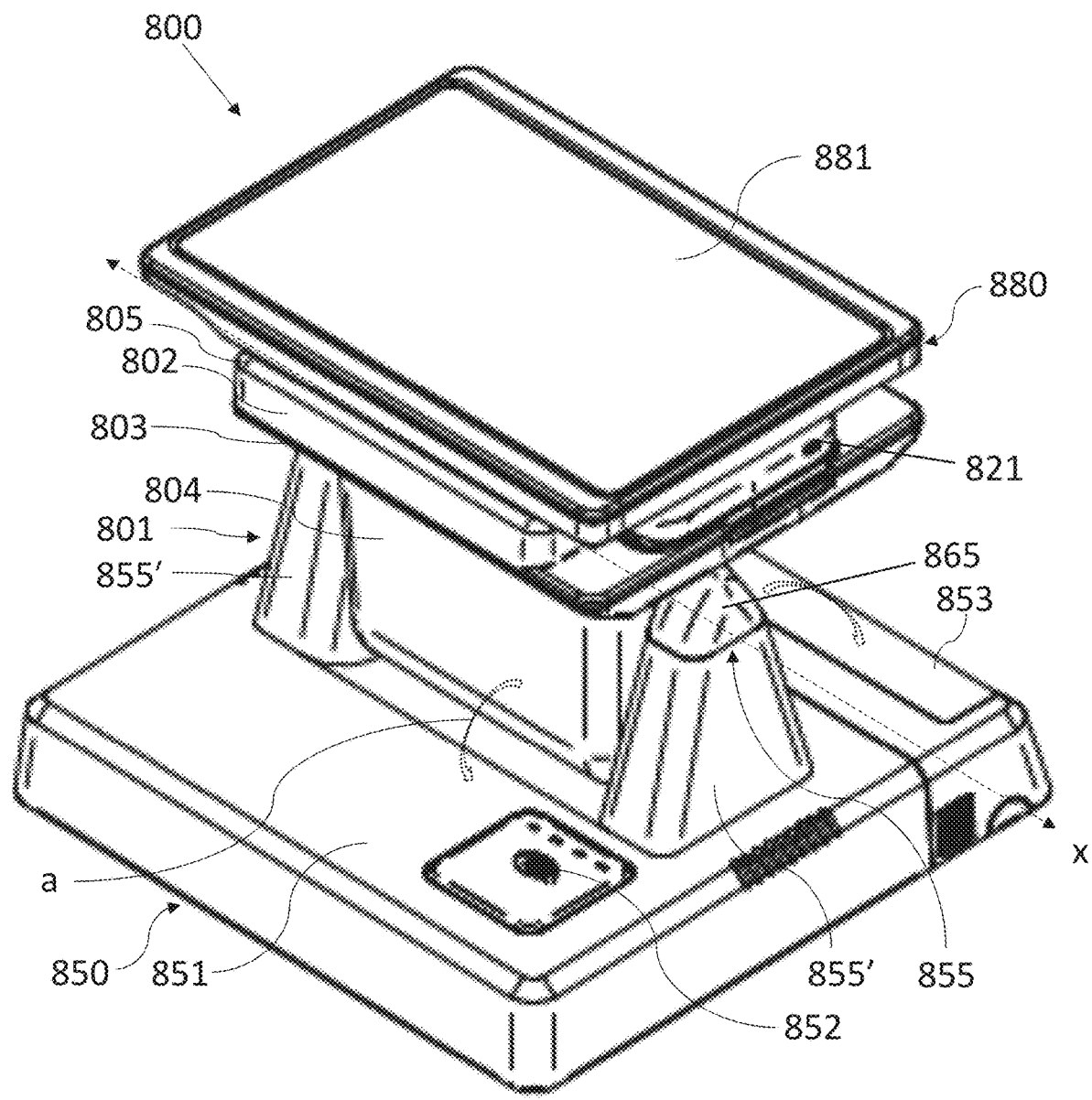
FIG. 8 is a top-side view of an embodiment of a mobile tablet gun system for interchangeably attaching and electronically coupling a mobile tablet device to a base form factor, showing a POS docking station with tablet assembly.
Figure 9A:
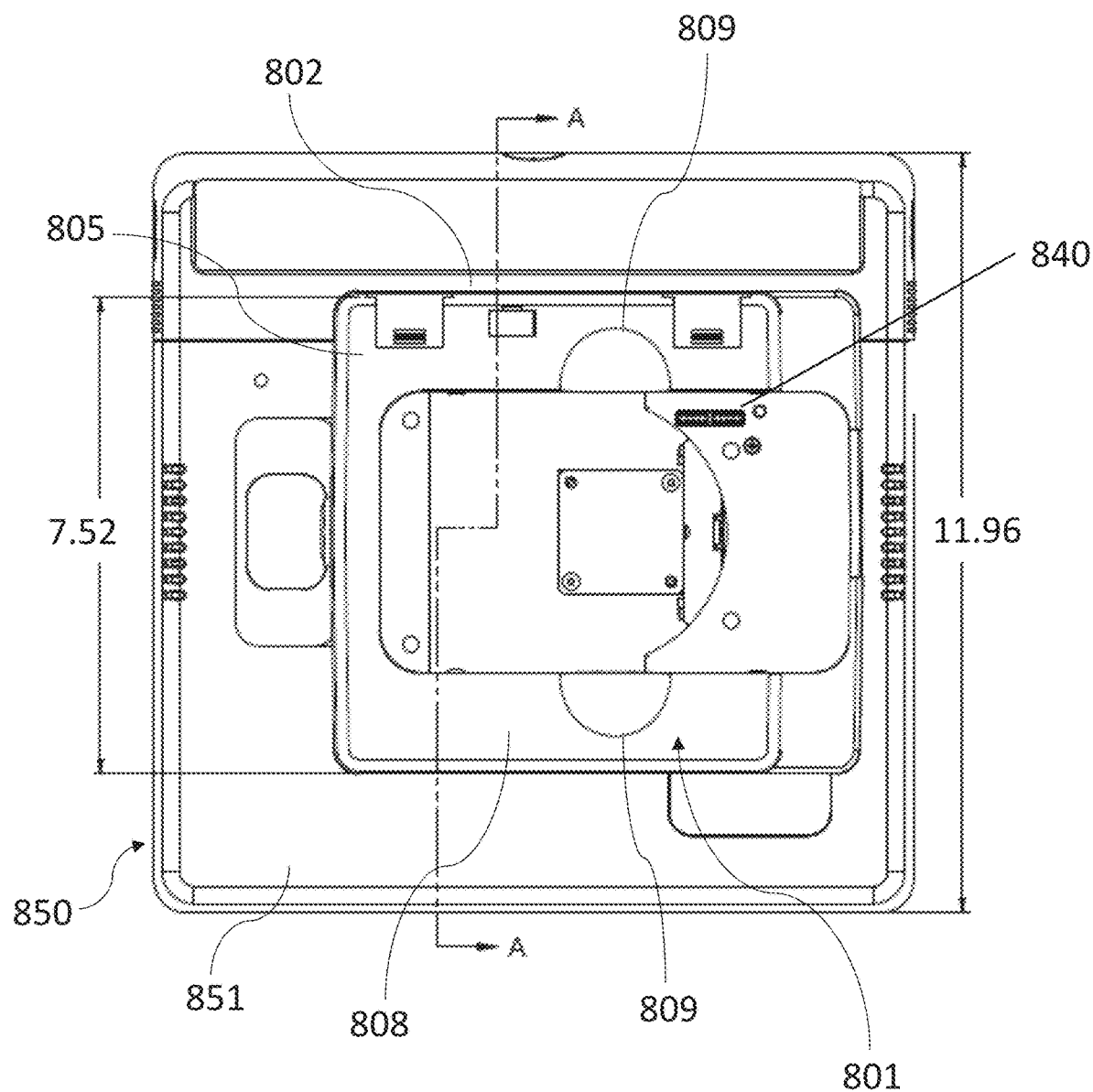
FIG. 9a is a top plan view of the POS docking station with tablet assembly of FIG. 8 with the larger display screen removed.
Figure 9B:
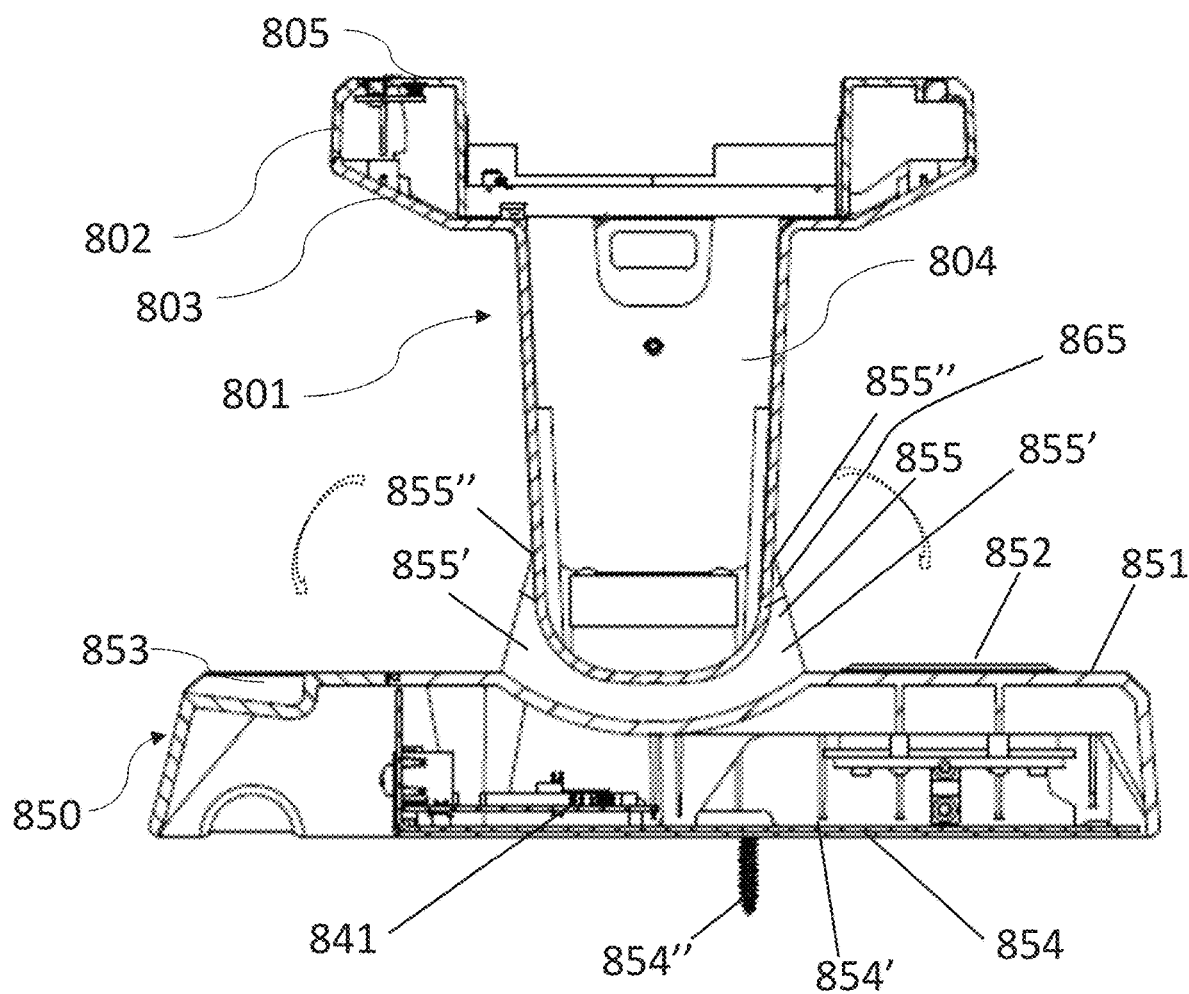
FIG. 9b is a cross-sectional view of FIG. 9a taken at A-A.
Figure 10A:
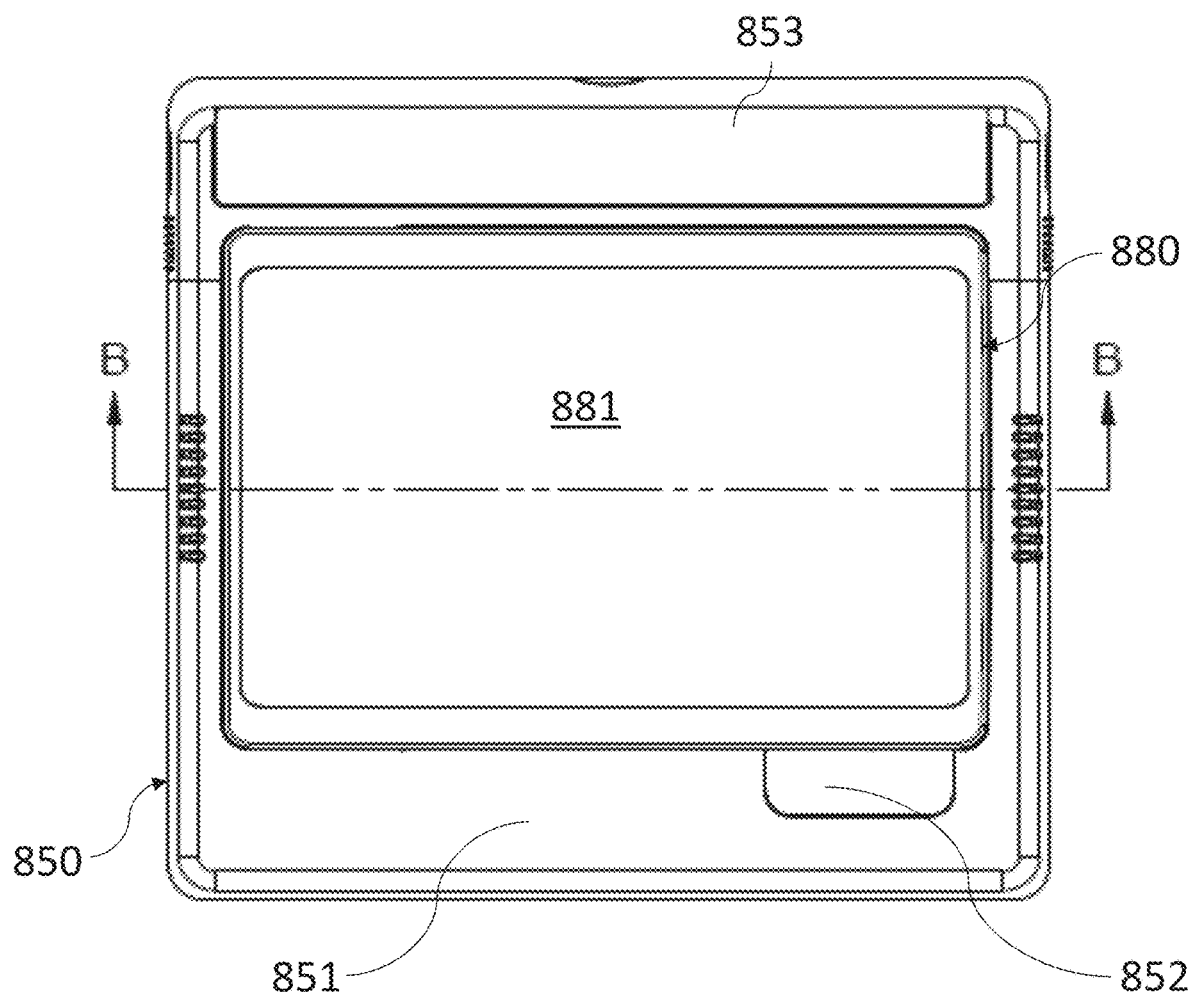
FIG. 10a is a top plan view of the POS docking station with tablet assembly of FIG. 8 with the larger display screen mounted.
Figure 10B:
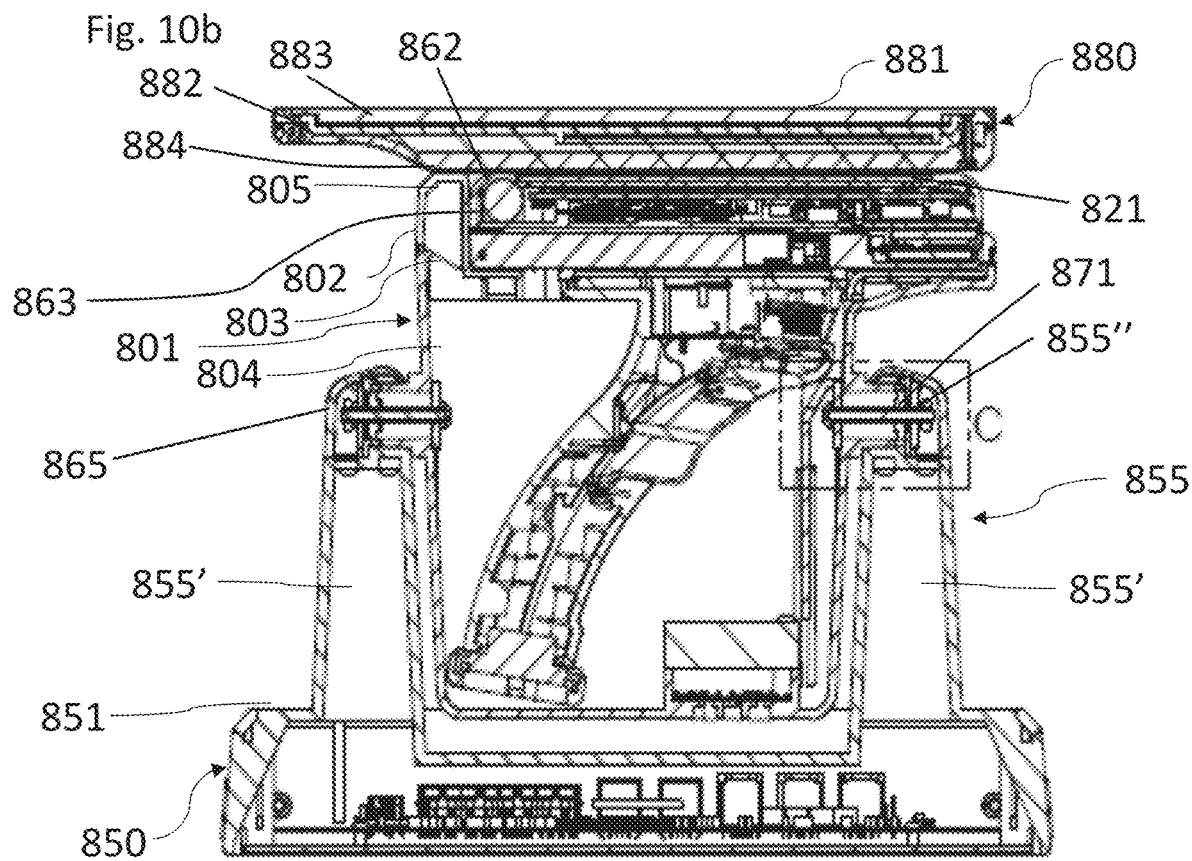
FIG. 10b is a cross-sectional view of FIG. 10a taken at B-B.
Figure 10C:
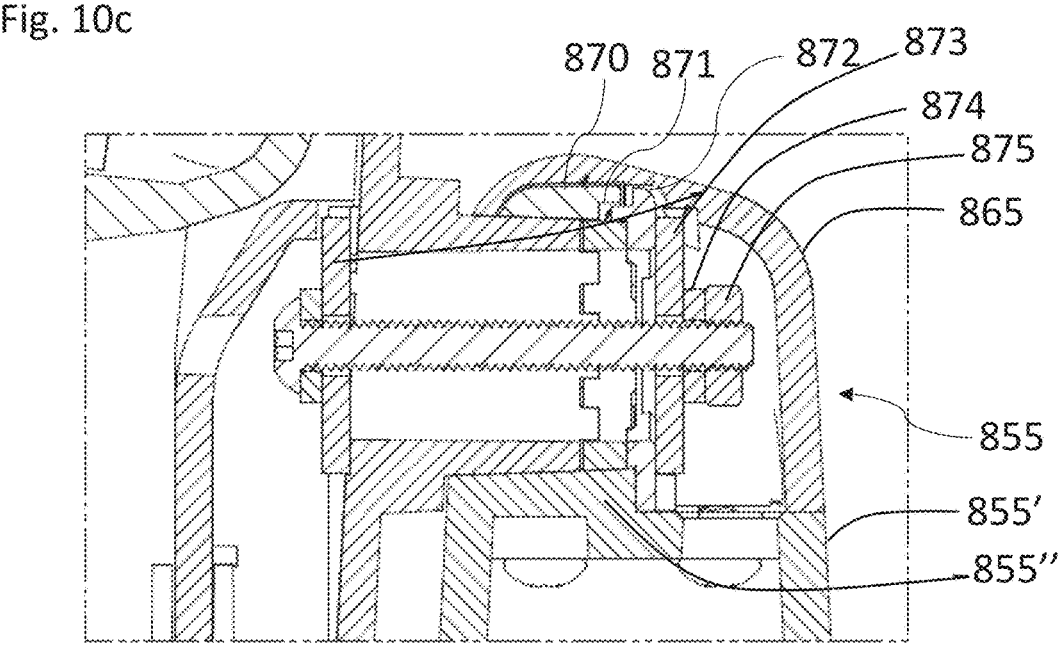
FIG. 10c is a cross-sectional view of FIG. 10b taken at C-C.
Figure 11A:
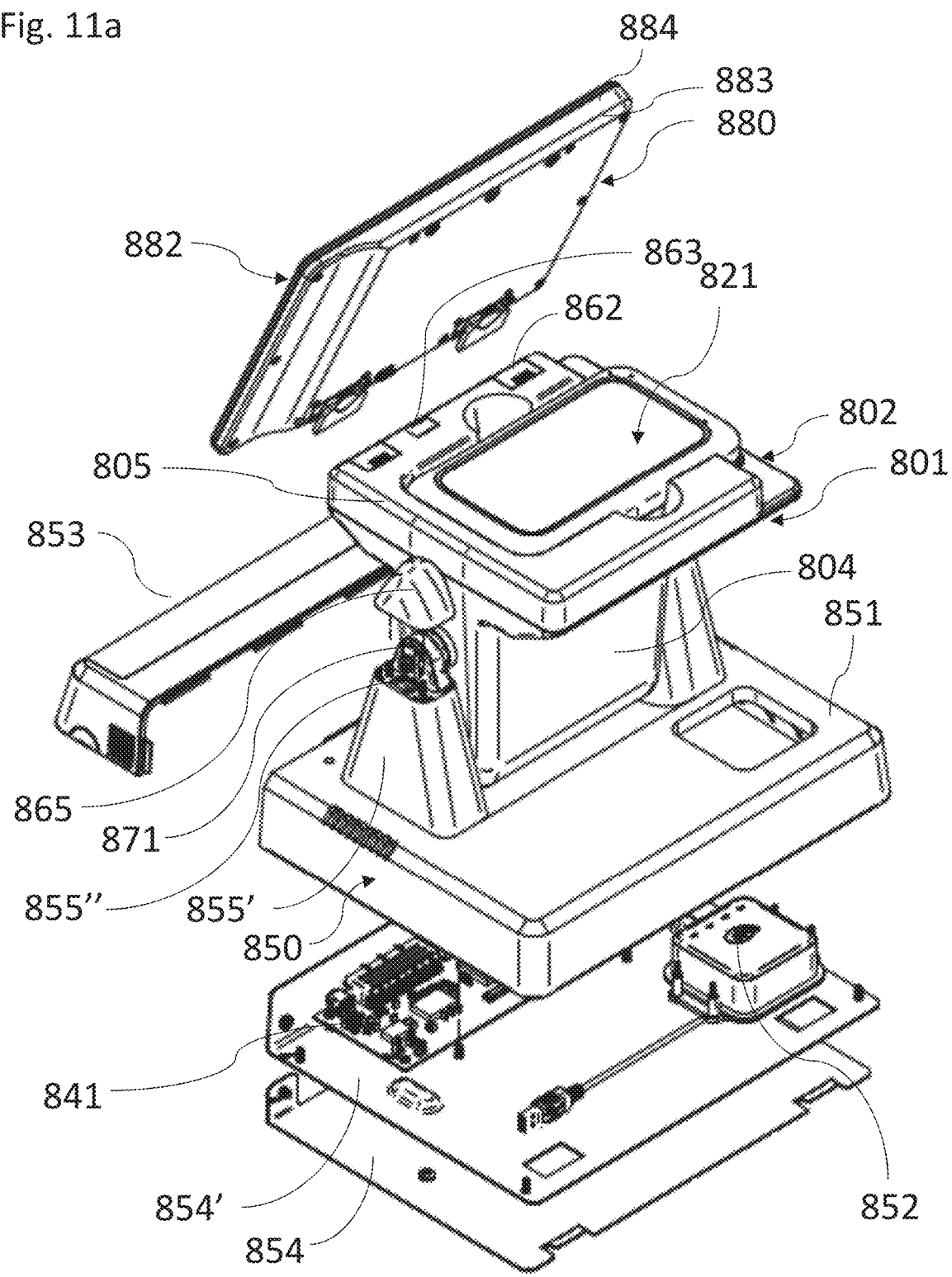
FIG. 11a is a top-side assembly view of an embodiment of a mobile tablet gun system for interchangeably attaching and electronically coupling a mobile tablet device to a base form factor, showing a POS docking station with tablet assembly.
Figure 11B:
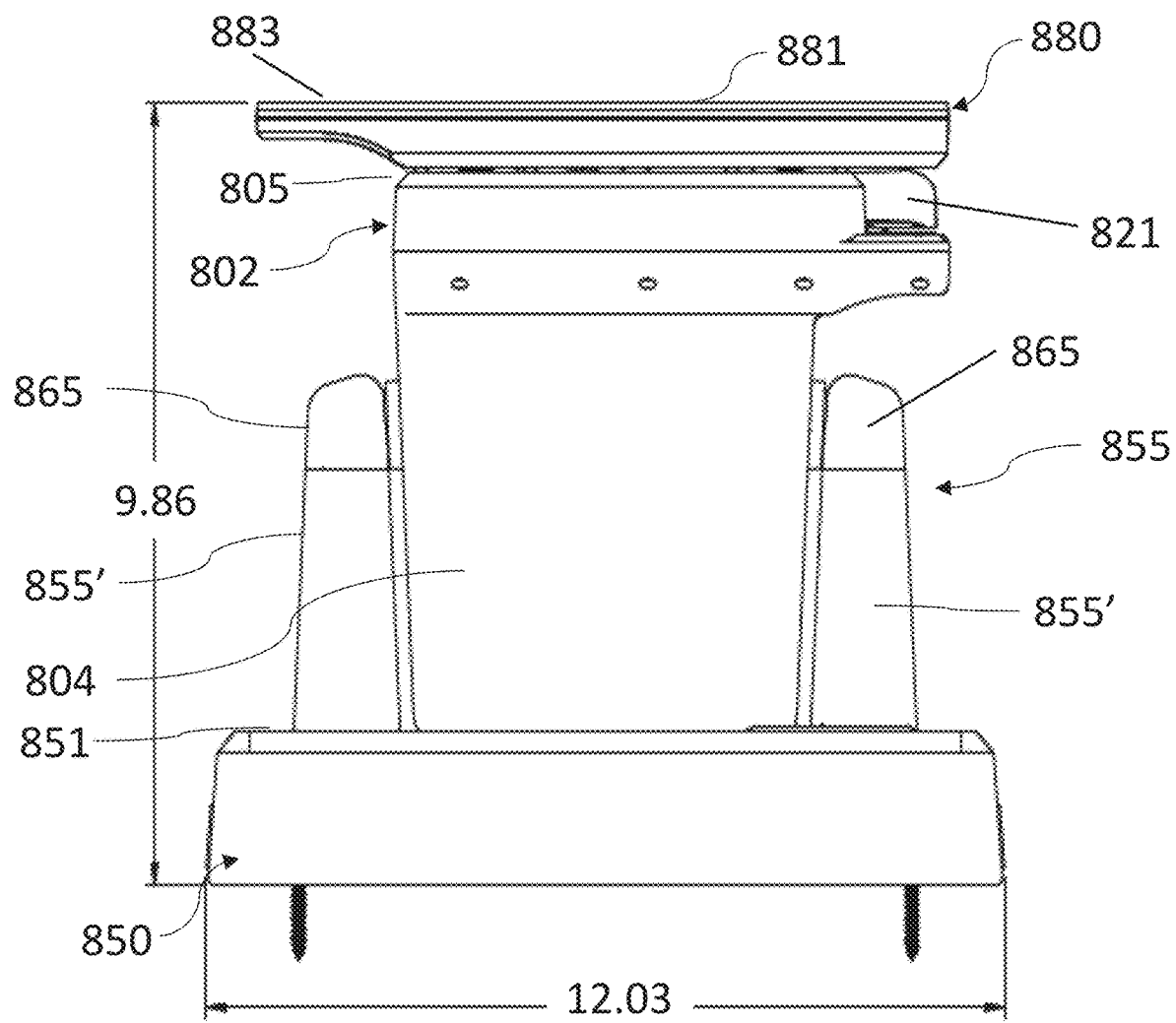

FIG. 8 is a top-side view of an embodiment of a mobile tablet gun system for interchangeably attaching and electronically coupling a mobile tablet device to a base form factor, showing a POS docking station with tablet assembly. FIG. 9a is a top plan view of the POS docking station with the tablet assembly of FIG. 8 having the larger display screen removed. FIG. 9b is a cross-sectional view of FIG. 9a taken at A-A. FIG. 10a is a top plan view of the POS docking station with tablet assembly of FIG. 8 with the larger display screen mounted. FIG. 10b is a cross-sectional view of FIG. 10a taken at B-B. FIG. 10c is a cross-sectional view of FIG. 10b taken at C-C. FIG. 11a is a top-side assembly view of an embodiment of a mobile tablet gun system for interchangeably attaching and electronically coupling a mobile tablet device to a base form factor, showing a POS docking station with tablet assembly. FIG. 11b is a side plan view of FIG. 11a.

Referring to FIGS. 8-11b, the fixed POS docking station 800 is adapted to dock and electronically integrate a mobile tablet gun system with mobile tablet device having an upper receiver for processing retail store POS sales transactions (such as that illustrated in FIG. 7; FIG. 10b). The POS docking station 800 includes an upper housing assembly 801 mounted on a base/lower housing assembly 850 having a base cover 851. Preferably, upper housing assembly 801 is substantially perpendicular to the base/lower housing assembly 850 and preferably mounted by way of rotational attachment (see FIGS. 25a-25d) so that the upper housing assembly 801 is adapted to rotate or pivot up to 90 degrees from horizontal x-axis in either the left or right direction, as indicated at a so that the upper housing assembly 801 can be rotated to accommodate handicapped individuals or smaller customers.

Upper housing assembly 801 is adapted to receive and mount the mobile tablet gun system 820/mobile tablet assembly with grip with a tablet 821 in a "cradle fashion". Upper housing assembly 801 is constructed having a tablet cradle enclosure 802 with a base 803 in a top frame 805, and an upper enclosure base 804. Upper enclosure base 804 is constructed to receive and flush fit around the mobile tablet gun 820, while tablet cradle enclosure 802 is constructed to receive and flush fit the mobile tablet 821 providing docking, stability and electrical integration of the tablet gun system, 820 and 821. Preferably, the top frame 805 includes two finger slot recessions 809 (see, for example, FIG. 9a) on each side of a long edge 808 of the upper housing assembly 801 to provide quick and easy removal of the mobile tablet gun system 820 with mobile tablet device 821.

An upper board assembly 840 is integrated within the upper housing assembly 801. Upper board assembly 840 is preferably located within base 803 of tablet cradle enclosure 802. Upper board assembly 840 preferably includes two electrical (spring loaded) pogo pin connectors having a housing integrated with a secondary printed circuit board (PCB1).

Base housing assembly 850 is formed having top portion 851 with an integrated scanner activation button 852 for use with a barcode scanner integrated with the mobile tablet gun system with a mobile tablet device when docked in the fixed POS docking station 800. A counter mounting plate 854 is preferably be provided for attachment of the fixed POS docking station 800 to a table-top, such as by way of screw 854", to provide security and stability and to enclose the components of the POS docking station 800. Preferably the base housing assembly 850 further comprises a detachable rear port cover or cable cover 853 for access within the housing and to cover cables. A base plate 854' is located proximal to the counter mounting plate 854. Base plate 854' includes a lower board assembly 841 preferably comprising a primary printed circuit board (PCB2) adapted to operate with at least one USB, Ethernet, debugging Serial port, scan switch interface and/or an external power supply port.

The top portion 851 of base housing assembly 850 is preferably constructed having a tilting and rotational mechanism 855 constructed of opposing arms 855', and an underside 858. As depicted in FIG. 10c taken along cross-section C of FIG. 10b, preferably the tilting and rotational mechanism 855 is constructed having a pivot collar 870 mating with a pivot restrictor part I 871 and a pivot restrictor part II 872 secured by way of a bolt plate 873. Preferably, a washer 874 with locknut 875 is utilized. The base arm cover 865 is attached over opposing arms 855'. Opposing arms 855' include rotation cuff mounts 855" adapted to mating receive pivot collar 870 mating with a pivot restrictor part I 871 and a pivot restrictor part II 872 of upper housing assembly 801 and covered by a base arm cover 865. Tilting and rotational mechanism 855 connects the base housing assembly 850 to the upper housing assembly 801 through the opposing arms 855' and rotation cuff mounts 855".

Tilting and rotational mechanism 855 connects the base housing assembly 850 to the upper housing assembly 801 through the opposing arms 855' and rotation cuff mounts 855". The tilting mechanism and rotational mechanism are adapted to allow the upper housing assembly 801 to rotate and tilt "toward" or "away" from a user allowing the user proper viewing orientation of the display screen of fixed POS docking station from any position. The secondary printed circuit board (PCB1) is connected to the primary printed circuit board (PCB2) through a custom interface cable operable to facilitate electrical communication between the fixed POS docking station and the mobile tablet gun system with a mobile tablet device. USB, Ethernet, debugging Serial ports, scan switch interface and power supply port housed within the base housing assembly are fully operable with the mobile tablet gun system with mobile tablet device and can be connected to a variety of POS peripheral devices and other store systems peripheral devices. A display enclosure 880 is removably mounted on top of the tablet cradle enclosure 802 of upper housing assembly 801 abutting and parallel to top frame 805. Display enclosure 880 houses an LCD touchscreen secondary display 881. Display 881 is larger than the display of the mobile tablet device 821. Display enclosure/display enclosure assembly 880 is formed having an upper enclosure base 882 formed from first and second display enclosure parts, 883 and 884. Display enclosure 880 may be hingedly connected to upper assembly 801 through a pair of hinges connected to the display enclosure and the tablet cradle enclosure of the upper housing assembly. Hinges contemplated may include, for non-limiting example, friction hinges. The secondary display screen 881 housed in the display enclosure, is hingedly attached to the tablet cradle enclosure of the upper housing assembly so that the secondary display screen is activated on when it is rotated over and parallel the tablet cradle enclosure when the secondary display screen is in use. Conversely, the secondary display screen is turned off when it is rotated down and perpendicular from the tablet cradle enclosure when the secondary display screen is not in use. Preferably, display enclosure 880 with display 881 is hingedly connected to the upper housing assembly 801 by hinges with a hinge slot cover 862 and a connector slot cover 863.

Figure 12A:
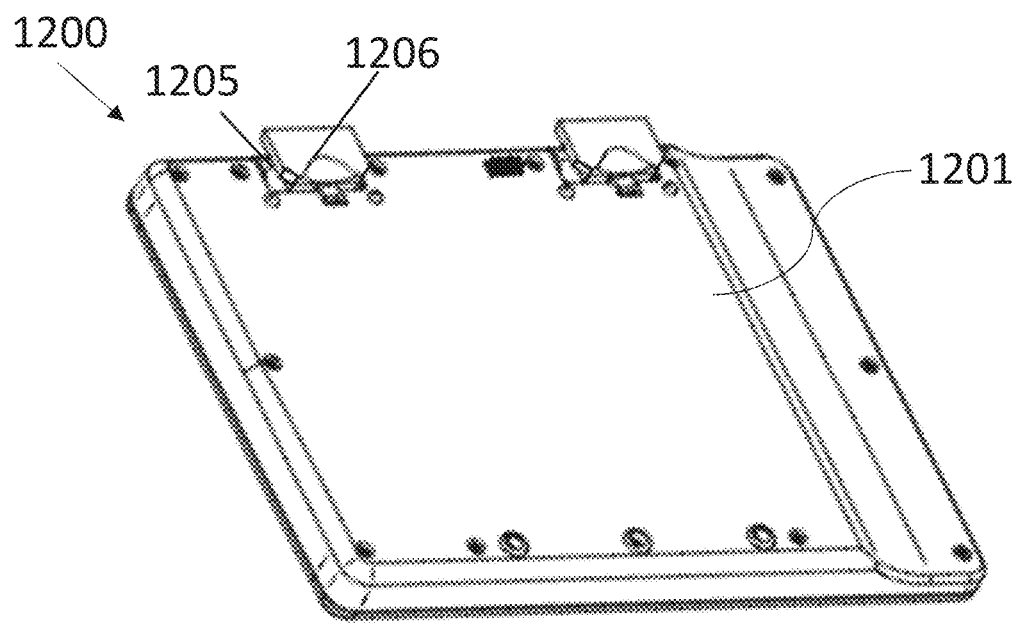
FIG. 12a is a bottom side plan view of the display enclosure assembly.
Figure 12B:
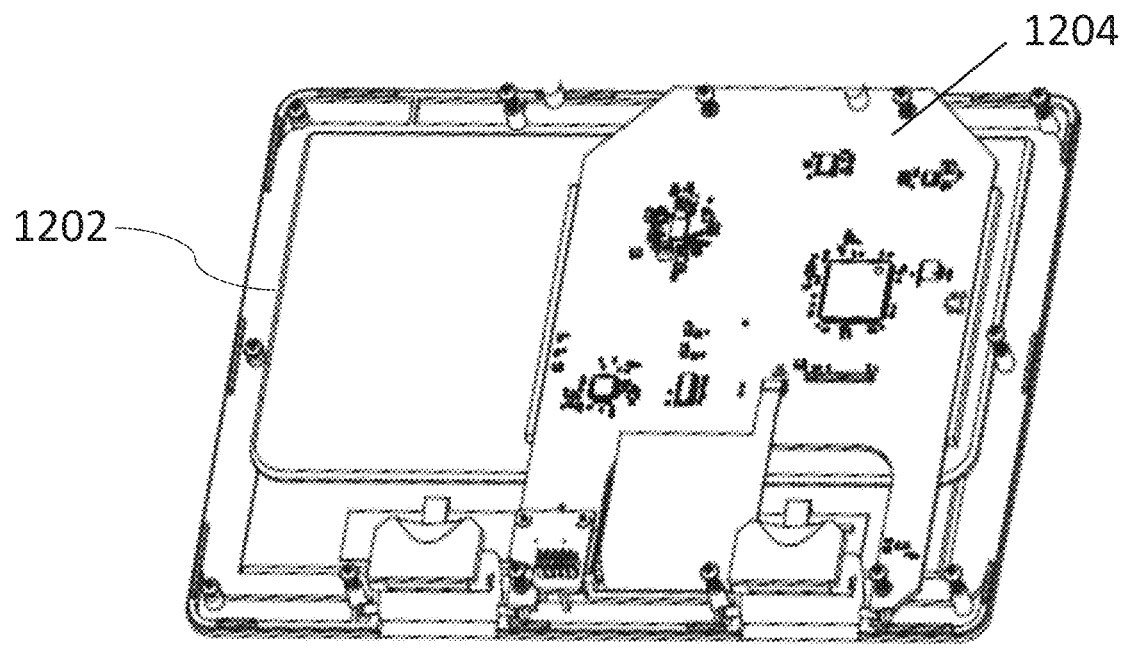
FIG. 12b is a bottom side view of the display enclosure.

FIGS. 12a-12e illustrate views of the display enclosure assembly of the subject POS docking station, shown generally at 1200. FIG. 12a is a bottom side plan view of the display enclosure. FIG. 12b is a bottom side view of the display enclosure. FIG. 12c is a top plan view of the display enclosure. FIG. 12d is a side plan view of the display enclosure. FIG. 12e is a bottom view of the display enclosure. Display enclosure assembly 1200 is formed by way of display enclosure part I 1201 and display enclosure part II 1202. Display enclosure 1200 includes a display board 1203, a POGO board display side 1204, display enclosure part I 1201, display enclosure part II 1202, hinge base 1205 and hinge leaf 1206. An LCD touchscreen display 1207 is housed within the display enclosure 1200. The secondary display screen housed in the display enclosure is hingedly attached to the tablet cradle enclosure through a pair of hinges to the upper housing assembly. Hinges contemplated may include, for non-limiting example, friction hinges. The secondary display screen is activated "on" when it is rotated over and parallel the tablet cradle enclosure, when the secondary display screen is in use. On the other hand, the secondary display screen is turned "off" when it is rotated down and perpendicular from the tablet cradle enclosure when the secondary display screen is not in use.

Figure 13A:
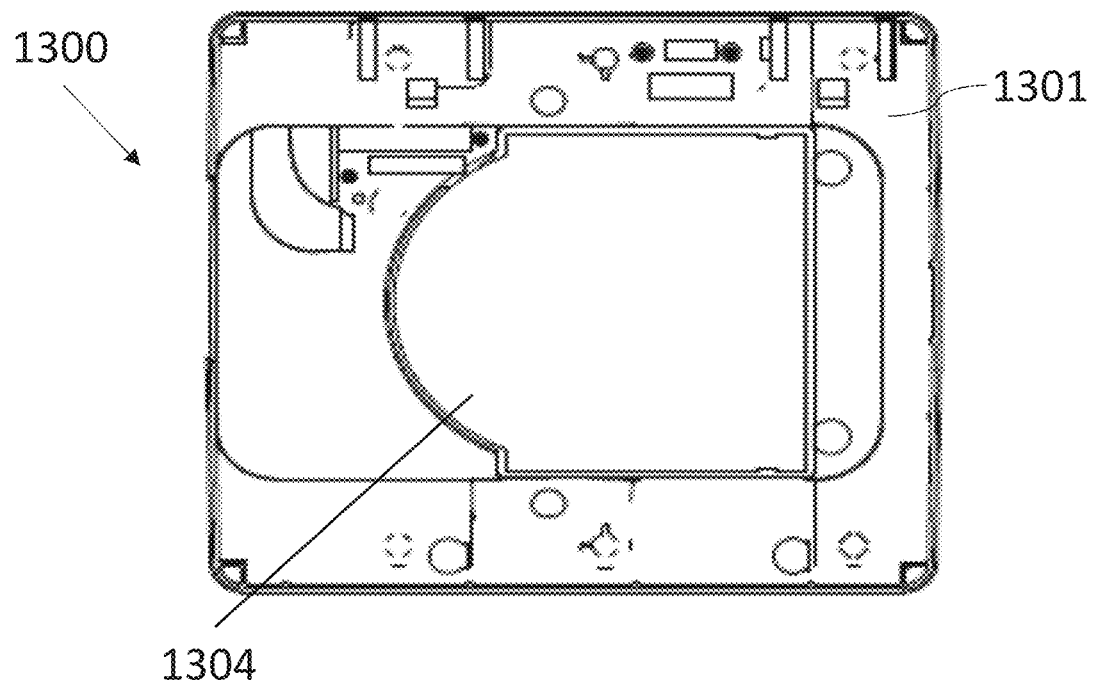
FIG. 13a is a bottom plan view of an embodiment of an upper top cover.
Figure 13B:
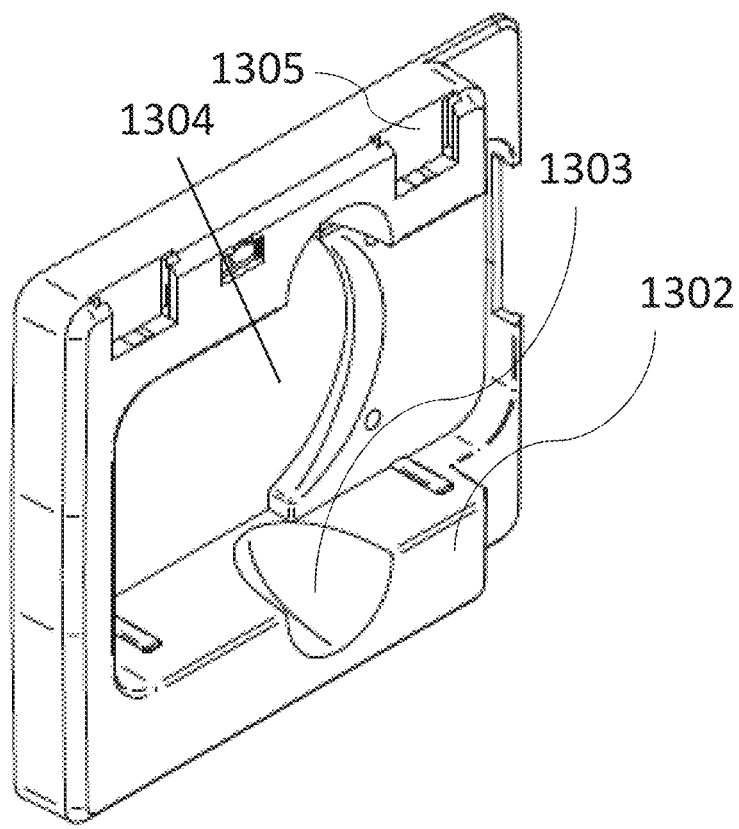
FIG. 13b is a top side view of the upper top cover.
Figure 13C:
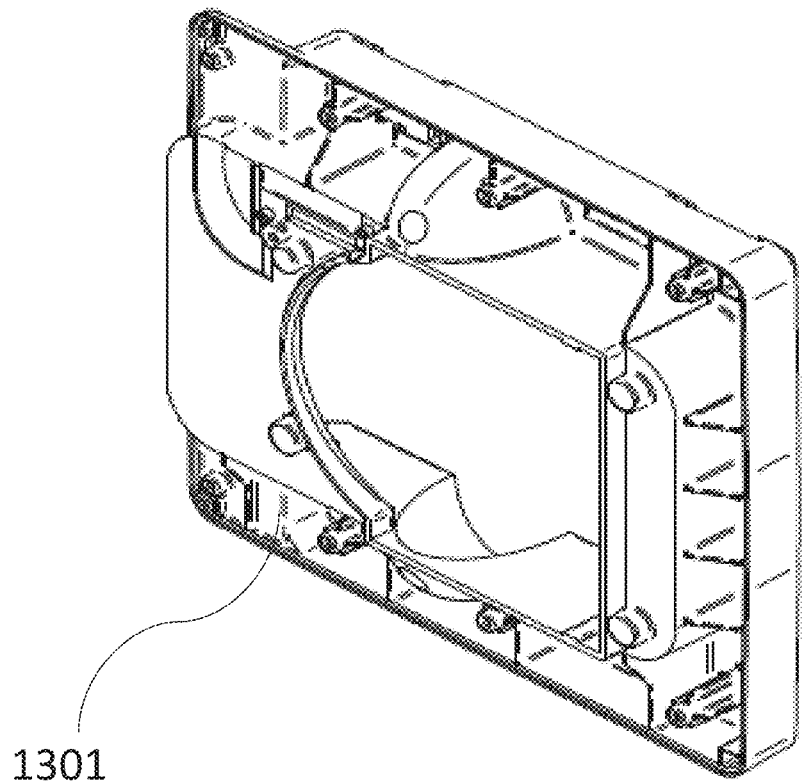
FIG. 13c is a bottom side view of the upper top cover.
Figure 13D:
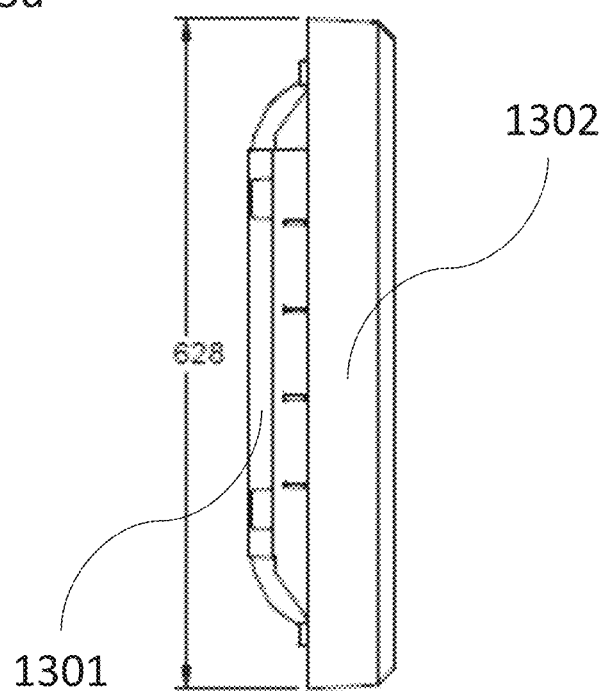
FIG. 13d is a first side plan view of the upper top cover.
Figure 13E:
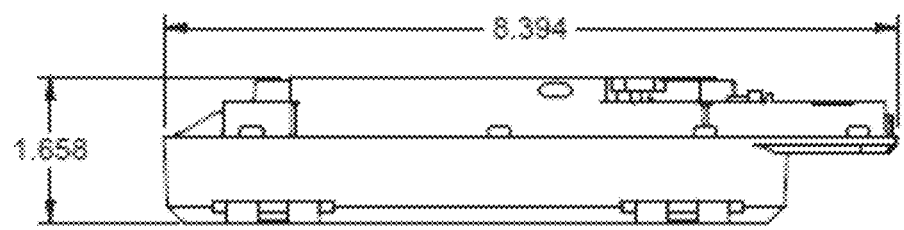
FIG. 13e is a second side plan view of the upper top cover.
Figure 13F:
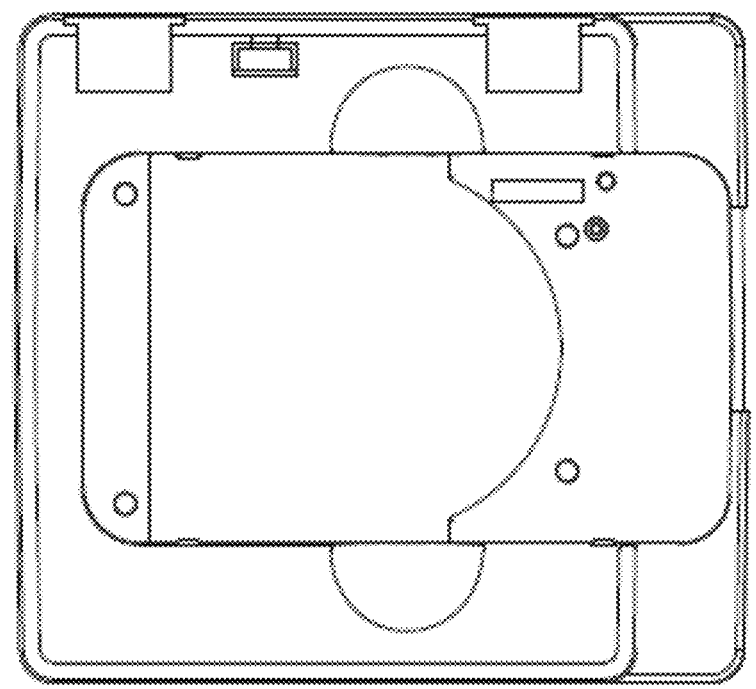
FIG. 13f is a top plan view of the upper top cover.

The top cover is depicted in detail in FIGS. 13a-13f, shown generally at 1300. Referring to FIGS. 13a-13f, FIG. 13a is a bottom plan view of an embodiment of an upper top cover. FIG. 13b is a top side view of the upper top cover. FIG. 13c is a bottom side view of the upper top cover. FIG. 13d is a first side plan view of the upper top cover. FIG. 13e is a second side plan view of the upper top cover. FIG. 13f is a top plan view of the upper top cover. Upper top cover 1300 forms the tablet cradle enclosure (802 of FIG. 8) adapted to receive and electronically integrate the mobile tablet device of the tablet gun system. Upper top cover 1300 has a back side 1301 and a front side 1302. Front side 1302 includes cut-outs or slots 1303 for grasping the tablet device when mounted within the top cover 1300. An opening 1304 is provided for which the tablet gun extends downward from the tablet when the tablet gun system is docked in the POS docking station. Connector slot indents 1305 are provided, which are adapted to receive hinge slots for connection to the upper housing assembly.

FIG. 14a is an exploded top plan view of a steel slug 1400 adapted for use in assembling a POS docketing station. FIG. 14b is an exploded side view of the steel slug.

FIGS. 15a-16e illustrate views of the display enclosure assembly. FIGS. 15a-15e illustrate views of the display enclosure part I, while FIGS. 16a-16e illustrate views of the display enclosure part II.

Referring to FIGS. 15a-15e, FIG. 15a is a bottom side view of an embodiment of a display enclosure part I. FIG. 15b is a top plan view of the display enclosure part I. FIG. 15c is a first side view of the display enclosure part I. FIG. 15d is a second side plan view of the display enclosure part I. FIG. 15e is a bottom plan view of the display enclosure part I. The display enclosure assembly is shown in FIG. 8 at 880 which houses an LCD touchscreen display, providing a larger display as compared to the mobile tablet's display. The display enclosure is removably mounted on top of the tablet cradle enclosure of the upper housing assembly abutting and parallel to the top frame. The display enclosure may be pivotally connected to the upper housing assembly through a pair of hinges with a hinge base, hinge leaf and hinge slot cover assembly. Hinges contemplated may include, for non-limiting example, friction hinges. Display enclosure assembly is formed by display enclosure part I and part II. Display enclosure part I is shown at 1500. Display enclosure part I 1500 is formed as a backplate 1501 with one or more connector slots 1502 adapted to receive hinge slots for connection to the upper housing assembly. An elongated edge 1503 extends from plate 1501. Display enclosure part I 1500 snaps or attaches to display enclosure part II, as shown in FIGS. 16a-16e. The elongated edge extends flush from the plate 1501 and is adapted to provide additional hand support and comfort for a user and a more thorough look of integration. The elongated edge 1503 provides an enhanced surface area for the user to rest his/her hands and to provide for an ergonomically constructed device. Preferably, the elongated edge 1503 has a length ranging from one inch to six inches.

Figure 16A:
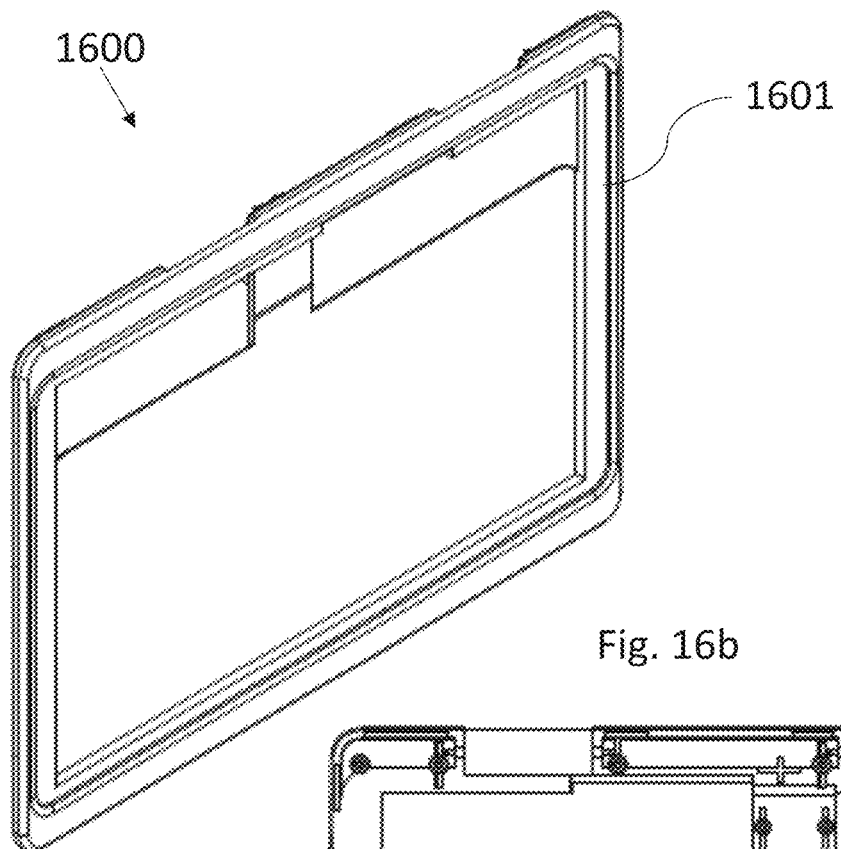
FIG. 16a is a bottom side view of an embodiment of a display enclosure part II.
Figure 16B:
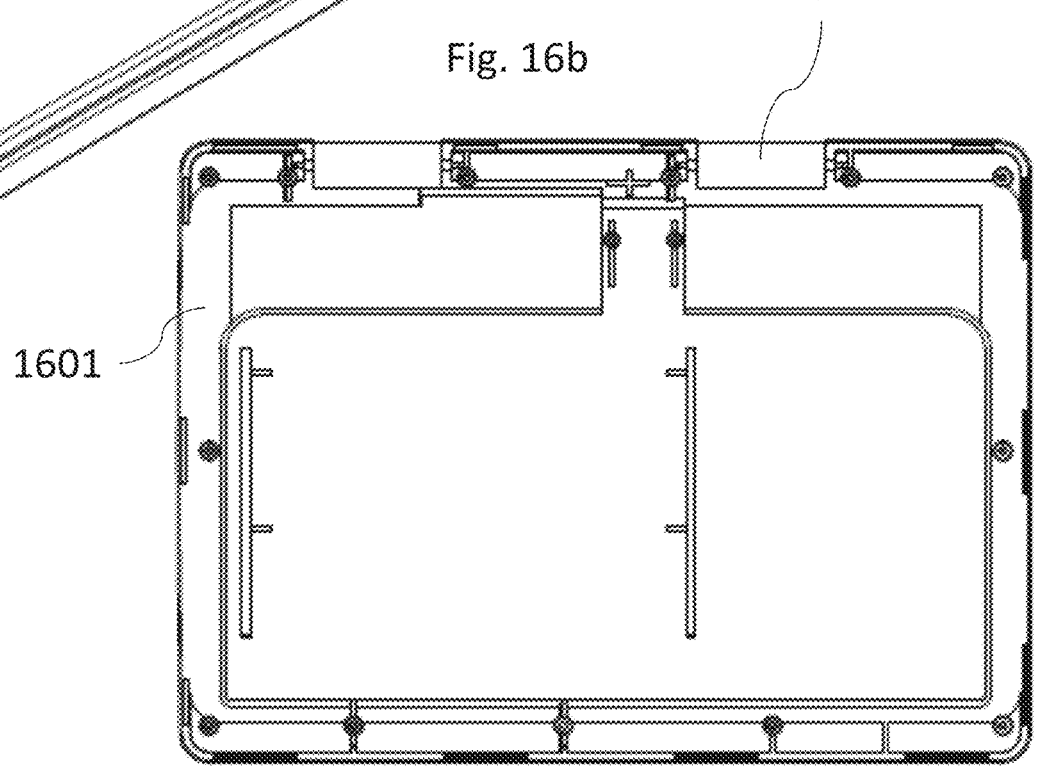
FIG. 16b is a top plan view of the display enclosure part II.

FIG. 16a is a bottom side view of an embodiment of a display enclosure part II, shown generally at 1600. FIG. 16b is a top plan view of the display enclosure part II. FIG. 16c is a bottom side view of the display enclosure part II. FIG. 16d is a side view of the display enclosure part II. FIG. 16e is a bottom plan view of the display enclosure part II. Display enclosure part II 1600 snaps or attaches to display enclosure part 1 and forms the front of the display enclosure assembly. Display enclosure part II 1600 includes a plate 1601 with one or more connector slots 1602 adapted to accommodate hinge slots for connection to the upper housing assembly.

Figure 17A:
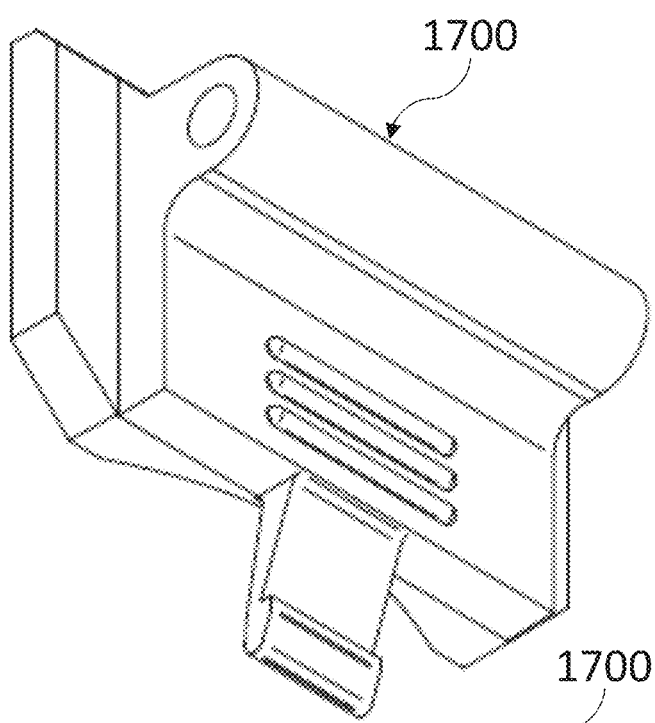
FIG. 17a is a top side view of a hinge base of the subject POS docking station assembly.
Figure 17B:
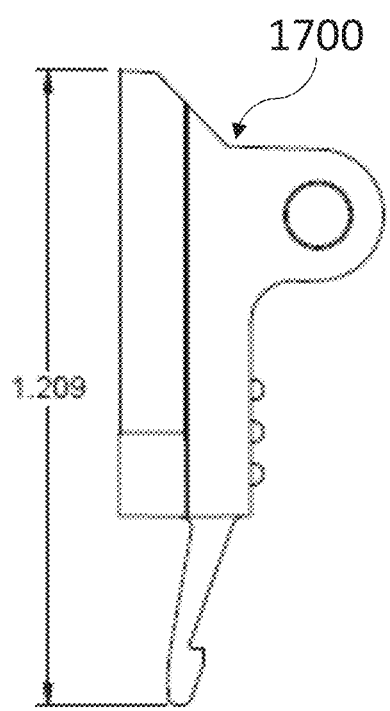
FIG. 17b is a side view of the hinge base.
Figure 17C:
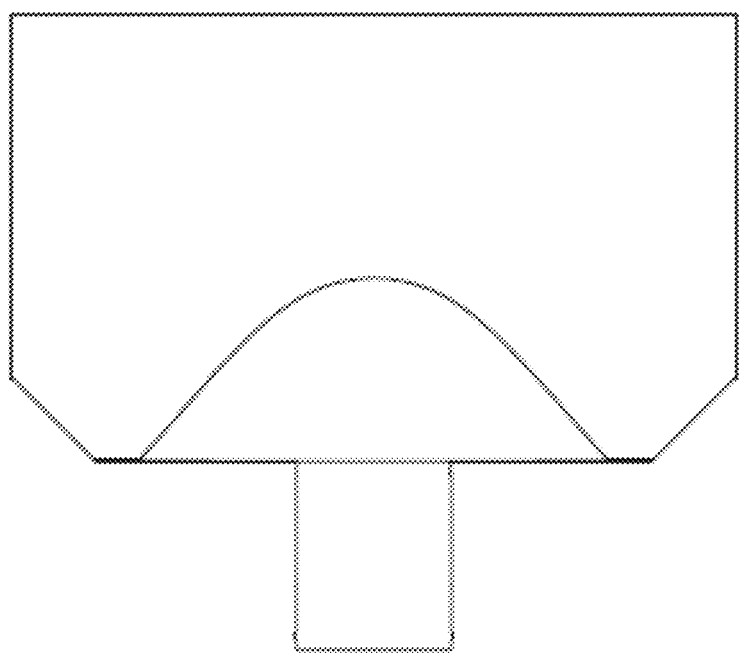
FIG. 17c is a bottom plan view of the hinge base.
Figure 17D:
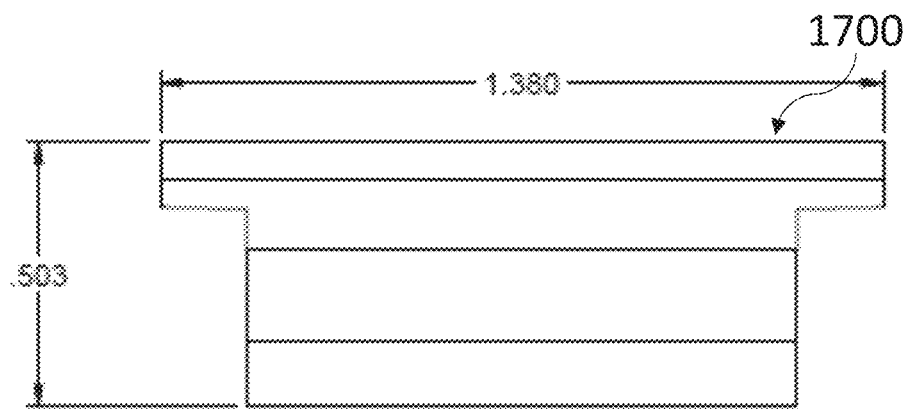
FIG. 17d is a side view of the hinge base.
Figure 17E:
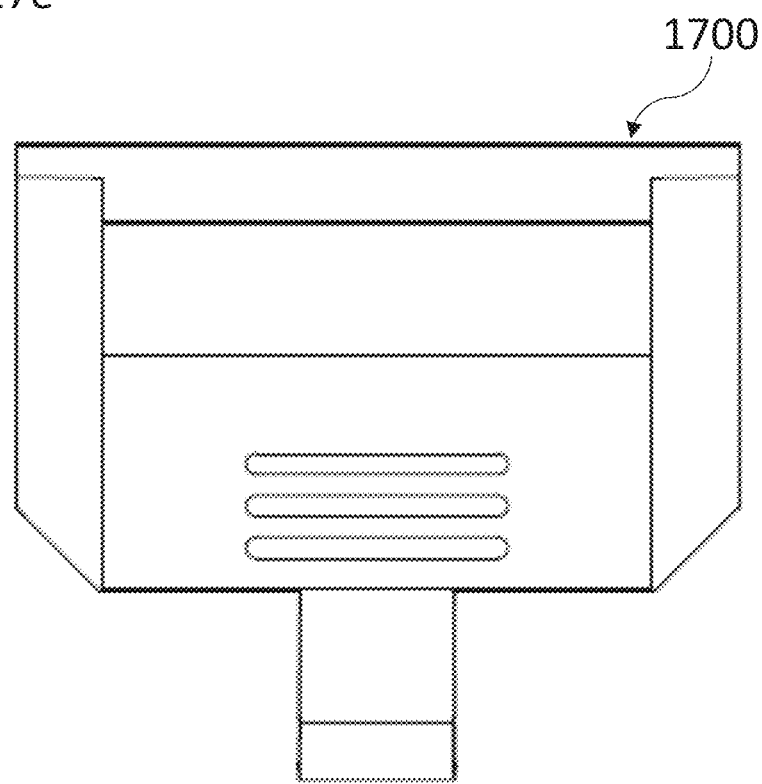
FIG. 17e is top plan view of the hinge base.
Figure 18A:
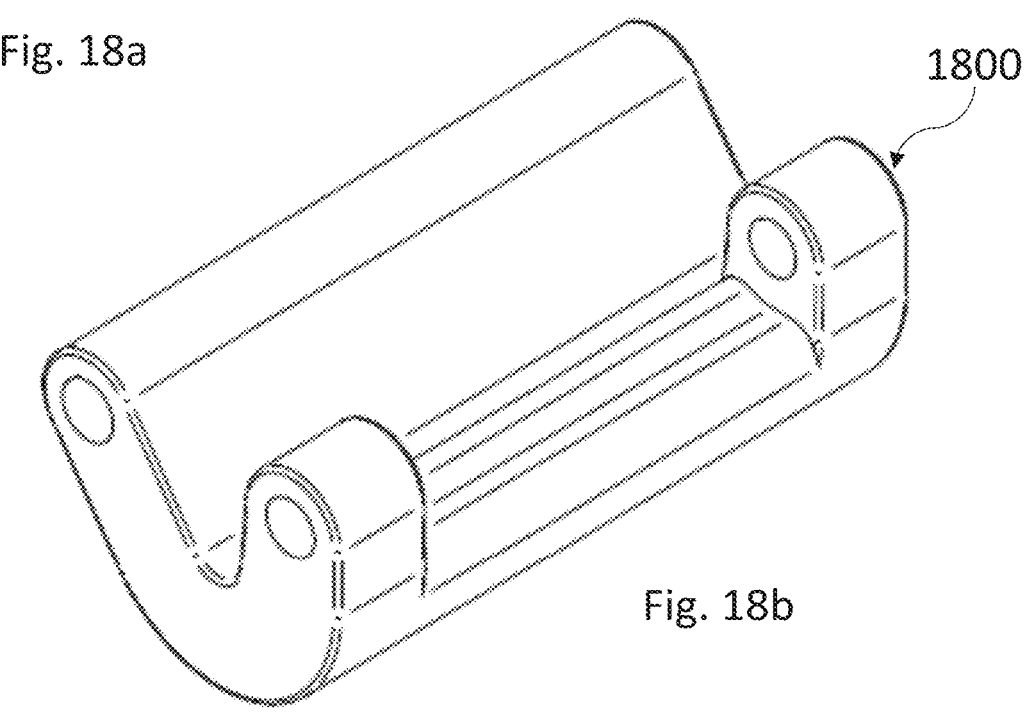
FIG. 18a is a top side view of a hinge leaf of the subject POS docking station assembly.
Figure 18B:
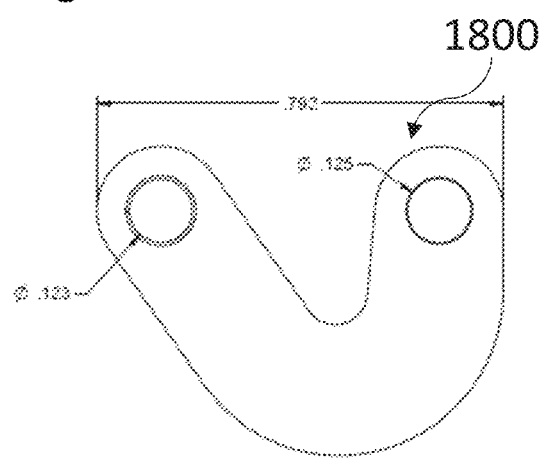
FIG. 18b is a side view of the hinge leaf.
Figure 18C:
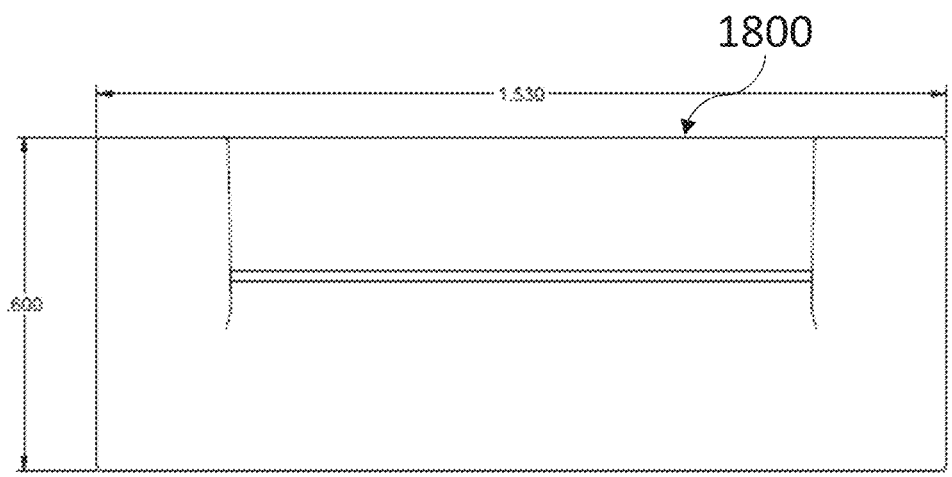
FIG. 18c is a front view of the hinge leaf.
Figure 19A:
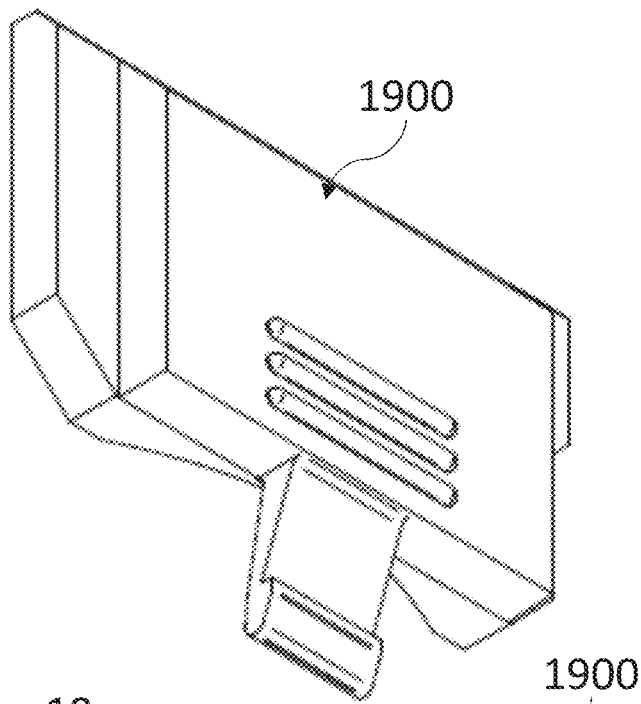
FIG. 19a is a top side view of a hinge slot cover of the subject POS docking station assembly.
Figure 19B:
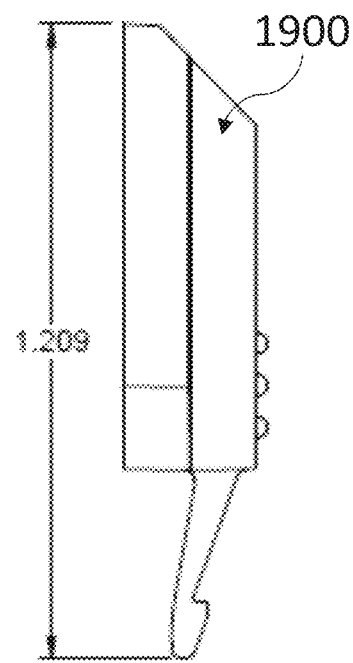
FIG. 19b is a side view of the hinge slot cover.
Figure 19C:
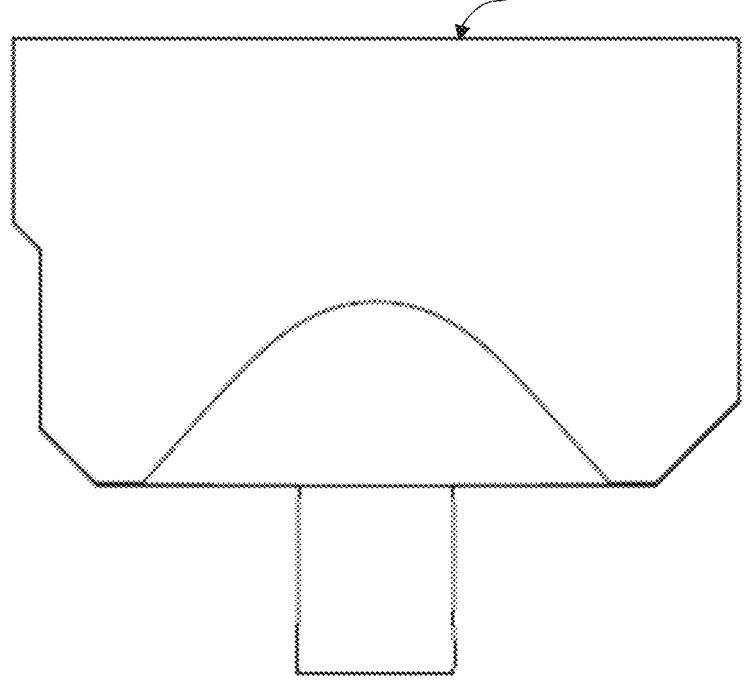
FIG. 19c is a bottom plan view of the hinge slot cover.
Figure 19D:
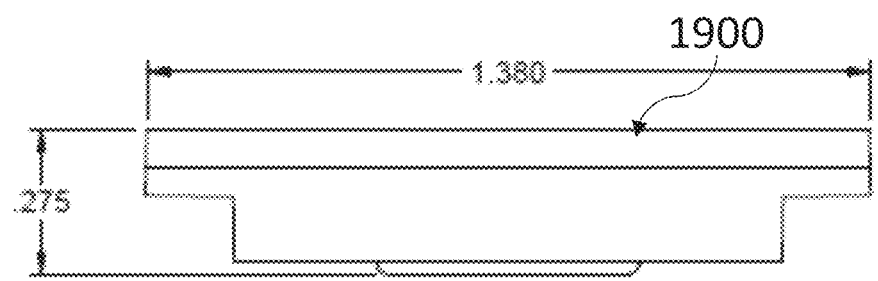
FIG. 19d is a side view of the hinge slot cover.
Figure 19E:
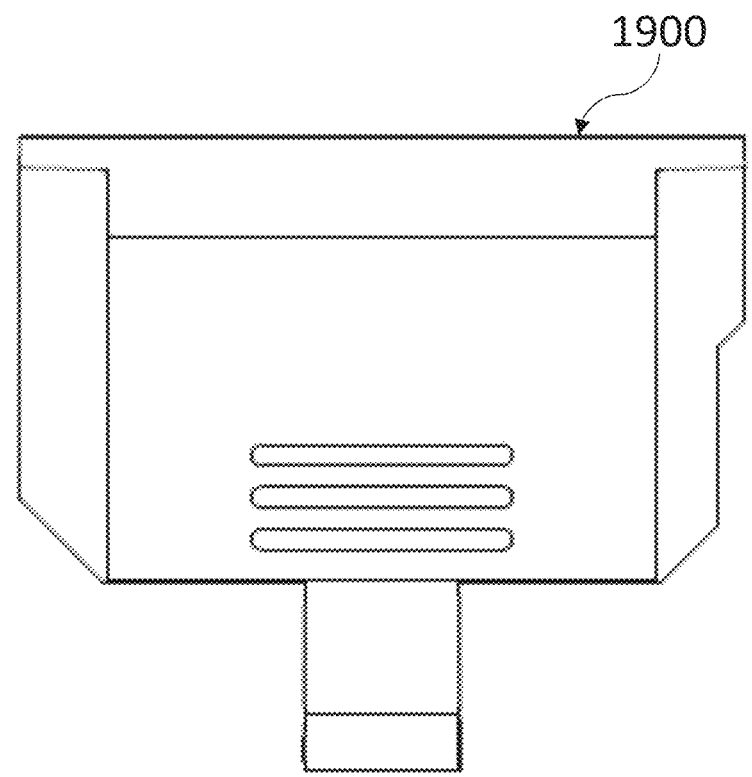
FIG. 19e is top plan view of the hinge slot cover.

FIGS. 17a-19e illustrate views of a hinge base, hinge leaf and hinge slot cover of the subject fixed POS docking station. The hinge base, hinge leaf and hinge slot cover are appointed to be used when the display enclosure is removable and not installed on the upper house assembly. FIG. 17a is a top side view of a hinge base 1700. FIG. 17b is a side view of the hinge base. FIG. 17c is a bottom plan view of the hinge base. FIG. 17d is a side view of the hinge base. FIG. 17e is a top plan view of the hinge base. FIGS. 18a-18c show a top side view, side view and a front view of a hinge leaf 1800. FIG. 19a is a top side view of a hinge slot cover 1900. FIG. 19b-19e show a side view, bottom plan view, a bottom edge side view and a top plan view of the hinge slot cover 1900. The secondary display screen housed in the display enclosure is hingedly attached to the tablet cradle enclosure through a pair of hinges to the upper housing assembly. The secondary display screen is activated "on" when it is rotated over and parallel the tablet cradle enclosure when the secondary display screen is in use. On the other hand, the secondary display screen is turned "off" when it is rotated down and perpendicular from the tablet cradle enclosure when the secondary display screen is not in use.

Figure 20A:
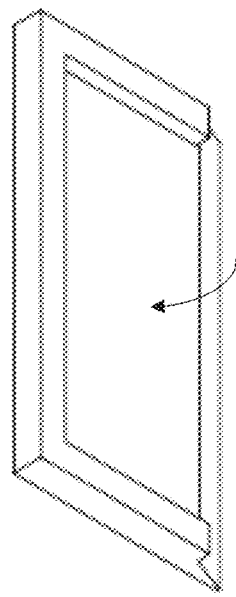
FIG. 20a is a top side view of a connector slot cover of the subject POS docking station assembly.
Figure 20B:
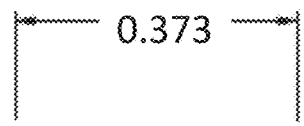
FIG. 20b is a side view of the connector slot cover.
Figure 20C:
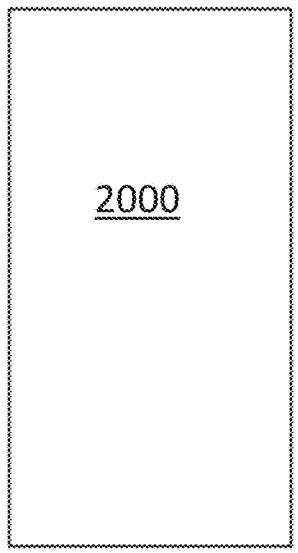
FIG. 20c is a bottom plan view of the connector slot cover.
Figure 20D:
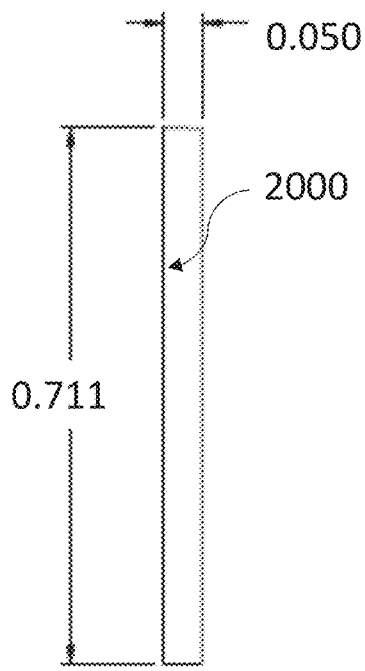
FIG. 20d is a side view of the connector slot cover.
Figure 20E:
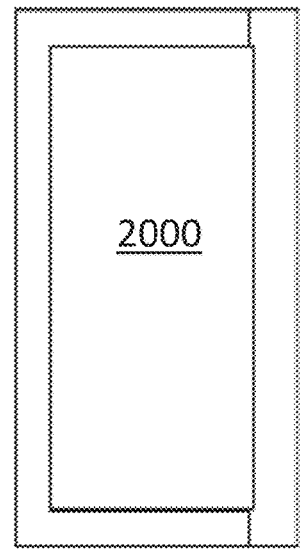
FIG. 20e is top plan view of the connector slot cover.

FIGS. 20a-20e illustrate views of a connector slot cover 2000 of the subject POS docking station assembly. FIG. 20a is a top side view of the connector slot cover. FIG. 20b is a side view of the connector slot cover. FIG. 20c is a bottom plan view of the connector slot cover. FIG. 20d is a side view of the connector slot cover. FIG. 20e is top plan view of the connector slot cover. The connector slot cover 2000 and hinge slot cover are adapted to connect the display enclosure to the upper housing assembly. Connector slot cover 2000 is adapted to be used when the display enclosure is not installed; but is removable from the upper housing assembly.

Figure 21A:
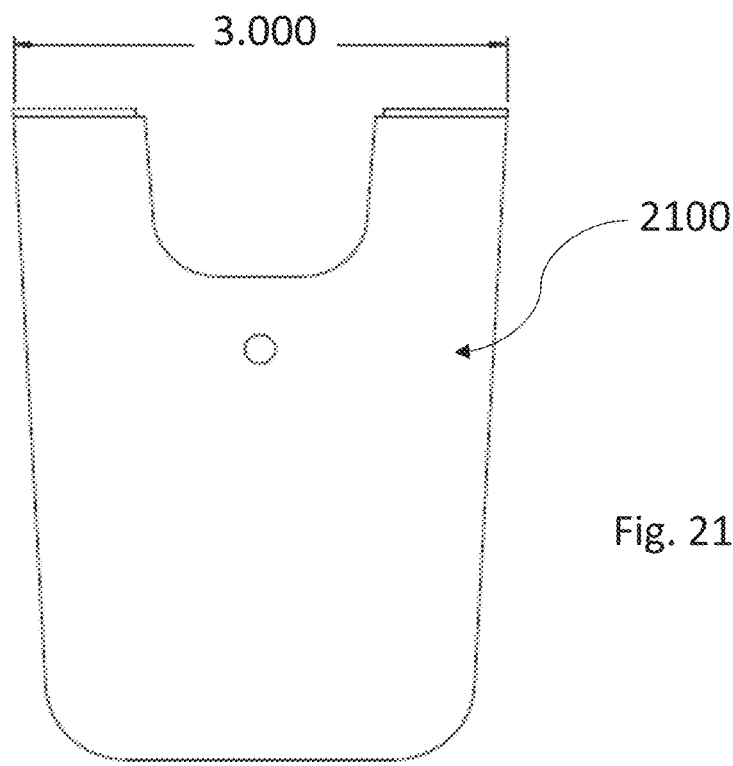
FIG. 21a is a top plan view of a cable cover of the subject POS docking station assembly.
Figure 21B:
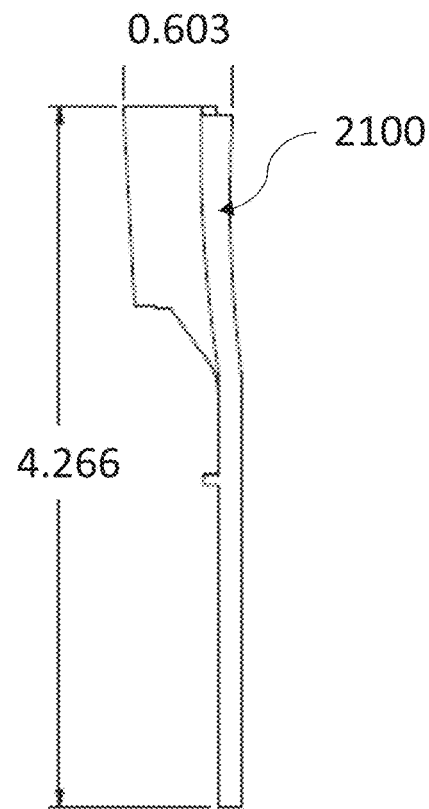
FIG. 21b is a side view of the cable cover.

FIGS. 21a-21b illustrate views of a cable cover of the subject POS docking station. FIG. 21a is a top plan view of a cable cover 2100 of the subject POS docking station assembly. FIG. 21b is a side view of the cable cover. Cable cover 2100 is adapted to cover cables of the subject POS docking station to secure and protect the docking station cables.

Figure 22A:
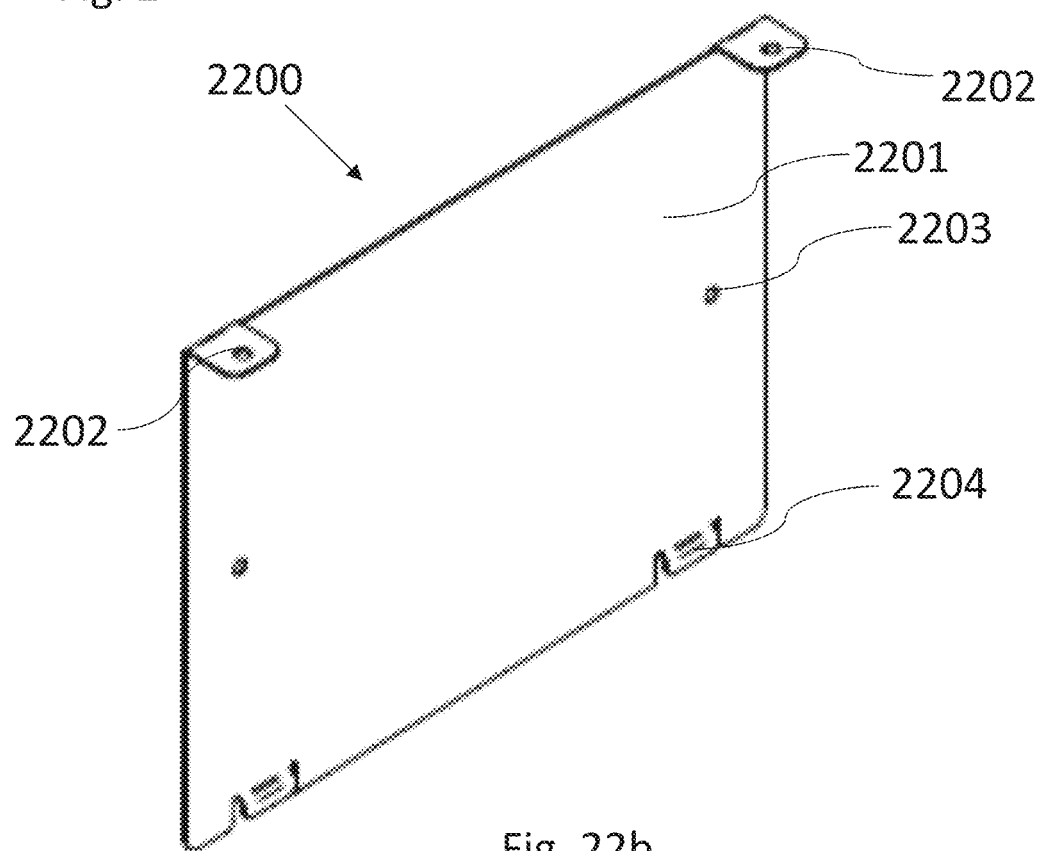
FIG. 22a is a top side view of a counter mounting plate of the subject POS docking station assembly.
Figure 22B:
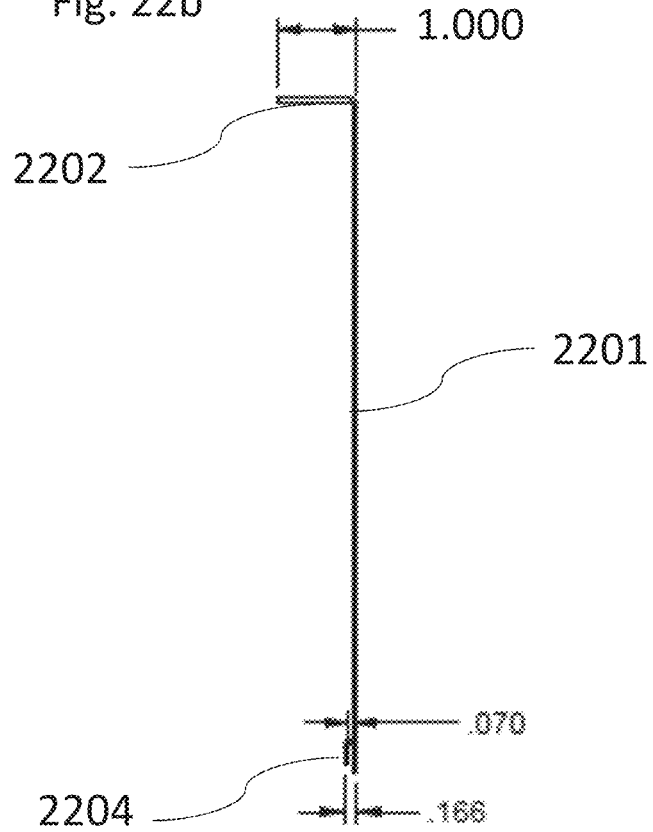
FIG. 22b is a side view of the counter mounting plate.
Figure 22C:
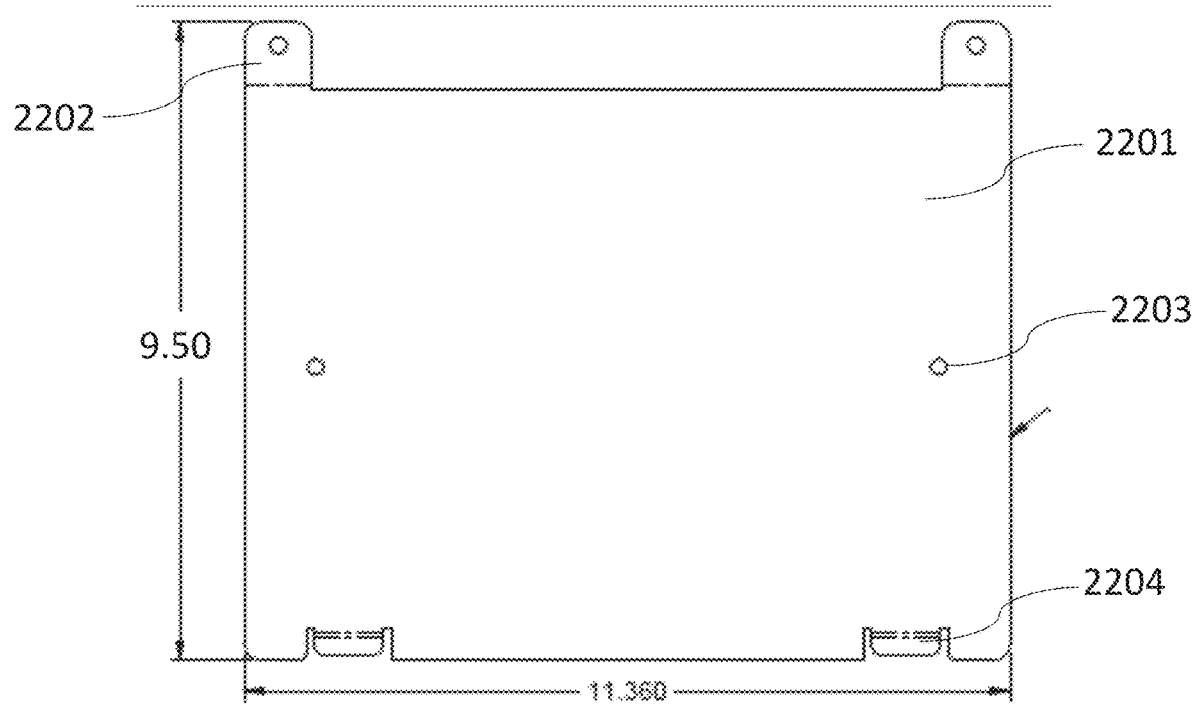
FIG. 22c is a bottom plan view of the counter mounting plate.
Figure 22D:
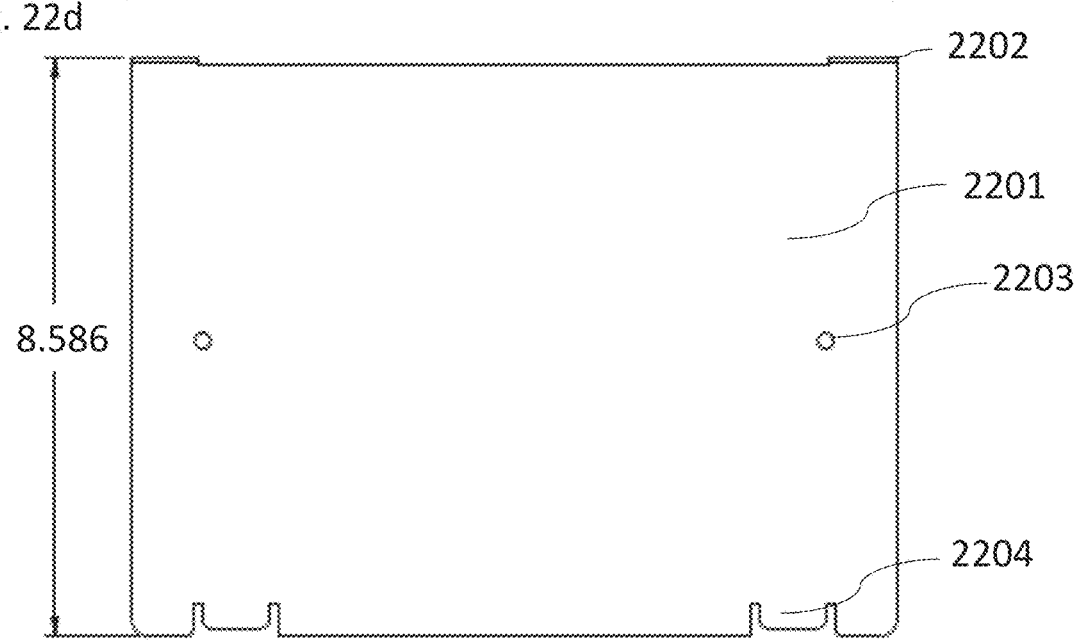
FIG. 22d is a top plan view of the counter mounting plate.

FIGS. 22a-22d illustrate views of a counter mounting plate of the POS docking station, shown generally at 2200. FIG. 22a is a top side view of a counter mounting plate of the subject POS docking station assembly. FIG. 22b is a side view of the counter mounting plate. FIG. 22c is a bottom plan view of the counter mounting plate. FIG. 22d is a top plan view of the counter mounting plate. Counter mounting plate 2200 is constructed having a plate body 2201 with end projection tabs 2202, one or more apertures 2203 and tab notches 2204. Counter mounting plate 2201 is adapted to be located parallel to the base plate and to mount the POS docking station to a table-top/surface.

Figure 23E:
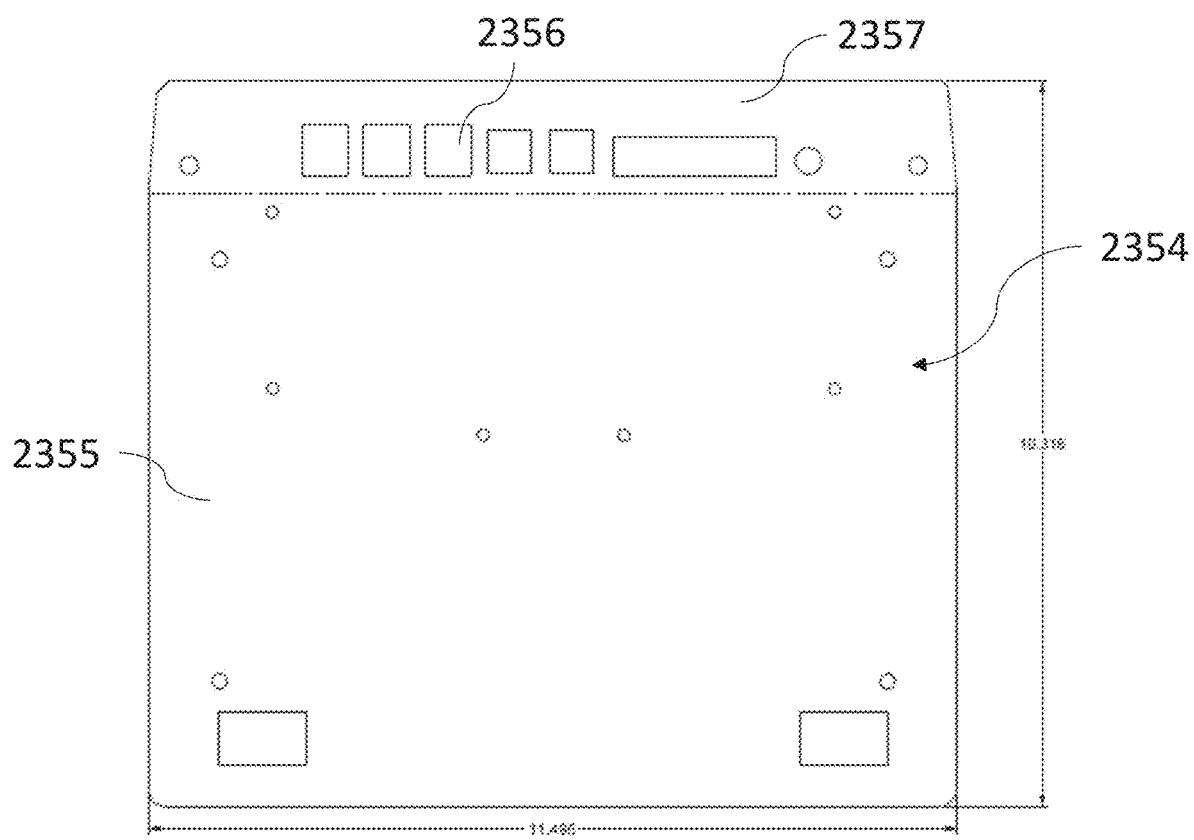
FIG. 23e is a bottom plan view of the base plate in a flat pattern.

FIGS. 23a-23e illustrate an embodiment of a base plate of the POS docking station, shown generally at 2300. FIG. 23a is a top side view of a base plate for the subject POS docking station assembly. FIG. 23b is a side view of the base plate. FIG. 23c is a bottom plan view of the base plate. FIG. 23d is a bottom side view of the base plate. FIG. 23e is a bottom plan view of the base plate in a flat pattern. A base plate 2354 is appointed to be located proximal to a counter mounting plate (see, FIGS. 22a-22e). Base plate 2354 acts as a base in mounting a lower board assembly preferably comprising a primary printed circuit board (PCB2) adapted to operate with at least one USB, Ethernet, debugging Serial port, scan switch interface and/or an external power supply port. Base plate 2354 is structured having a main base body 2355 with one or more apertures 2356 for press-fit mounting between the counter mounting plate and the base cover. A sidewall 2357 appends upward from base body 2355 at approximately a 90-degree angle/perpendicular to base body 2355. A series of port apertures 2356 are provided for supporting access to electronic ports/serial/USB ports.

FIGS. 24a-24f illustrate views of an embodiment of a cable cover or detachable rear port cover, shown generally at 2400. FIG. 24a is a top side view of a cable cover for the subject POS docking station assembly. FIG. 24b is a first side view of the cable cover plate. FIG. 24c is a second side view of the cable cover. FIG. 24d is a bottom plan view of the cable cover. FIG. 24e is a bottom side view of the cable cover. FIG. 24f is an end plan view of the cable cover. Referring to FIGS. 24a-24f, a detachable rear port cover or cable cover 2453 is provided for access within the housing of the fixed POS docking station, and to cover cables. Cable cover 2453 removably attaches to a base plate (see, for example, attachment via mating clips/tongs for attachment of the detachable rear port cover/cable cover 1253 in FIGS. 25a-25d). Cable cover 2453 provides access to the base plate and visa vie lower board assembly, while at the same time covering cables. Cable cover 2453 includes mating cover clips/tongs 2453' for removable attachment to the base housing assembly. Cut-outs 2454 are provided for grasping the cable cover during removal and mounting to the base housing assembly. An indent 2455 is also preferably provided for ease in removing and mounting the cable cover.

FIG. 25a is a top plan view of a base housing assembly/base cover for the subject POS docking station assembly. FIG. 25b is a side view of the base cover. FIG. 25c is a bottom plan view of the base cover. FIG. 25d is a bottom side view of the base cover. Referring to FIGS. 25a-25d, a base housing assembly 2550 is constructed having a top portion 2551, a tilting and rotational mechanism 2555, mating clips/tongs for attachment of a detachable rear port cover 2553 (see FIGS. 24a-24f), and an integrated scanner activation button cut-out 2552 for a barcode scanner integrated with the mobile tablet gun system when docked in the fixed POS docking station. Tilting and rotational mechanism 2555 is constructed having opposing arms 2555', and an underside 2558. Opposing arms 2555' of the tilting and rotational mechanism 2555 include rotation cuff mounts 2555". Rotational cuff mounts 2555" are adapted to mating receive pivot collar mating with a pivot restrictor part I and a pivot restrictor part II of the upper housing assembly. Tilting and rotational mechanism 2555 connects the base housing assembly 2550 to the upper housing assembly through the opposing arms 2555' and rotation cuff mounts 2555". The tilting mechanism and rotational mechanism are adapted to allow the upper housing assembly to rotate and tilt "toward" or "away" from a user allowing the user proper viewing orientation of the display screen of fixed POS docking station from any position.

Figure 26D:
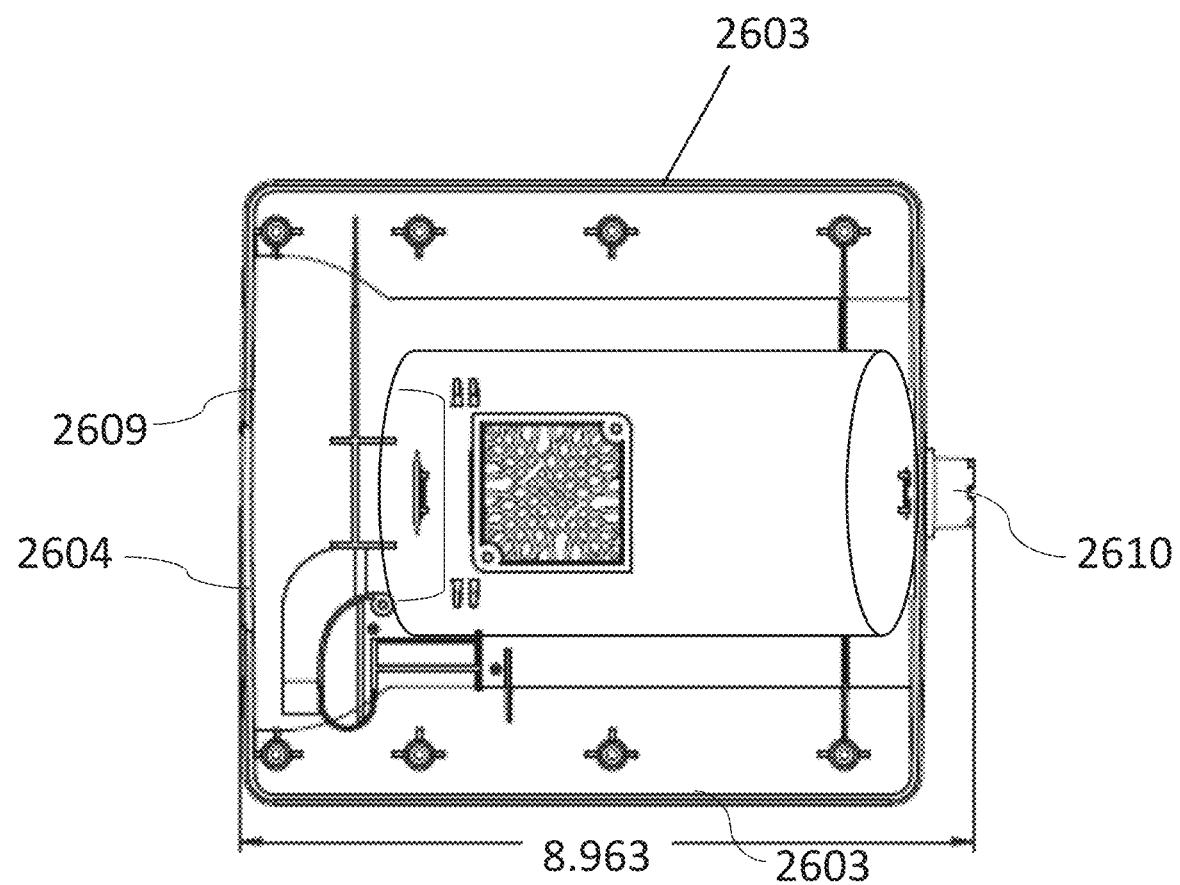
FIG. 26d is a top plan view of the upper enclosure base.

FIGS. 26a-26d generally illustrate views of an upper encloser base of an upper housing assembly of the subject fixed POS docking station, shown generally at 2600. FIG. 26a is a top side view of an upper enclosure base for the subject POS docking station assembly. FIG. 26b is a side view of the upper enclosure base. FIG. 26c is a front plan view of the upper enclosure base. FIG. 26d is a top plan view of the upper enclosure base. Referring to FIGS. 26a-26d, upper enclosure base 2604 is constructed having a main body 2604', side walls 2606, a bottom wall 2607, end walls 2608, an elongated edge wall 2609, and a base 2603. Main body 2604' adapted to receive a mobile tablet gun as part of a mobile tablet gun assembly. Base 2603 also serves as a base to a tablet cradle enclosure (i.e. see, base 803 of tablet cradle enclosure 802 of FIG. 8) which, in turn, is adapted to electronically integrate, receive and house a mobile tablet gun of the tablet gun assembly. Bottom wall 2607 is rounded or arched for tilting rotation when the upper enclosure base 2604 via the upper housing assembly is mounted on the base/lower housing assembly (i.e. see, base/lower housing assembly 850 of FIG. 8).

End walls 2608 include opposing mating receive pivot collar mating with a pivot restrictor part I and a pivot restrictor part II 2610 that are received within rotation cuff mounts on opposing arms of the tilting and rotational mechanism of the base housing assembly/base cover. Rotational cuff mounts of the base housing assembly/base cover are adapted to mating receive the pivot collar mating with a pivot restrictor part I and a pivot restrictor part II 2610 of the upper enclosure base 2604 of the upper housing assembly to connect the base housing assembly to the upper housing assembly. The tilting mechanism and rotational mechanism are adapted to allow the upper housing assembly to rotate and tilt "toward" or "away" from a user allowing the user proper viewing orientation of the display screen of fixed POS docking station from any position.

FIGS. 27a-30d illustrate views of a pivot assembly, including a pivot collar, pivot restrictor part I, bolt plate, and pivot restrictor part II of the subject POS docking station assembly.

Figure 27A:
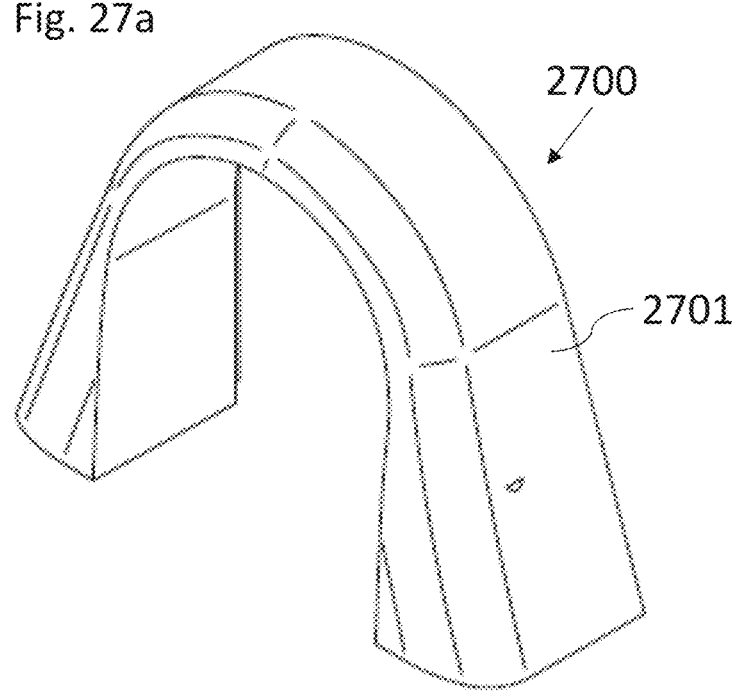
FIG. 27a is a top side view of a pivot collar of the subject POS docking station assembly.
Figure 27B:
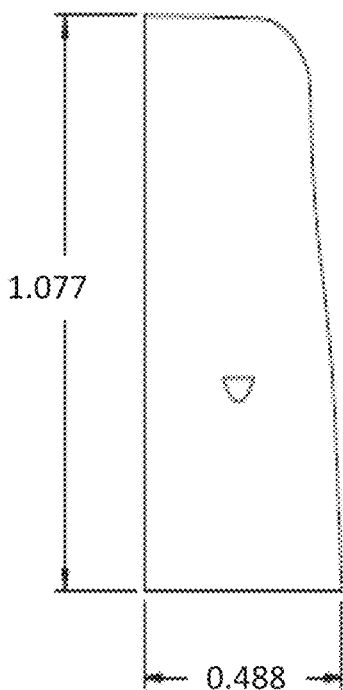
FIG. 27b is a side view of the pivot collar.
Figure 27C:
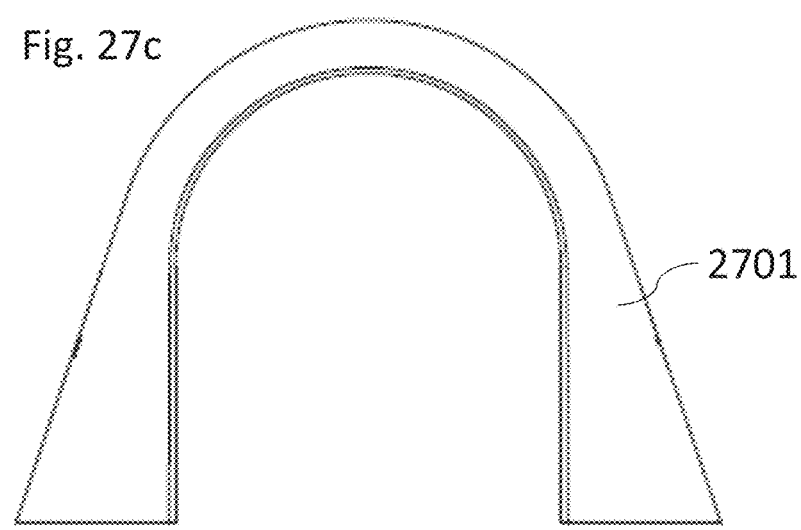
FIG. 27c is a front plan view of the pivot collar.
Figure 27D:
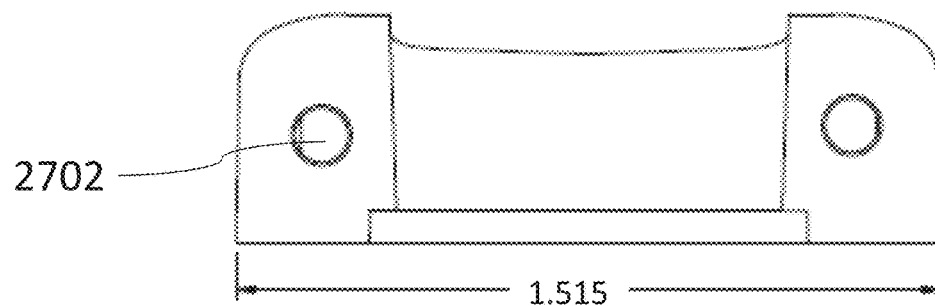
FIG. 27d is a bottom plan view of the pivot collar.

FIG. 27a is a top side view of a pivot collar, shown generally at 2700, of the subject POS docking station assembly. FIG. 27b is a side view of the pivot collar. FIG. 27c is a front plan view of the pivot collar. FIG. 27d is a bottom plan view of the pivot collar. Pivot collar 2700 is formed as an arc or curved main body 2701 with apertures 2702 for mounting within the upper encloser base of an upper housing assembly to form part of a pivot assembly which in turn is part of the tilting and rotational mechanism integrated in the upper housing assembly for tilting or pivot or rotation operation with the opposing arms of the base housing assembly.

Figure 28A:
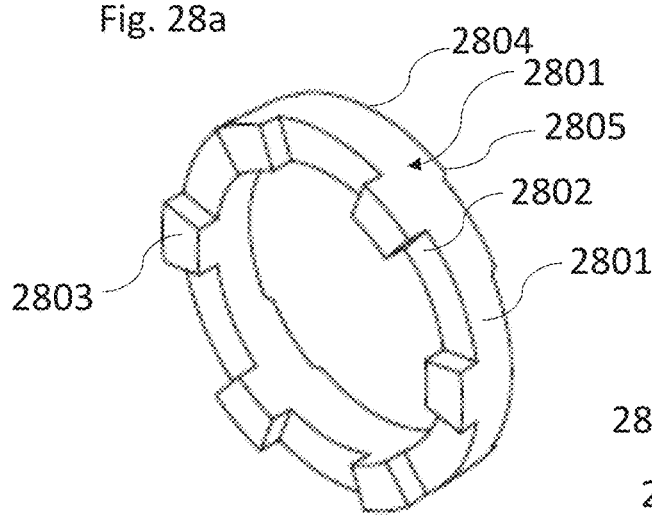
FIG. 28a is a top side view of a pivot restrictor part I of the subject POS docking station assembly.
Figure 28B:
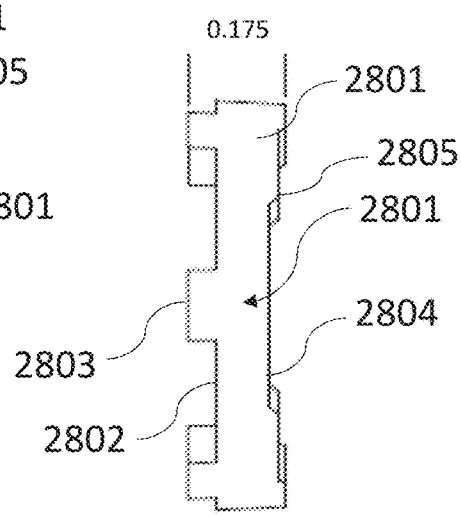
FIG. 28b is a side view of the pivot restrictor part I.
Figure 28C:
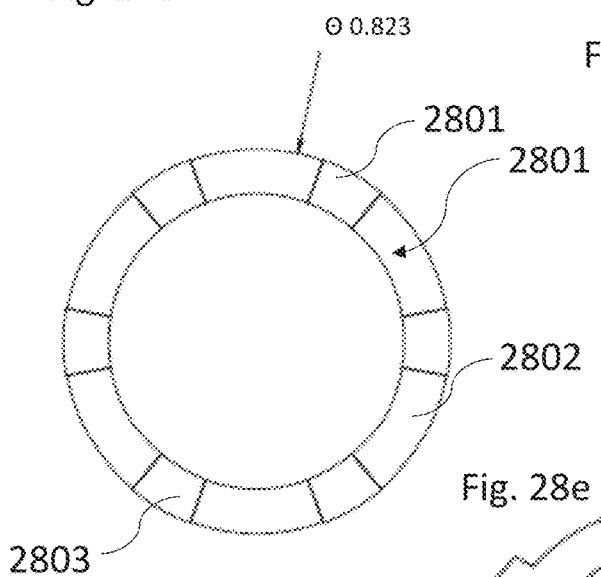
FIG. 28c is a top plan view of the pivot restrictor part I.
Figure 28D:
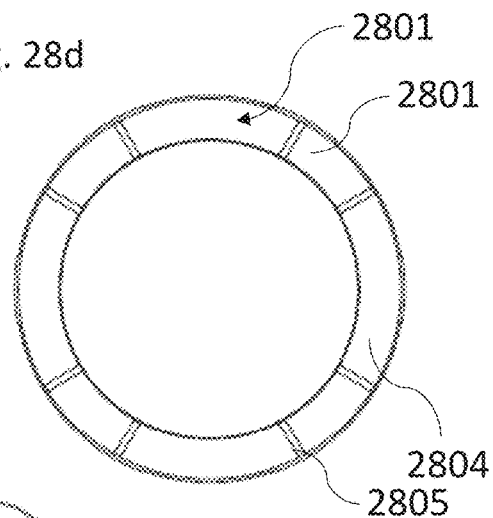
FIG. 28d is a bottom plan view of the pivot restrictor part I.
Figure 28E:
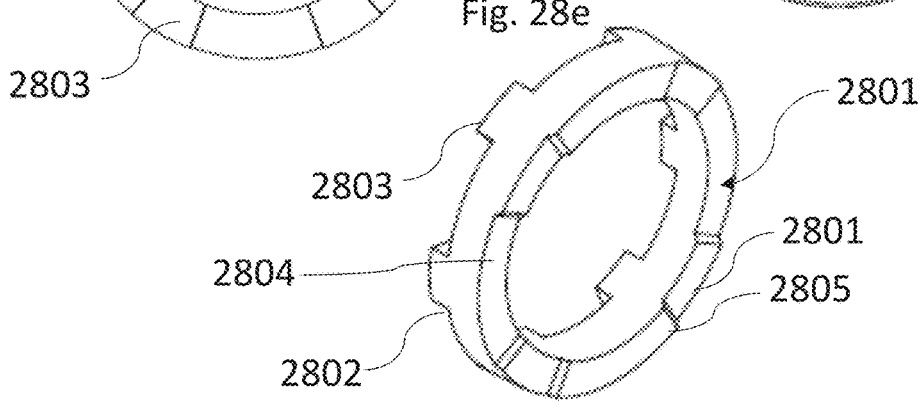
FIG. 28e is a bottom side view of the pivot restrictor part I.

FIG. 28a is a top side view of a pivot restrictor part I, 2801 of the subject POS docking station assembly. FIG. 28b is a side view of the pivot restrictor part I. FIG. 28c is a top plan view of the pivot restrictor part I. FIG. 28d is a bottom plan view of the pivot restrictor part I. FIG. 28e is a bottom side view of the pivot restrictor part I. Pivot restrictor part I is adapted to be fitted within pivot collar 2700. Pivot restrictor part I is constructed as a ring or pivot collar 2801 with a first side 2802 having planar protrusions 2803 and a second side 2804 with non-planar stepped protrusions 2805.

Figure 29A:
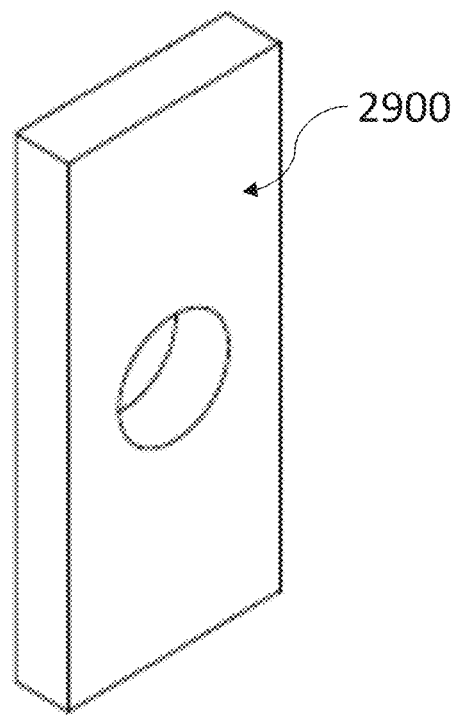
FIG. 29a is a top side view of a bolt plate of the subject POS docking station assembly.
Figure 29B:
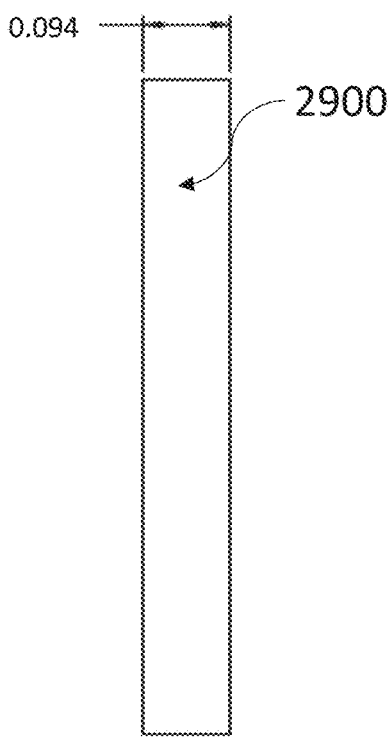
FIG. 29b is a side view of the bolt plate.
Figure 29C:
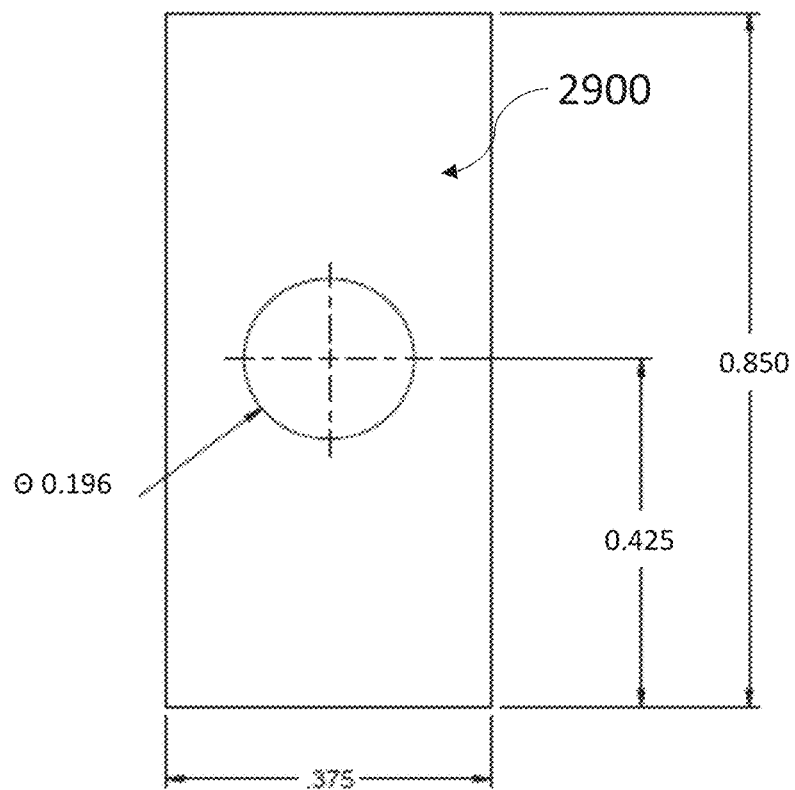
FIG. 29c is a top plan view of the bolt plate.

FIG. 29a is a top side view of a bolt plate 2900 of the subject POS docking station assembly. FIG. 29b is a side view of the bolt plate. FIG. 29c is a top plan view of the bolt plate. Bolt plate 2900 is utilized to secure the pivot assembly to attach the pivot collar to a base arm cover (see FIGS. 31a-31d).

Figure 30A:
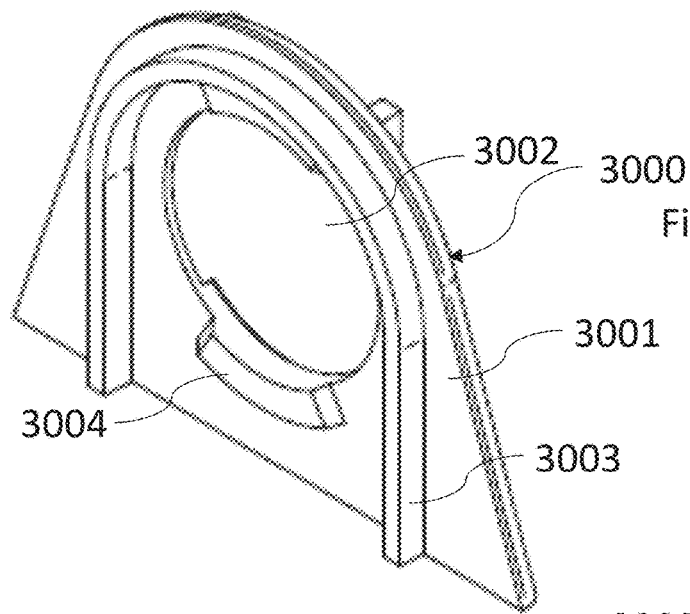
FIG. 30a is a top side view of a pivot restrictor part II of the subject POS docking station assembly.
Figure 30B:
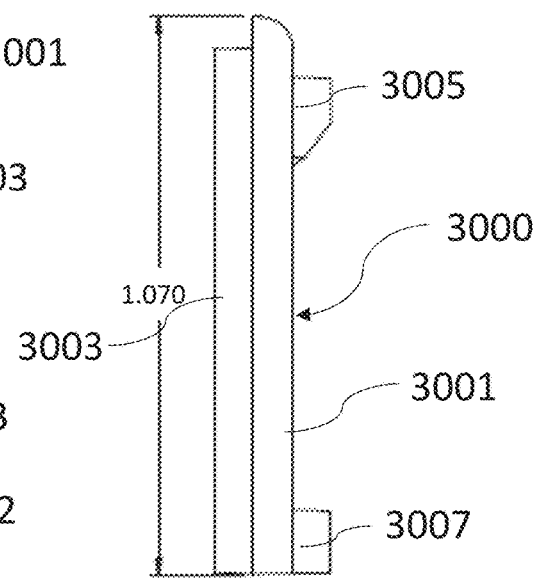
FIG. 30b is a side view of the pivot restrictor part II.
Figure 30C:
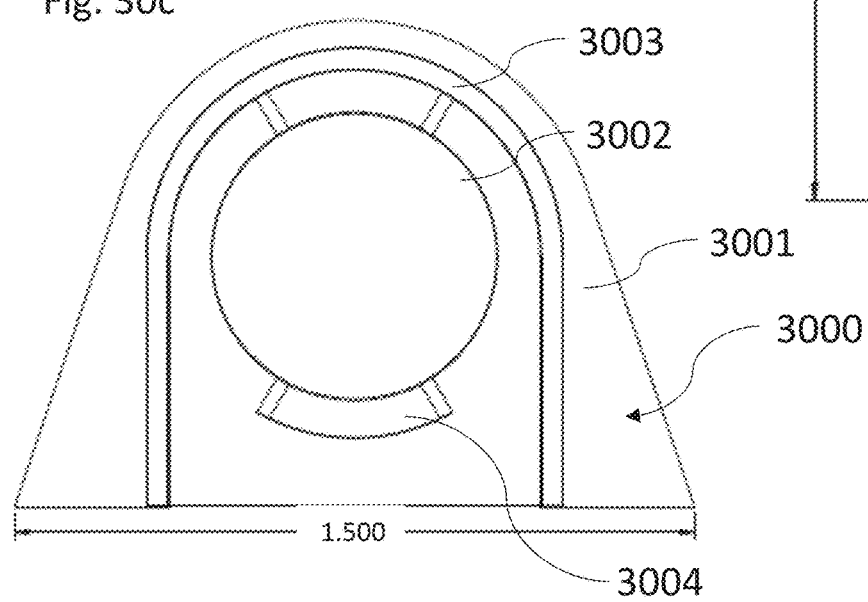
FIG. 30c is a top plan view of the pivot restrictor part II.
Figure 30D:
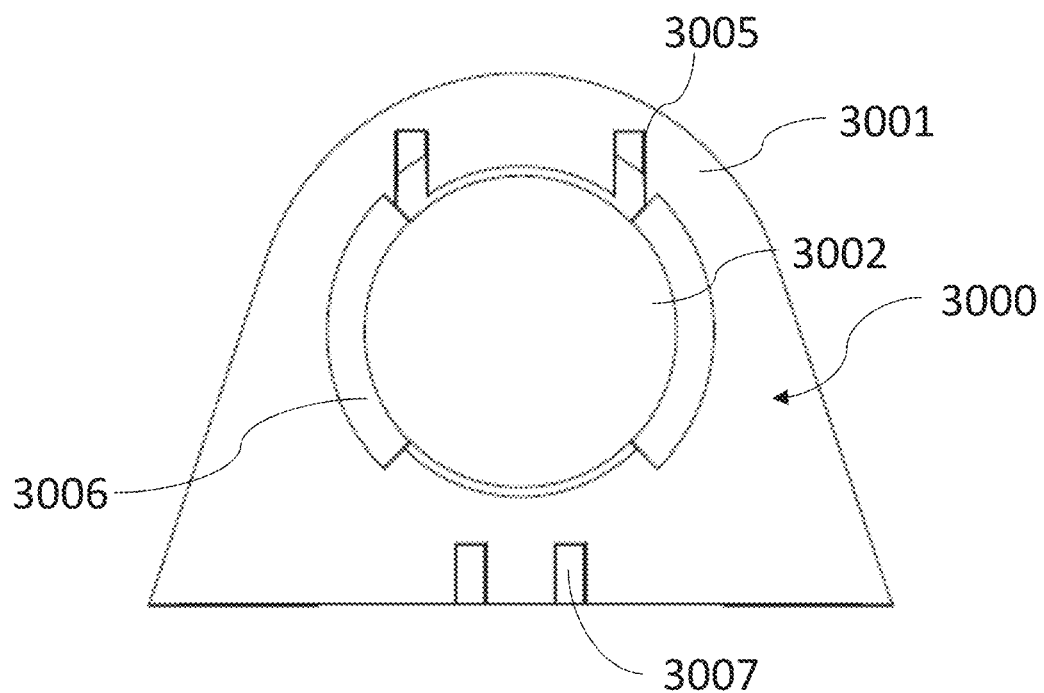
FIG. 30d is a bottom plan view of the pivot restrictor part II.
Figure 30E:
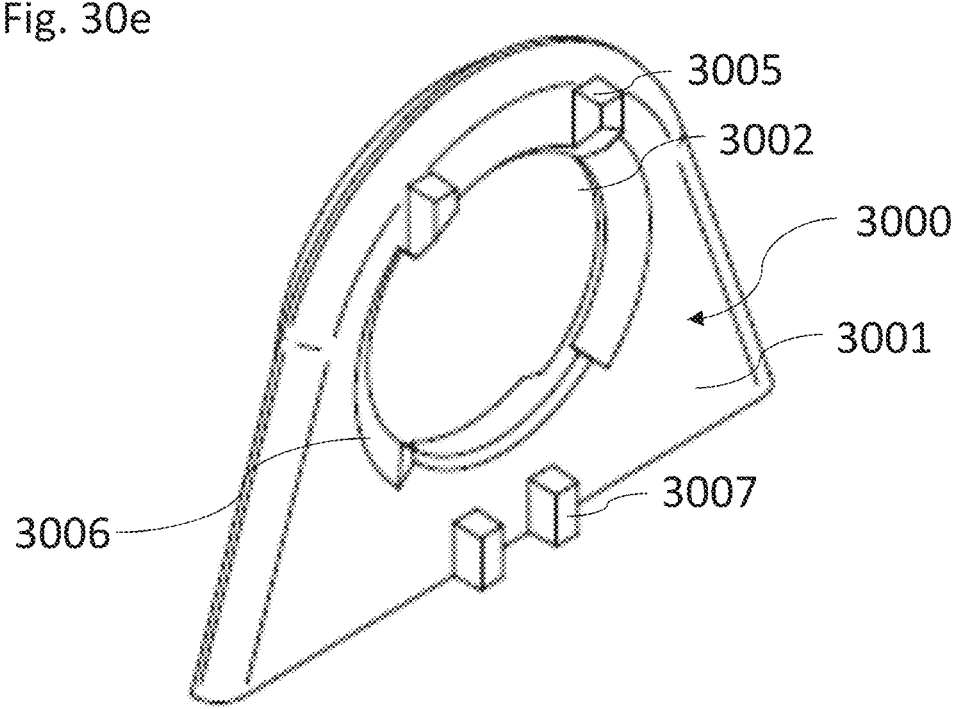
FIG. 30e is a bottom side view of the pivot restrictor part II.

FIG. 30a is a top side view of a pivot restrictor part II 3000 of the subject POS docking station assembly. FIG. 30b is a side view of the pivot restrictor part II. FIG. 30c is a top plan view of the pivot restrictor part II. FIG. 30d is a bottom plan view of the pivot restrictor part II. FIG. 30e is a bottom side view of the pivot restrictor part II. Pivot restrictor part II 3000 is adapted to receive pivot restrictor part I 2801 depicted in FIGS. 28a-28e which, in turn, is adapted to engage pivot collar 2700 of FIGS. 27a-27d. Pivot restrictor part II 3000 is constructed having an arched shaped main body 3001 with a central aperture 3002 adapted to mate with restrictor part I 2801 of FIGS. 28a-28e. The top/first side of restrictor part II 3000 includes a collar 3003 and notch protrusions 3004. The bottom/second side of the restrictor part II 3000 includes upper protrusions 3005, side protrusions 3006 and lower protrusions 3007.

Figure 31A:
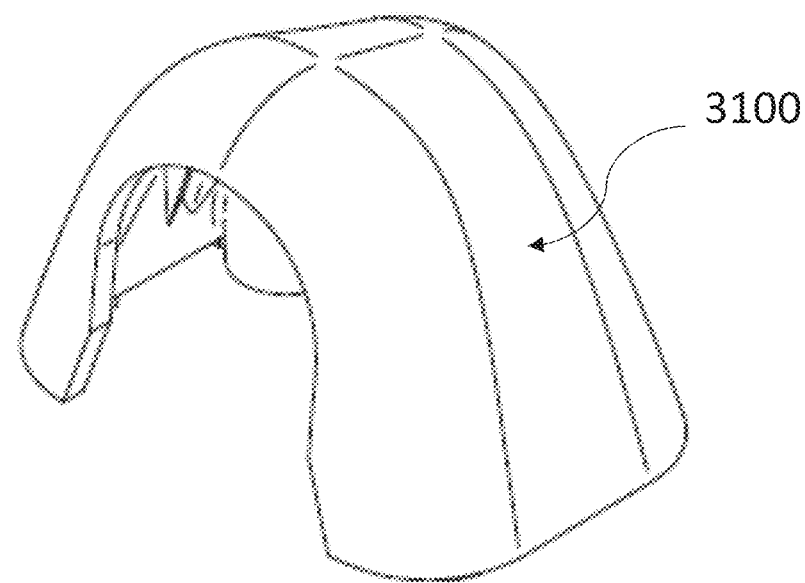
FIG. 31a is a top side view of a base arm cover of the subject POS docking station assembly.
Figure 31B:
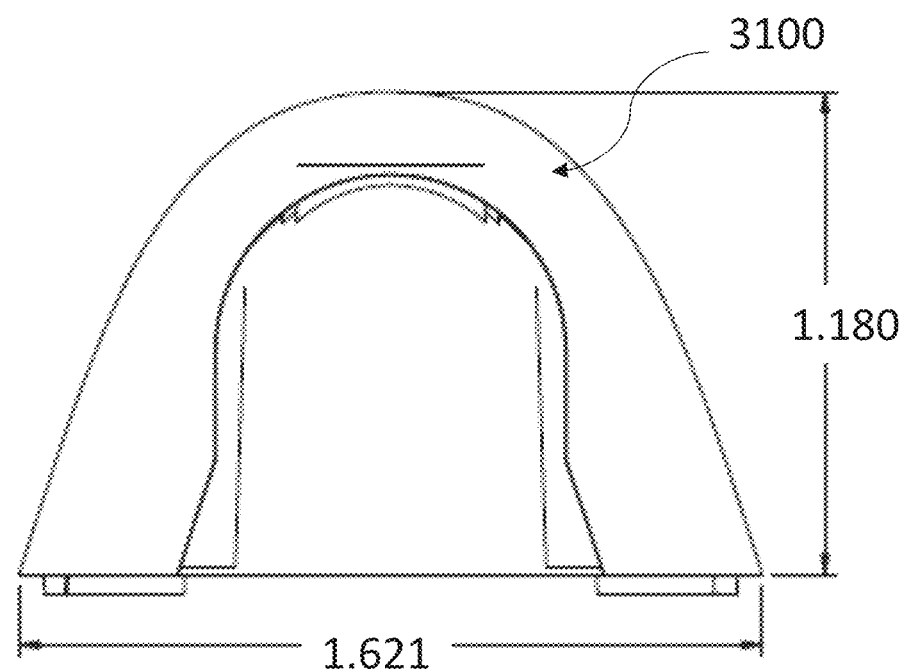
FIG. 31b is a front plan view of the base arm cover.
Figure 31C:
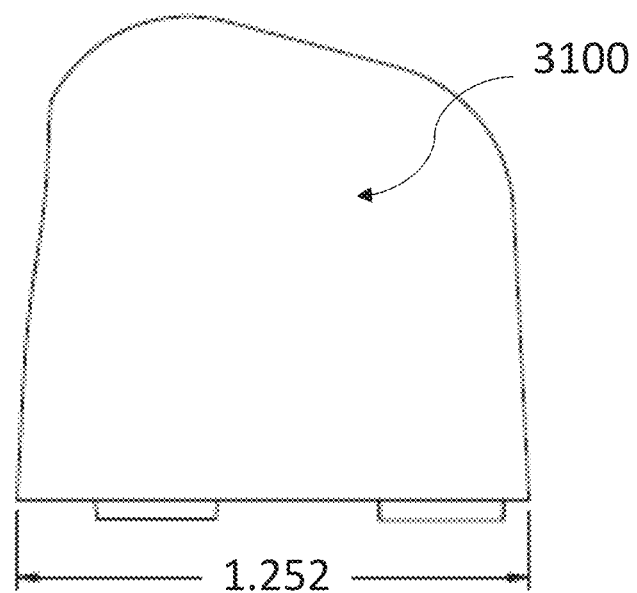
FIG. 31c is a side plan view of the base arm cover.
Figure 31D:
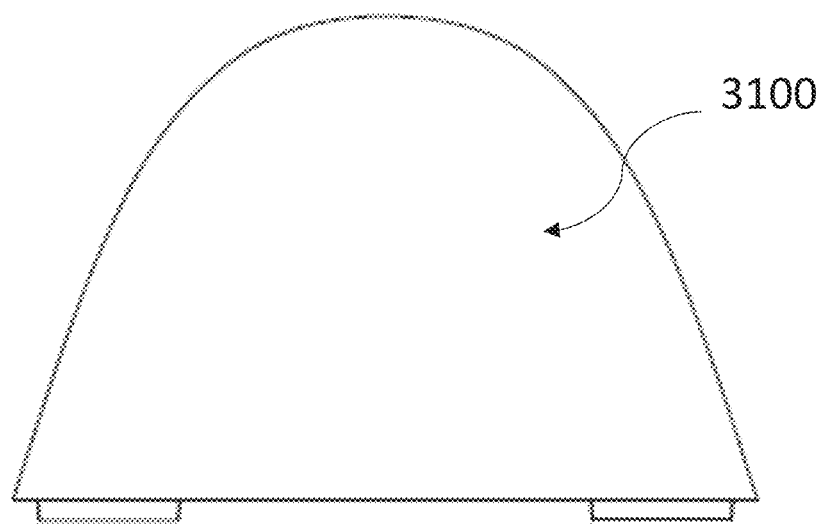
FIG. 31d is a back-plan view of the base arm cover.

FIG. 31a is a top side view of a base arm cover 3100 of the subject POS docking station assembly. FIG. 31b is a front plan view of the base arm cover. FIG. 31c is a side plan view of the base arm cover. FIG. 31d is a back-plan view of the base arm cover. Base arm cover 3100 is mounted on pivot collar and the upper housing assembly for pivoting and tilting of the upper housing assembly.

The fixed POS Docking Station is especially suited for a Wi-Fi and wireless cellular mobile tablet gun system running a real-time store level inventory management suite of applications, StoreMobile INV™, connected directly to the corporate ERP system and running a POS application, StoreMobile POS™, connected directly to the POS store systems server, for customer purchases throughout the retail store and well beyond its walls. There is a need in the art for the subject fixed POS docking station as it has been surprisingly and unexpectedly found that when serving customers with the tablet gun/mobile tablet gun systems, handling the merchandise poses difficulties in that holding the devices can be cumbersome. The solution for this unexpected problem has resulted in a surprising combination of a number of necessary functions into the subject fixed POS docking station. The subject resultant fixed POS docking station has a number of unique attributes that, in combination, serve a variety of purposes. Operational features include: i) charging the tablet gun; ii) providing "hands free" operation of the tablet gun (effectively a workstation); iii) providing 3 secondary Ethernet connections for peripheral devices such as a receipt printer, payment card pin pad, third party loyalty card devices, etc. iv) providing a primary Ethernet connection between the tablet gun and the store network, wherein the Ethernet switch will therefore have 5 ports: 1 internal port and 4 external ports; v) providing two 4 port USB hubs, including four standard USB ports, two 12V powered USB ports and one 24V USB powered port for peripheral hardware such an external barcode scanner and a cash drawer; vi) providing a scanner trigger/button on the housing of the fixed POS docking station as a parallel trigger for operation while the tablet gun is docked; vii) providing Drop in/Pull out docking for the tablet gun. Providing seamless operation when moving from a "docked" condition to an "undocked" condition, in that no physical connections need to be "disconnected". Providing a mechanism wherein gravity establishes the spring-loaded pin connection to the underside of the Upper Receiver.

The mobile scanner gun appointed to be housed within the subject fixed POS docking station comprises a mobile tablet device (upper receiver) preferably having an approximately 6" diagonal LCD display, which can be attached to a variety of base form factors, through a base mount universal receiver having a removable, rotational coupling and a breakaway feature for durability purposes in the event the device is dropped or sustains a significant impact.

The mobile tablet gun system has a custom "hot-swappable" primary lithium-ion battery and a custom lithium-ion backup battery integrated within the mobile tablet device, a USB payment card reader supporting both a magnetic stripe reader (MSR) and a Europay MasterCard Visa (EMV) payment card reader mounted on one edge of the mobile tablet device. A Near Field Communications (NFC) module for processing payment cards is proposed for future use as the chain retail industry acceptance becomes more prevalent. A USB barcode scanner input device incorporated within the "pistol grip base housing" in one base form factor, is operable by pressing a trigger, also incorporated within the "pistol grip base housing". The mobile tablet gun system through its specialized and uniquely developed hardware platform and its multiple interchangeable base form factors, operates both standard and custom Retail Apps allowing store personnel to quickly and easily migrate between POS customer sales transactions, store Back Office applications, ERP Cloud-based inventory and Customer Fulfillment applications without work loss or delay as the store personnel can "hotkey" between this advanced consortium of Retail Apps.

Ease of use and increased customer service levels are further enhanced as the mobile tablet gun system can instantly and seamlessly migrate between network architectures including Ethernet, Wi-Fi, and Cellular, as well as technically connecting and disconnecting between Ethernet, Serial, USB, Wi-Fi and Bluetooth POS peripheral devices controlled by Custom Configuration settings, as warranted and desired by the retail enterprise. Resulting in an unprecedented level of both store systems hardware interoperability and ERP Cloud, Back Office, and POS software integration. Collectively, this unique combination of custom-developed Hardware, Firmware, Systems Software, and Retail Apps, significantly enhance customer service levels while also reducing the overall technology "footprint" and cost associated with managing a chain of retail stores.

The system and method of the present invention provide technology that empowers sales associates to service their customers from a variety of form factors such as a fixed POS terminal, a Wi-Fi handheld terminal, and a cellular handheld terminal. With the unique feature of being able to migrate between those form factors without disruption to workflow or even a POS sales transaction. It can instantly connect and disconnect to specific POS peripheral hardware, whether Ethernet-based, Serial based, or USB based on the needs of the clerk/user as they attempt to satisfy their customer's needs by locating inventory desired by the customer without consideration to the physical location of the merchandise or leaving the customer to do so. Through the use of the subject system and methods, inventory can be found, and goods can be purchased anywhere, anytime and delivered wherever and whenever the consumer wants in a far more efficient and cost-effective manner than current industry standard retail systems can offer.

Under current systems and methods, typically, the consumer must travel to the location of the good (or order the good online through their personal device and wait for delivery or in-store pick-up). This adds an inconvenient step—that is, rather than allowing the sales associate to simply handle the purchase via the mobile tablet gun system, finding the item in store, another store, the warehouse or special vendor order and delivering the goods conveniently to the customer, the customer must visit a competitors store or visit Amazon online and have the goods shipped to their home. Not only is this aggravating and inconvenient to the customer, it may also be the deciding factor that discourages a customer from shopping at the brick and mortar store that failed to satisfy their needs in past visits and it is understood in the retail industry that eCommerce sales continue to rise and foot traffic in brick and mortar stores continues to fall year after year.

Taking a deeper look into the macro trend of ever-increasing online sales and decreasing brick and mortar sales, it is clear that none of the heretofore systems and methods provide the ability for a retailer to utilize software and hardware that runs the entire store, ranging from real-time inventory management, to POS sales transactions while moving between a fixed POS workstation, to a mobile POS device, changing network topology and POS peripheral devices without user intervention or disruption of current transaction processing being performed by the user, all on one multi-functional mobile tablet device. The system, method, and devices herein provide this unique advantageous feature. The subject system and method, and devices implementing the same, provide the following advantages: 1) increased store employee productivity, 2) reduced technology cost and footprint, and 3) improved customer satisfaction, all of which, in turn, lead to an ensured return on investment (ROI) for the retail store operator.

Enterprise Resource Planning (ERP) Cloud integrates internal and external management information throughout an organization, embracing finance/accounting, manufacturing, sales and service, customer relationship management, etc. The ERP Cloud automates this activity with an integrated software application. The purpose of the ERP Cloud is to facilitate the flow of information between all business functions inside the boundaries of the organization and manage the connections to outside stakeholders. The ERP Cloud can run on a variety of computer hardware and network configurations, typically employing multiple databases as a repository for information. Examples of vendors who build industry-leading ERP Cloud systems include: JDA Software Group, Oracle, SAP, Microsoft, Epicor, etc. However, present systems do not provide the ability for a store employee at a physical store location to have direct mobile access to real-time inventory management and POS capability concurrently on one device.

The subject system and methods provide a fully functioning point of sale (POS) system for customer check-out of merchandise in a retail sales environment along with the ERP Cloud inventory and customer-specific data/fulfillment applications all running concurrently and instantly accessible by the store employee. Real-time mobile functionality is provided by the subject system and methods, preferably built around the JDA ERP Cloud (MMS) environment, leveraging current legacy store systems and accessing the current MMS iSeries environment. Through use of the subject system MMS iSeries environment, businesses can build their own cloud to provide mobile customer check-out/order fulfillment and real-time inventory management in the store through the mobile tablet gun system.

Uniquely, the subject system and method provides the ability to use a mobile tablet gun system in a store to yield the following benefits: 1) it allows sales associates to service customers in new ways that deepen customer loyalty and increase wallet share; 2) it provides inventory management for increased accuracy, efficiency, and accountability while providing real-time access to corporate inventory data; 3) it eliminates workflow in the back office and keeps the retailer's sales associates on the sales floor; and 4) it results in higher customer satisfaction through increased face to face interaction, and a higher fill rate for customer desired inventory, which, in turn, ensures the mobile tablet gun system will provide significant ROI to the retail store operator.

Advantageously, the subject system, method, and devices of the present invention allow a sales associate using a mobile tablet gun system to migrate from being part of a fixed POS workstation to becoming a completely mobile POS device anywhere in the store and physically beyond the store without work-flow disruption either in ERP Cloud transactions, Back Office transactions or POS transactions migrating between them all without delay or loss of uncompleted tasks within each Retail App including inventory management tasks such as: a) Daily Cycle Counting & Physical Inventory, b) Receiving & Returns, c) Store Transfers, d) Item Checking, e) Re-Ticketing, etc. Such tasks are performed in real-time within the ERP Cloud and are all visible chain-wide. Through use of the subject system and method, a sales associate can perform the following from a mobile tablet gun system: i) sell "out of stock" merchandise available in the warehouse, another store or from a vendor; ii) create a purchase order (PO) or transfer within MMS and track that item transfer on the web; iii) sell merchandise from their e-commerce site; iv) combat "Showrooming" by providing customers real-time competitive merchandise and pricing information, allowing staff to match prices and satisfy their customer's demands by exceeding expectations within a brick and mortar store and even beyond its walls.

In its preferred embodiment, the point of sale (POS) docking station system and method for a mobile barcode scanner gun system with mobile tablet device of the present invention comprises:

i) a mobile tablet gun system capable of receiving a mobile tablet device with a 6" to 7" (approx.) diagonal LCD touchscreen display having System Apps and Firmware integrated within the Primary PCB running on Microsoft Windows OS currently known as Windows 10, attachable to multiple base form factors through a base mount universal receiver having a removable, rotational coupling with a breakaway feature in the event of a significant forceful impact;

ii) a mobile tablet device with a 6" to 7" (approx.) diagonal LCD touchscreen display having System Apps and Firmware integrated within the Primary PCB running on Microsoft Windows OS currently known as Windows 10 with the same Retail Apps executable (EXE) files that run on industry-standard tablets, laptops, and desktops and requiring no additional user training to operate the mobile tablet device; iii) a mobile tablet device with a 6" to 7" (approx.) diagonal LCD touchscreen display having System Apps and Firmware integrated within the Primary PCB running on Microsoft Windows OS currently known as Windows 10 providing typical features found in a 5" to 6" diagonal industry-standard mobile phone such as rotational screen, "pop up" keyboard and hot-swappable USB and Bluetooth devices;

iii) a mobile tablet device with a 6" to 7" (approx.) diagonal LCD touchscreen display having System Apps and Firmware integrated within the Primary PCB running on Microsoft Windows OS currently known as Windows 10 operating on a Mobile Industry Processor Interface (MIPI) video signal interface based 6" to 7" (approx.) LCD touchscreen display powered by an Intel Atom dual-core processor designed for use with a Low Voltage Display Signal (LVDS) video signal interface based LCD touchscreen display;

iv) a mobile tablet device with a 6" to 7" (approx.) diagonal LCD touchscreen display having System Apps and Firmware integrated within the Primary PCB running on Microsoft Windows OS currently known as Windows 10 capable of receiving remote Windows Updates substantially the same as an industry-standard tablet, laptop or desktop POS terminal can;

v) a mobile tablet device with a 6" to 7" (approx.) diagonal LCD touchscreen display having System Apps and Firmware integrated within the Primary PCB running on Microsoft Windows OS currently known as Windows 10 having Ethernet communicative capability to the POS Store or Cloud Server and the ERP Cloud system in a retail store while docked in the POS docking station;

vi) a mobile tablet device with a 6" to 7" (approx.) diagonal LCD touchscreen display having System Apps and Firmware integrated within the Primary PCB running on Microsoft Windows OS currently known as Windows 10 having Wi-Fi communicative capability to the POS Store or Cloud Server and the ERP Cloud, attached to a pistol grip base housing through a base mount universal receiver with removable, rotational coupling and breakaway feature, forming a mobile tablet gun system carried by an employee within a retail store when the mobile tablet gun system is removed from the POS docking station and in range of the Wi-Fi network;

vii) a mobile tablet device with a 6" to 7" (approx.) diagonal LCD touchscreen display having System Apps and Firmware integrated within the Primary PCB running on Microsoft Windows OS currently known as Windows 10 having wireless cellular communicative capability to the POS Store or Cloud Server and the ERP Cloud, attached to a pistol grip base housing through a base mount universal receiver with removable rotational coupling and breakaway feature, forming a mobile tablet gun system carried by an employee both within a retail store and well beyond its premises when removed from the POS docking station and is no longer in range of the Wi-Fi network;

viii) a mobile tablet device with a 6" to 7" (approx.) diagonal LCD touchscreen display having System Apps and Firmware integrated within the Primary PCB running on Microsoft Windows OS currently known as Windows 10 having a wide variety of specialized systemic functions including: Accelerometer control for screen orientation by application, battery and processor temperature monitoring, color-coded battery power metering and charging schemas for primary and backup lithium-ion battery packs, processor "sleep mode" management for optimizing battery life and quick return of system availability, Advanced Configuration and Power Interface (ACPI) BIOS integration from Intel Atom Processor to Windows 10 OS;

ix) a mobile tablet device with a 6" to 7" (approx.) diagonal LCD touchscreen display having System Apps and Firmware integrated within the Primary PCB running on Microsoft Windows OS currently known as Windows 10 having the systemic capacity to integrate an Intel Atom Processor Chip Set using a Low Voltage Differential Signal (LVDS) video signal interface to a Mobile Industry Processing Interface (MIPI) video signal interface based LCD touchscreen display through its Firmware and Primary PCB;

x) said mobile tablet device with a 6" to 7" (approx.) diagonal LCD touchscreen display having Custom Retail Apps, System Apps and Firmware integrated within the Primary PCB running on Microsoft Windows OS currently known as Windows 10 capable of commanding and controlling a USB barcode scanner input device having a scanner trigger for activating a scan operation by an employee of a retail establishment and retrieving an inventory item for wide variety of Retail App functions and processes;

xi) said mobile tablet device with a 6" to 7" (approx.) diagonal LCD touchscreen display having Custom Retail Apps, System Apps and Firmware integrated within the Primary PCB running on Microsoft Windows OS currently known as Windows 10 having an EMV/MSR reader for processing customer payment card data by an employee or customer of a retail establishment, communicating with a payment card gateway to process customer payment card data through the proper secured bank card processor via a PCI certified network;

xii) said mobile tablet device with a 6" to 7" (approx.) diagonal LCD touchscreen display having Custom Retail Apps, System Apps and Firmware integrated within the Primary PCB running on Microsoft Windows OS currently known as Windows 10 communicating with said POS Store or Cloud Server and corporate ERP Cloud to obtain detailed information of the merchandise scanned, its inventory, selling price electronic and physical coupons, promotions, and customer loyalty data available;

xiii) said mobile tablet device with a 6" to 7" (approx.) diagonal LCD touchscreen display having Custom Retail Apps, System Apps and Firmware integrated within the Primary PCB running on Microsoft Windows OS currently known as Windows 10 being operative to enable an employee of the retail establishment to communicate to a customer, the description, price, electronic and physical coupons, promotion data, and customer loyalty rewards data available to the customer;

xiv) said mobile tablet device with a 6" to 7" (approx.) diagonal LCD touchscreen display having Custom Retail Apps, System Apps and Firmware integrated within the Primary PCB running on Microsoft Windows OS currently known as Windows 10 facilitating a transaction wherein said customer decides to purchase the merchandise and the employee accessing a purchase routine of said mobile POS application software, enters customer name, address and e-mail address if needed, and swipes customer data, and said input device communicating formatted customer payment card data securely to said POS Store or Cloud Server;

xv) said mobile tablet device with a 6" to 7" (approx.) diagonally LCD touchscreen display having Custom Retail Apps, System Apps and Firmware integrated within the Primary PCB running on Microsoft Windows OS currently known as Windows 10 contacting a PCI certified bank card processor authorizing said purchase and communicating to the mobile tablet device that the customer has purchased the scanned merchandise;

xvi) said mobile tablet device with a 6" to 7" (approx.) diagonal LCD touchscreen display having Custom Retail Apps, System Apps and Firmware integrated within the Primary PCB running on Microsoft Windows OS currently known as Windows 10 communicating directly with the ERP Cloud to adjust said product inventory, send a receipt to the e-mail address of the customer, and print a hard copy of the transaction on a store network printer;

xvii) said mobile tablet device with a 6" to 7" (approx.) diagonal LCD touchscreen display having Custom Retail Apps, System Apps and Firmware integrated within the Primary PCB running on Microsoft Windows OS currently known as Windows 10 being operative, in the event that said authorization is denied, to inform the employee of this credit denial, so that said customer is informed and can provide alternative payment;

xviii) said mobile tablet device with a 6" to 7" (approx.) diagonal LCD touchscreen display having Custom Retail Apps, System Apps and Firmware integrated within the Primary PCB running on Microsoft Windows OS currently known as Windows 10, being operative to carry out daily store-level inventory management functions for such tasks as physical inventory, cycle counting, inventory receiving, store to store transfers, return to vendor, product re-ticketing;

xix) said mobile tablet device with a 6" to 7" (approx.) diagonal LCD touchscreen display having Custom Retail Apps, System Apps and Firmware integrated within the Primary PCB currently running on Microsoft Windows 10 OS and being operative to facilitate a transaction whereby the customer purchases merchandise from any retail store employee having a mobile tablet gun system operating on a mobile tablet device with a 6" to 7" (approx.) diagonally LCD touchscreen display running Windows 10 OS and receives full product details, price, electronic and physical coupons, promotions and customer loyalty data available and transacts the customer purchase in a friendly atmosphere without having any need to bring the merchandise to a central checkout station and waiting in queue to check out.

Having thus described the invention in rather full detail, it will be understood that such detail need not be strictly adhered to, but that additional changes and modifications may suggest themselves to one skilled in the art, all falling within the scope of the invention as defined by the subjoined claims.

What is claimed is:

1. A points of sale (P.O.S.) docking station for interchangeably attaching and electronically coupling a mobile tablet gun system with mobile tablet device with a tablet display screen having an upper receiver for processing retail store P.O.S. sales transactions to a base form factor, comprising:

a) an upper housing assembly having an upper enclosure base and a tablet cradle enclosure with an upper board assembly comprising a secondary printed circuit board (PCB1) for interchangeably mounting and electronically communicating with said mobile tablet device;

b) a lower housing assembly with a removable base plate and rear cover and comprising a primary printed circuit board (PCB2) adapted to operate standard USB, 12V and 24V PoweredUSB, Ethernet, a Near Field Communications Module (N.F.C.) and an external power supply port;

c) a secondary display screen housed in a display enclosure hingedly attached to said tablet cradle enclosure of said upper housing assembly, wherein said secondary display screen is activated on when it is rotated over and parallel said tablet cradle enclosure when said secondary display screen is in use, and said secondary display screen is turned off when it is rotated down and perpendicular from said tablet cradle enclosure when said secondary display screen is not in use;

d) a tilting and rotational mechanism connecting said lower housing assembly to said upper housing assembly adapted to rotate and tilt said upper housing assembly to change viewing orientation of said display screen;

e) said secondary printed circuit board (PCB1) being connected to said primary printed circuit board (PCB2) through a custom interface cable operable to facilitate electrical communication between said P.O.S. docking station and said mobile tablet gun system with mobile tablet device;
wherein standard USB, 12V and 24V PoweredUSB, Ethernet, Near Field Communications (N.F.C.) Module and power supply port housed within said lower housing assembly are fully operable with said mobile tablet gun system with said mobile tablet device and can be connected to a variety of P.O.S. peripheral devices and other store systems peripheral devices.

2. The P.O.S. docking station as recited by claim 1, wherein said tilting and rotational mechanism comprises two opposing arms each with a rotation cuff mount located in said lower housing assembly and a pivot collar housed within said upper housing assembly.

3. The P.O.S. docking station as recited by claim 1, wherein said tilting and rotational mechanism allows for at least 90 degree tilt back and forward.

4. The P.O.S. docking station as recited by claim 1, wherein said secondary display screen of said display enclosure has a larger diameter than said table display screen of said mobile tablet device.

5. The P.O.S. docking station as recited by claim 1, wherein said display enclosure is removably mounted on said tablet cradle enclosure of said upper housing assembly.

6. The P.O.S. docking station as recited by claim 5 comprising one or more hinge slot cover and connector slot cover.

7. The P.O.S. docking station as recited by claim 1, wherein said display enclosure is hingedly mounted on said tablet cradle enclosure of said upper housing assembly through a pair of hinges connected to said display enclosure and said tablet cradle enclosure of said upper housing assembly.

8. The P.O.S. docking station as recited by claim 1, wherein said display enclosure is fixedly mounted on said tablet cradle enclosure of said upper housing assembly.

9. The P.O.S. docking station as recited by claim 1, wherein said display screen is a touchscreen LCD display having a diameter ranging from about 10 inches to 15 inches diagonally.

10. The P.O.S. docking station as recited by claim 9 comprising seven USB ports, including four standard USB, two 12V PoweredUSB ports and one 24V PoweredUSB port, and four Ethernet ports and said N.F.C. module for "tap and go" payment processing.

11. The P.O.S. docking station as recited by claim 1 comprising multiple standard USB ports, 12V and 24V PoweredUSB ports, multiple Ethernet ports and an N.F.C. module for "tap and go" payment processing.

12. The P.O.S. docking station as recited by claim 1, wherein said upper board assembly comprises two electrical (spring-loaded) pogo pin connectors having said housing integrated with said secondary printed circuit board (PCB1).

13. The P.O.S. docking station as recited by claim 1, wherein a counter mounting plate is located parallel and below said base plate of said lower housing assembly for securing said P.O.S. docking station to a table-top or surface.

14. The P.O.S. docking station as recited by claim 1, wherein said lower housing assembly comprises a detachable rear port cover or cable cover for access within said lower housing assembly and to cover cables.

15. The P.O.S. docking station as recited by claim 1, wherein said tablet cradle enclosure comprises a top frame having at least two finger slot recessions on each side of a long edge.

16. The P.O.S. docking station as recited by claim 1, wherein said upper board assembly comprises said secondary printed circuit board (PCB1) and two 10 pin electrical pogo pin connectors mounted within said upper housing assembly adapted to mate with two 10 pin electrical connection points and two matching electrical plates each with 10 individual contacts mounted on an underside of said mobile tablet device of said mobile tablet gun system.

17. The P.O.S. docking station as recited by claim 1 comprising one or more magnets mounted at each corner on a bottom of said upper housing assembly and corresponding magnetic slugs on each corner of an underside of said upper receiver of said mobile tablet gun system.

18. The P.O.S. docking station as recited by claim 1, wherein said mobile tablet device comprises: (i) a tablet Primary Printed Circuit Board (P.C.B.) to process commands for running custom retail applications, system applications and firmware executable on an operating system adapted to be connected to said P.O.S. docking station and other form factors through a base mount universal receiver; (ii) one or more docking station P.C.B. interface connectors located on a bottom housing of said mobile tablet device adapted to mount said mobile tablet device and electronically connect to said P.O.S. docking station through said upper board assembly of said P.O.S. docking station; and (iii) a USB payment card reader supporting a Magnetic Strip Reader (M.S.R.), a Europay MasterCard Visa (E.M.V.) payment card reader and a Near Field Communications (N.F.C.) "tap and go" payment Module;
whereby said mobile tablet device is adapted to execute P.O.S. transactions and real-time daily chain store-level inventory management functions for such tasks as physical inventory, cycle counting, inventory receiving, store to store transfers, return to vendor, product re-ticketing.

* * * * *